United States Patent
Kim et al.

(10) Patent No.: US 9,571,240 B2
(45) Date of Patent: Feb. 14, 2017

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG ELECTRONICS INC., Seoul (KR)

(72) Inventors: Byounggill Kim, Seoul (KR); Jaehyung Kim, Seoul (KR); Jaeho Hwang, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 190 days.

(21) Appl. No.: 14/549,126

(22) Filed: Nov. 20, 2014

(65) Prior Publication Data
US 2015/0146608 A1    May 28, 2015

Related U.S. Application Data

(60) Provisional application No. 61/908,693, filed on Nov. 25, 2013, provisional application No. 61/908,722, filed on Nov. 25, 2013.

(51) Int. Cl.
| | |
|---|---|
| *H04W 4/00* | (2009.01) |
| *H04L 5/00* | (2006.01) |
| *H04L 1/00* | (2006.01) |
| *H04W 4/06* | (2009.01) |

(52) U.S. Cl.
CPC .......... *H04L 5/0007* (2013.01); *H04L 1/0057* (2013.01); *H04L 1/0065* (2013.01); *H04L 1/0071* (2013.01); *H04W 4/06* (2013.01); *H04L 5/0023* (2013.01); *H04L 2001/0093* (2013.01)

(58) Field of Classification Search
CPC .... H04L 5/0007; H04L 1/0065; H04L 1/0071; H04L 1/0057; H04L 2001/0093; H04L 5/0023; H04W 4/06
See application file for complete search history.

(56) References Cited

U.S. PATENT DOCUMENTS

| | | |
|---|---|---|
| 2009/0034438 A1 | 2/2009 | Soulie et al. |
| 2009/0067384 A1* | 3/2009 | Himmanen ............ H04H 20/30 370/330 |

(Continued)

FOREIGN PATENT DOCUMENTS

EP    2629444 A1    8/2013

*Primary Examiner* — Clemence Han
(74) *Attorney, Agent, or Firm* — Dentons US LLP

(57) ABSTRACT

The present invention provides a method of transmitting broadcast signals. The method includes encoding service data of Physical Layer Pipes (PLPs); bit interleaving the encoded service data; building at least one signal frame including the bit interleaved service data; and modulating data in the at least one signal frame by Orthogonal Frequency Division Multiplexing (OFDM) method; inserting a preamble at a beginning of each of the at least one signal frame after the modulating step; and transmitting the broadcast signals having the modulated data, wherein the preamble includes information for a size of Fast Fourier Transform (FFT), a guard interval and a pilot mode, wherein the preamble includes two OFDM symbols, and wherein each of the two OFDM symbols in the preamble includes information for an emergency alert.

10 Claims, 50 Drawing Sheets

Scrambling Sequence
(a) Normal Preamble

Scrambling Sequence
(b) Robust Preamble

(56) References Cited

U.S. PATENT DOCUMENTS

| | | | |
|---|---|---|---|
| 2009/0103649 A1* | 4/2009 | Vare | H04L 5/0064 375/295 |
| 2009/0168909 A1* | 7/2009 | Stadelmeier | H04H 20/46 375/260 |
| 2010/0110956 A1* | 5/2010 | Hepworth | H04W 4/22 370/312 |
| 2010/0262708 A1 | 10/2010 | Bouazizi et al. | |
| 2010/0290561 A1* | 11/2010 | Ko | H04L 27/2627 375/298 |
| 2011/0013718 A1* | 1/2011 | Ko | H04L 1/0045 375/295 |
| 2011/0131464 A1* | 6/2011 | Ko | H04L 1/0041 714/752 |
| 2011/0167464 A1 | 7/2011 | Yun et al. | |
| 2011/0286535 A1* | 11/2011 | Ko | H04L 1/0041 375/259 |
| 2011/0305300 A1* | 12/2011 | Ko | H04L 27/04 375/298 |

* cited by examiner

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

FIG. 13

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE<br>PLS2_MOD<br>PLS2_SIZE_CELL<br>PLS2_STAT_SIZE_BIT<br>PLS2_SYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

FIG. 14

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|      | |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1: NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1: NUM_DP | |
| DP_ID | 6 |
| DP_START | 15 (or13) |
| DP_NUM_BLOCK | 10 |
| end RESERVED | 8 |
| EAC_FLAG | 1 |
| EAS_WAKE_UP_VERSION_NUM | 8 |
| if EAC_FLAG == 1 | |
| EAC_LENGTH_BYTE | 12 |
| else | |
| EAC_COUNTER | 12 |
| end | |
| for i=1:NUM_AUX | |
| AUX_PRIVATE_DYN | 48 |
| end | |
| CRC 32 | 32 |

(a) DBPSK mapping rule $m_i[-1] = 1$,
$m_i[n] = m_i[n-1]$    if $s_j[n] = 0$
$m_i[n] = -m_i[n-1]$,    if $s_j[n] = 1$,
$m_q[n] = 0$,    $n = 0 \sim l-1$, $l$ : # of Reed Muller encoded signaling bits (b) DQPSK mapping rule $y[-1] = 0$
$y[n] = y[n-1]$    if $s_i[n] = 0$ and $s_q[n] = 0$
$y[n] = (y[n-1] + 3) \bmod 4$    if $s_i[n] = 0$ and $s_q[n] = 1$
$y[n] = (y[n-1] + 1) \bmod 4$    if $s_i[n] = 1$ and $s_q[n] = 0$
$y[n] = (y[n-1] + 2) \bmod 4$    if $s_i[n] = 1$ and $s_q[n] = 1$, $n = 0 \sim l-1$, $l$ : # of Reed Muller encoded signaling bits $m_i[n] = 1/\sqrt{2}$    $m_q[n] = 1/\sqrt{2}$    if $y[n] = 0$
$m_i[n] = -1/\sqrt{2}$    $m_q[n] = 1/\sqrt{2}$    if $y[n] = 1$
$m_i[n] = -1/\sqrt{2}$    $m_q[n] = -1/\sqrt{2}$    if $y[n] = 2$
$m_i[n] = 1/\sqrt{2}$    $m_q[n] = -1/\sqrt{2}$    if $y[n] = 3$ , $n = 0 \sim l-1$, $l$ : # of Reed Muller encoded signaling bits

FIG. 33
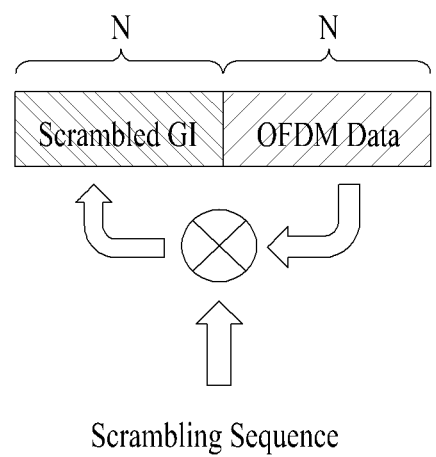
(a) Normal Preamble
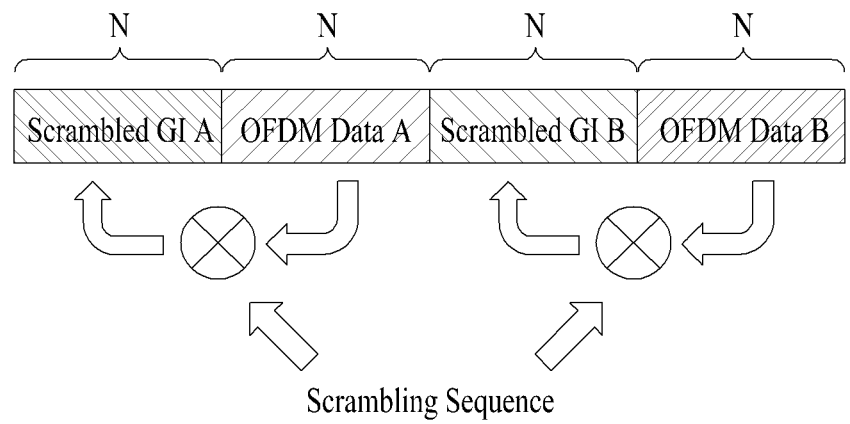
(b) Robust Preamble

Binary Chirp-like Sequence

FIG. 49
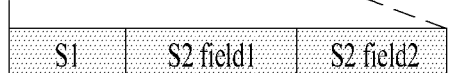
Table 20: S2 field 2
| S1 | S2 field 1 | S2field 2 | Meaning | Description |
|---|---|---|---|---|
| XXX | XXX | 0 | Not mixed | All preambles in the current transmission are of the same type as this preamble. |
| XXX | XXX | 1 | Mixed | Preambles of different type are transmitted |
FIG. 50
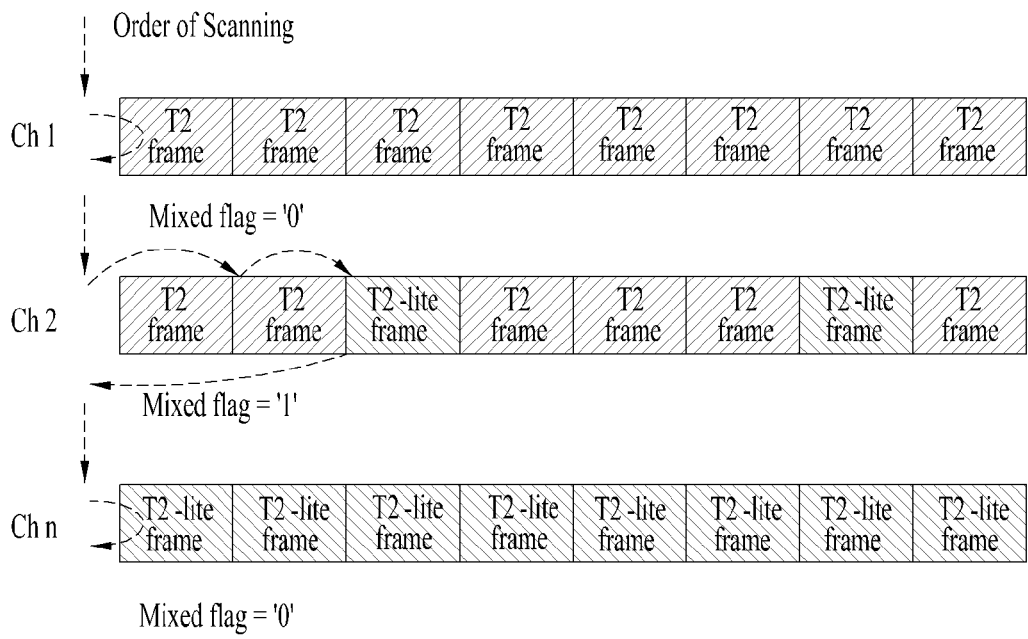

FIG. 53

|  | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile presnt | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

FIG. 54

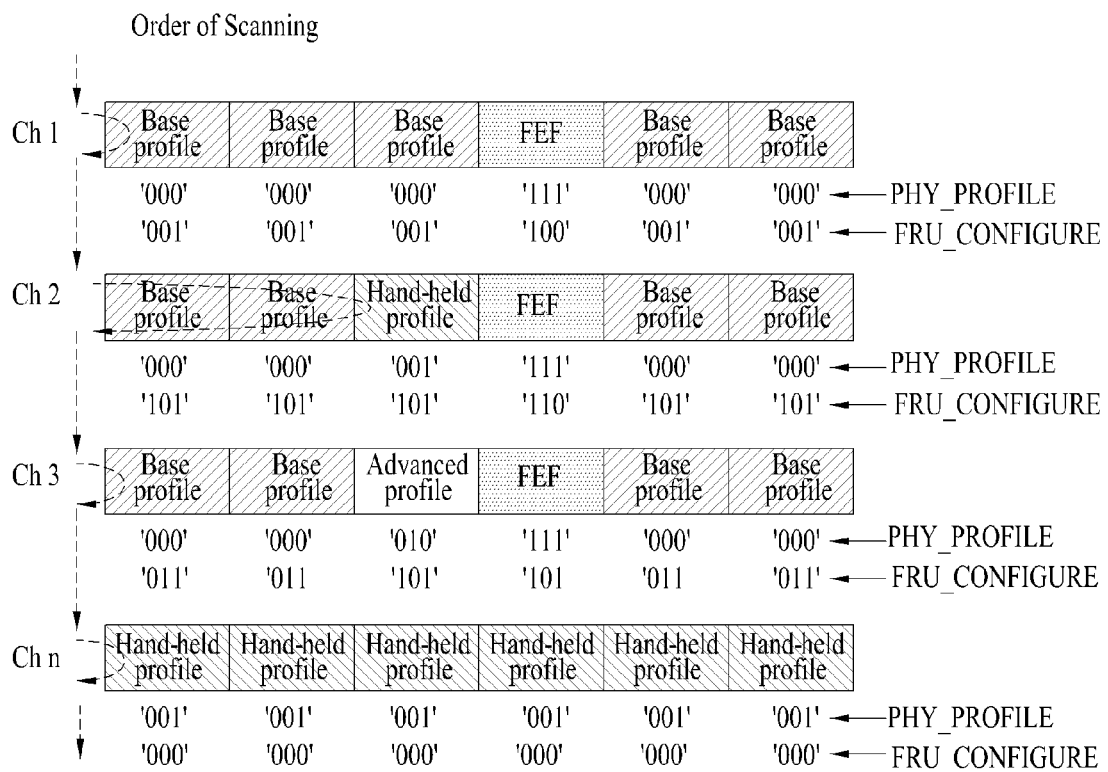

| S₁ | | | S₂ | | | S₃ | | |
|---|---|---|---|---|---|---|---|---|
| | PHY_PROFILE[2] | m₁₀ | | FFT_SIZE[1] | m₂₀ | | | m₃₀ |
| | PHY_PROFILE[1] | m₁₁ | | FFT_SIZE[0] | m₂₁ | | | m₃₁ |
| | PHY_PROFILE[0] | m₁₂ | | GI_FRACTION[2] | m₂₂ | | | m₃₂ |
| | FRU_CONFIGURE[2] | m₁₃ | | GI_FRACTION[1] | m₂₃ | | Reserved | m₃₃ |
| | FRU_CONFIGURE[1] | m₁₄ | | GI_FRACTION[0] | m₂₄ | | | m₃₄ |
| | FRU_CONFIGURE[0] | m₁₅ | | PILOT_MODE | m₂₅ | | | m₃₅ |
| | EAC_FLAG | m₁₆ | | PAPR_FLAG | m₂₆ | | | m₃₆ |

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

This application claims the benefit of U.S. Provisional Application No. 61/908,693 filed on Nov. 25, 2013, U.S. Provisional Application No. 61/908,722 filed on Nov. 25, 2013, which is hereby incorporated by reference as if fully set forth herein.

BACKGROUND OF THE INVENTION

Field of the Invention

The present invention relates to an apparatus for transmitting broadcast signals, an apparatus for receiving broadcast signals and methods for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

Accordingly, the present invention is directed to an apparatus for transmitting broadcast signals and an apparatus for receiving broadcast signals for future broadcast services and methods for transmitting and receiving broadcast signals for future broadcast services.

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data Still another object of the present invention is to provide an apparatus for transmitting broadcast signals, an apparatus for receiving broadcast signals and methods for transmitting and receiving broadcast signals to signal signaling information necessary to provide broadcast signals.

To achieve the object and other advantages and in accordance with the purpose of the invention, as embodied and broadly described herein, the present invention provides a method of transmitting broadcast signals. The method of transmitting broadcast signals includes demultiplexing input streams into plural PLPs (Physical Layer Pipes); encoding data of the each PLPs according to each physical layer profiles, wherein the physical layer profiles are configurations based on reception condition, wherein the each physical layer profiles include: LDPC (Low Density Parity Check) encoding the data of the PLP, bit interleaving the LDPC encoded data of the PLP; building plural signal frames by mapping the encoded data of the each PLPs, wherein each signal frame belongs to one of the physical layer profiles, wherein a super frame includes at least two built signal frames; and modulating data in the built plural signal frames by OFDM (Orthogonal Frequency Division Multiplexing) method and transmitting the broadcast signals having the modulated data, wherein a preamble of the signal frame includes a first signal field indicating type of the current signal frame.

Preferably, the preamble further includes a second signal field indicating whether data encoded for fixed reception are present in the current super frame, or not.

Preferably, the preamble further includes a second signal field indicating configuration of the physical layer profiles of the signal frames in the super frame Preferably, value of the second signal field indicates whether a signal frame of certain physical layer profile is present in the super frame, in combination with value of the first signal field.

Preferably, the physical layer profiles include a first physical layer profile, a second physical layer profile, and a third physical layer profile, when the first signal field indicates that the current signal frame is a signal frame of the first physical layer profile, wherein first bit of the second signal field indicates whether a signal frame of the second physical layer profile is present in the super frame, wherein second bit of the second signal field indicates whether a signal frame of the third physical layer profile is present in the super frame, and wherein third bit of the second signal field indicates whether FEF (Future Extension Frame) is present in the super frame.

Preferably, one of the physical layer profile further includes: mapping the bit interleaved data of the PLP onto constellations, MIMO (Multi Input Multi Output) encoding the mapped data, and time interleaving the MIMO encoded data.

In other aspect, the present invention provides a method of receiving broadcast signals. The method of receiving broadcast signals includes receiving the broadcast signals having plural signal frames and demodulating data in the plural signal frames by OFDM (Orthogonal Frequency Division Multiplexing) method; parsing the plural signal frames by demapping data of plural PLPs (Physical Layer Pipes), wherein each signal frame belongs to one of physical layer profiles, wherein the physical layer profiles are configurations based on reception condition, wherein a super frame includes at least two signal frames; decoding the data of the each PLPs according to the each physical layer profiles, wherein the each physical layer profiles include: bit deinterleaving the data of the PLP, LDPC (Low Density Parity Check) decoding the bit deinterleaved data of the PLP; and multiplexing the decoded plural PLPs into output streams, wherein a preamble of the signal frame includes a first signal field indicating type of the current signal frame.

Preferably, the preamble further includes a second signal field indicating whether data encoded for fixed reception are present in the current super frame, or not.

Preferably, the preamble further includes a second signal field indicating configuration of the physical layer profiles of the signal frames in the super frame Preferably, value of the second signal field indicates whether a signal frame of certain physical layer profile is present in the super frame, in combination with value of the first signal field.

Preferably, the physical layer profiles include a first physical layer profile, a second physical layer profile, and a third physical layer profile, when the first signal field indicates that the current signal frame is a signal frame of the first physical layer profile, wherein first bit of the second signal field indicates whether a signal frame of the second physical layer profile is present in the super frame, wherein second bit of the second signal field indicates whether a signal frame of the third physical layer profile is present in the super frame, and wherein third bit of the second signal field indicates whether FEF (Future Extension Frame) is present in the super frame.

Preferably, one of the physical layer profile further includes: time deinterleaving the data of the PLP, MIMO (Multi Input Multi Output) decoding the time deinterleaved data, and demapping the MIMO decoded data from constellations for bit deinterleaving.

In another aspect, the present invention provides an apparatus for transmitting broadcast signals. The apparatus for transmitting broadcast signals includes a demultiplexing module to demultiplex input streams into plural PLPs (Physical Layer Pipes); an encoding module to encode data of the each PLPs according to each physical layer profiles, wherein the physical layer profiles are configurations based on reception condition, wherein the each physical layer profiles include: an LDPC (Low Density Parity Check) encoding module to LDPC encode the data of the PLP, a bit interleaving module to bit interleave the LDPC encoded data of the PLP; a frame building module to build plural signal frames by mapping the encoded data of the each PLPs, wherein each signal frame belongs to one of the physical layer profiles, wherein a super frame includes at least two built signal frames; and an OFDM module to modulate data in the built plural signal frames by OFDM (Orthogonal Frequency Division Multiplexing) method and to transmit the broadcast signals having the modulated data, wherein a preamble of the signal frame includes a first signal field indicating type of the current signal frame.

Preferably, the preamble further includes a second signal field indicating whether data encoded for fixed reception are present in the current super frame, or not.

Preferably, the preamble further includes a second signal field indicating configuration of the physical layer profiles of the signal frames in the super frame Preferably, value of the second signal field indicates whether a signal frame of certain physical layer profile is present in the super frame, in combination with value of the first signal field.

Preferably, the physical layer profiles include a first physical layer profile, a second physical layer profile, and a third physical layer profile, when the first signal field indicates that the current signal frame is a signal frame of the first physical layer profile, wherein first bit of the second signal field indicates whether a signal frame of the second physical layer profile is present in the super frame, wherein second bit of the second signal field indicates whether a signal frame of the third physical layer profile is present in the super frame, and wherein third bit of the second signal field indicates whether FEF (Future Extension Frame) is present in the super frame.

Preferably, one of the physical layer profile further includes: a mapping module to map the bit interleaved data of the PLP onto constellations, a MIMO (Multi Input Multi Output) encoding module to MIMO encode the mapped data, and a time interleaving module to time interleave the MIMO encoded data.

In another aspect, the present invention provides an apparatus for receiving broadcast signals. The apparatus for receiving broadcast signals includes a receiving module to receive the broadcast signals having plural signal frames and to demodulate data in the plural signal frames by OFDM (Orthogonal Frequency Division Multiplexing) method; a parsing module to parse the plural signal frames by demapping data of plural PLPs (Physical Layer Pipes), wherein each signal frame belongs to one of physical layer profiles, wherein the physical layer profiles are configurations based on reception condition, wherein a super frame includes at least two signal frames; a decoding module to decode the data of the each PLPs according to the each physical layer profiles, wherein the each physical layer profiles include: a bit deinterleaving module to bit deinterleave the data of the PLP, an LDPC (Low Density Parity Check) decoding module to LDPC decode the bit deinterleaved data of the PLP; and a multiplexing module to multiplex the decoded plural PLPs into output streams, wherein a preamble of the signal frame includes a first signal field indicating type of the current signal frame.

Preferably, the preamble further includes a second signal field indicating whether data encoded for fixed reception are present in the current super frame, or not.

Preferably, the preamble further includes a second signal field indicating configuration of the physical layer profiles of the signal frames in the super frame Preferably, value of the second signal field indicates whether a signal frame of certain physical layer profile is present in the super frame, in combination with value of the first signal field.

Preferably, the physical layer profiles include a first physical layer profile, a second physical layer profile, and a third physical layer profile, when the first signal field indicates that the current signal frame is a signal frame of the first physical layer profile, wherein first bit of the second signal field indicates whether a signal frame of the second physical layer profile is present in the super frame, wherein second bit of the second signal field indicates whether a signal frame of the third physical layer profile is present in the super frame, and wherein third bit of the second signal field indicates whether FEF (Future Extension Frame) is present in the super frame.

Preferably, one of the physical layer profile further includes: a time deinterleaving module to time deinterleave the data of the PLP, a MIMO (Multi Input Multi Output) decoding module to MIMO decode the time deinterleaved data, and a demapping module to demap the MIMO decoded data from constellations for bit deinterleaving.

The present invention can process data according to service characteristics to control QoS (Quality of Services) for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13 illustrates PLS1 data according to an embodiment of the present invention.

FIG. 14 illustrates PLS2 data according to an embodiment of the present invention.

FIG. 29 illustrates interlaved XFECBLOCKs from each interleaving array according to an embodiment of the present invention.

FIG. 32 shows mathematical expressions representing relationships between input information and output information or mapping rules of the DQPSK/DBPSK mapper 17040 according to an embodiment of the present invention.

FIG. 33 illustrates preamble structures according to an embodiment of the present invention.

FIG. 49 illustrates a signal frame and a preamble structure thereof according to the conventional art.

FIG. 50 illustrates a conventional channel scanning process.

FIG. 53 illustrates a signaling format of FRU_CONFIGURE of a preamble according to one embodiment of the present invention.

FIG. 54 illustrates a channel scanning process using preamble signaling according to one embodiment of the present invention.

DETAILED DESCRIPTION OF THE INVENTION

Figure 1:
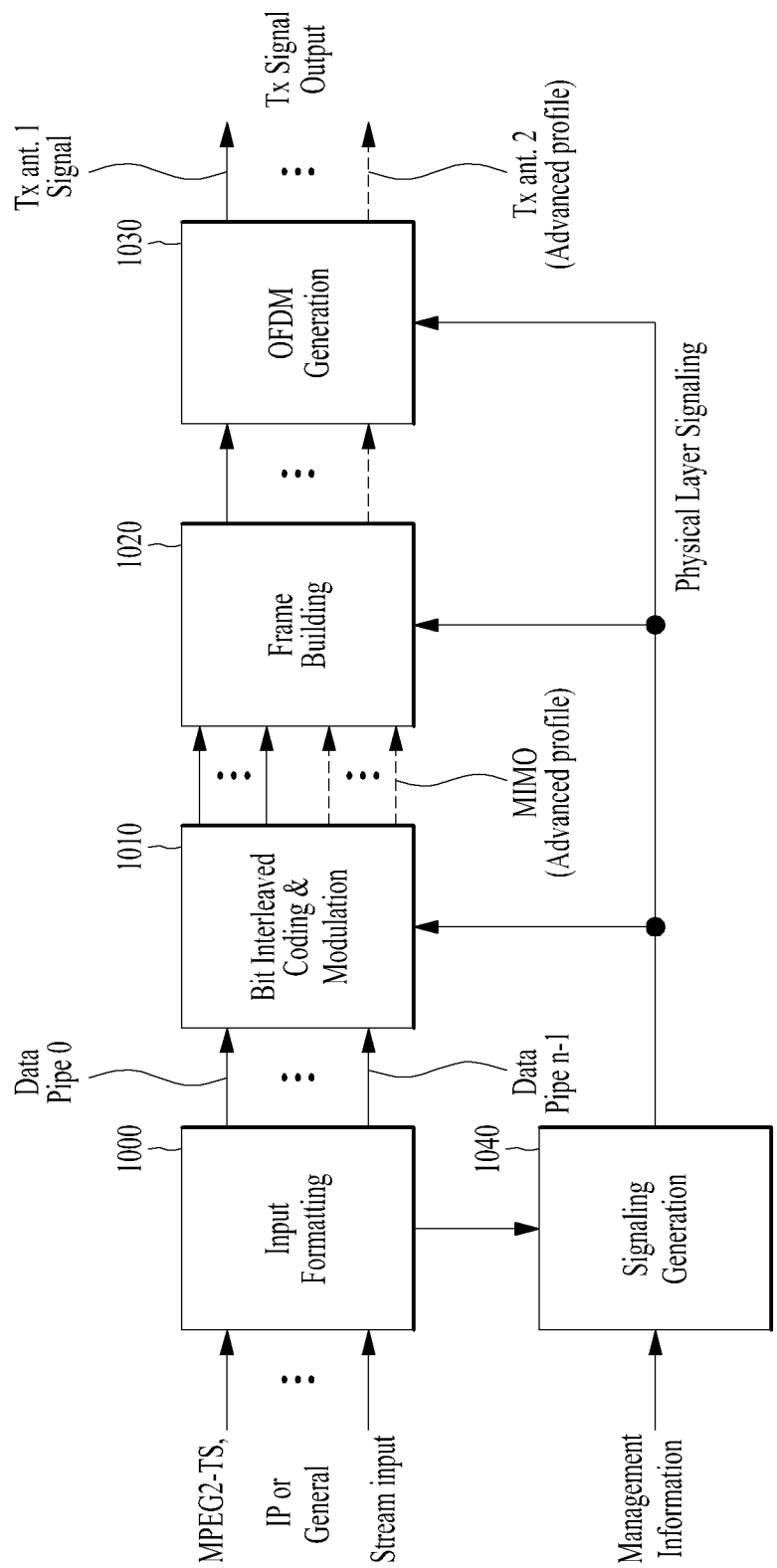
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of $K_{bch}$ bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period $T_S$ expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of N cells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
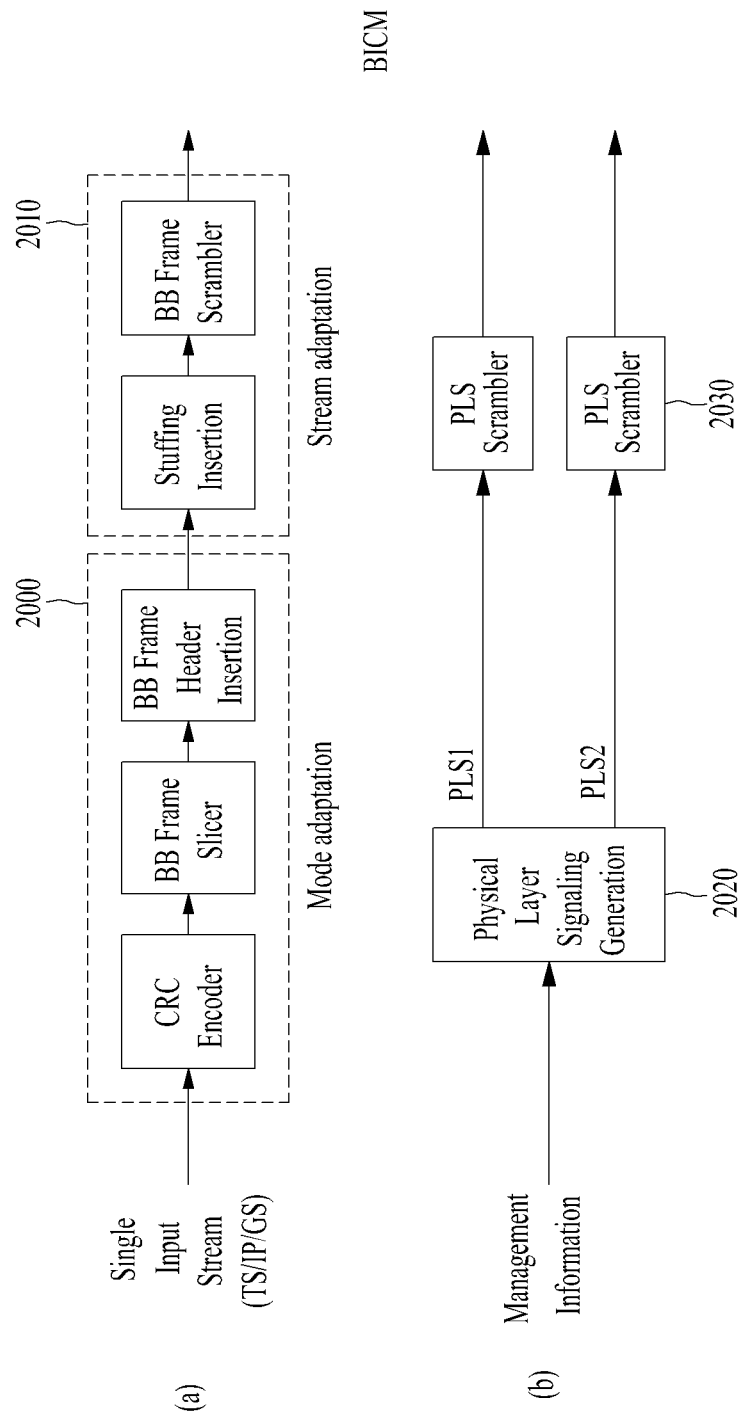
FIG. 2 illustrates an input formatting block according to one embodiment of the present invention.
Figure 3:
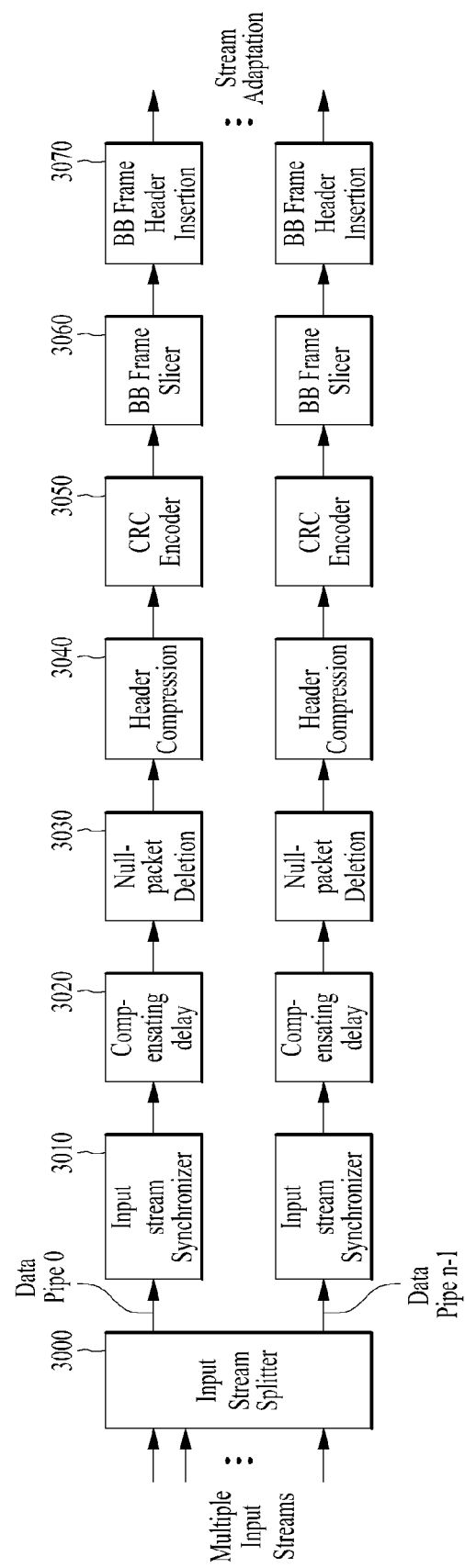
FIG. 3 illustrates an input formatting block according to another embodiment of the present invention.
Figure 4:
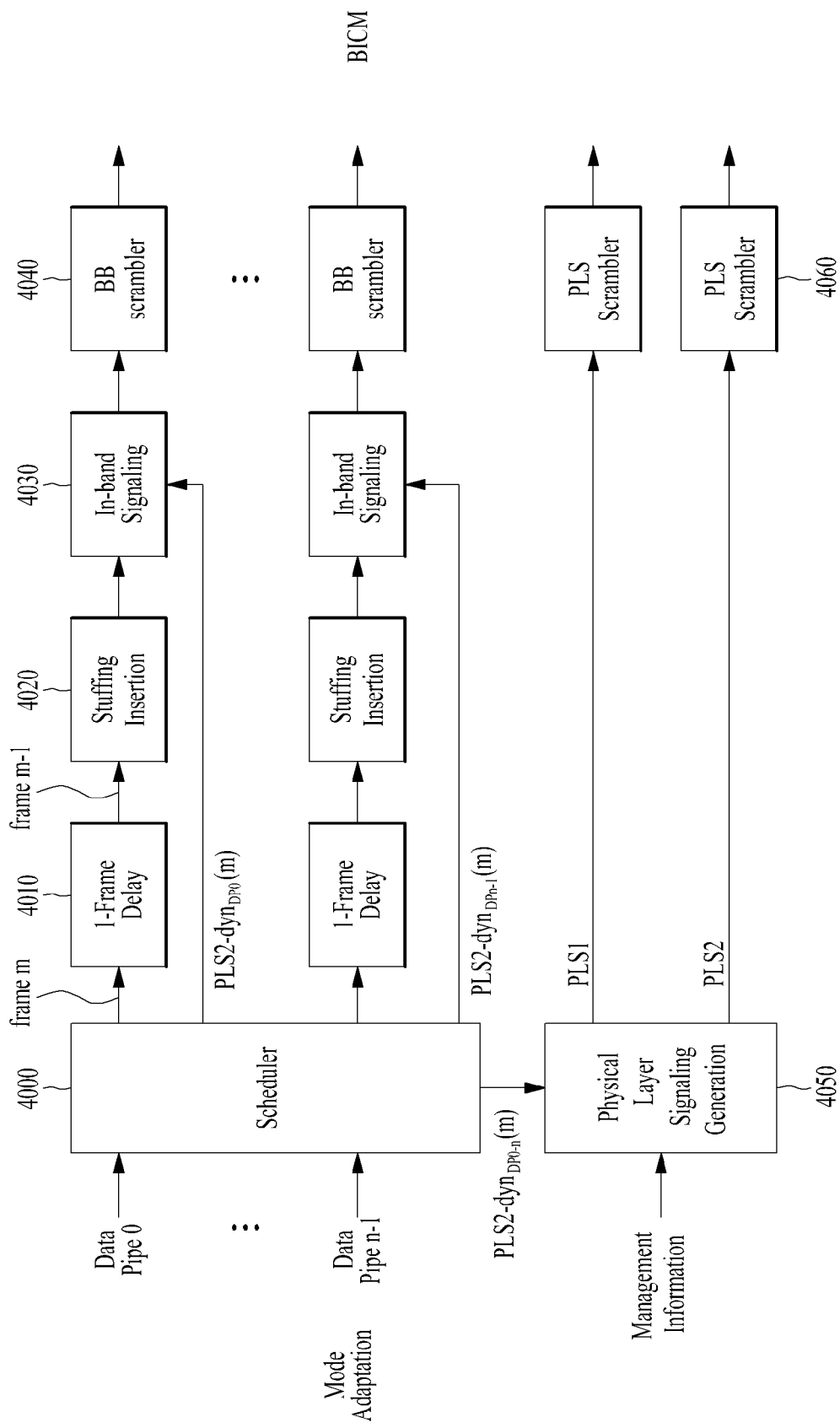
FIG. 4 illustrates an input formatting block according to another embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47).

An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS strea m and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FECBLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

Figure 5:
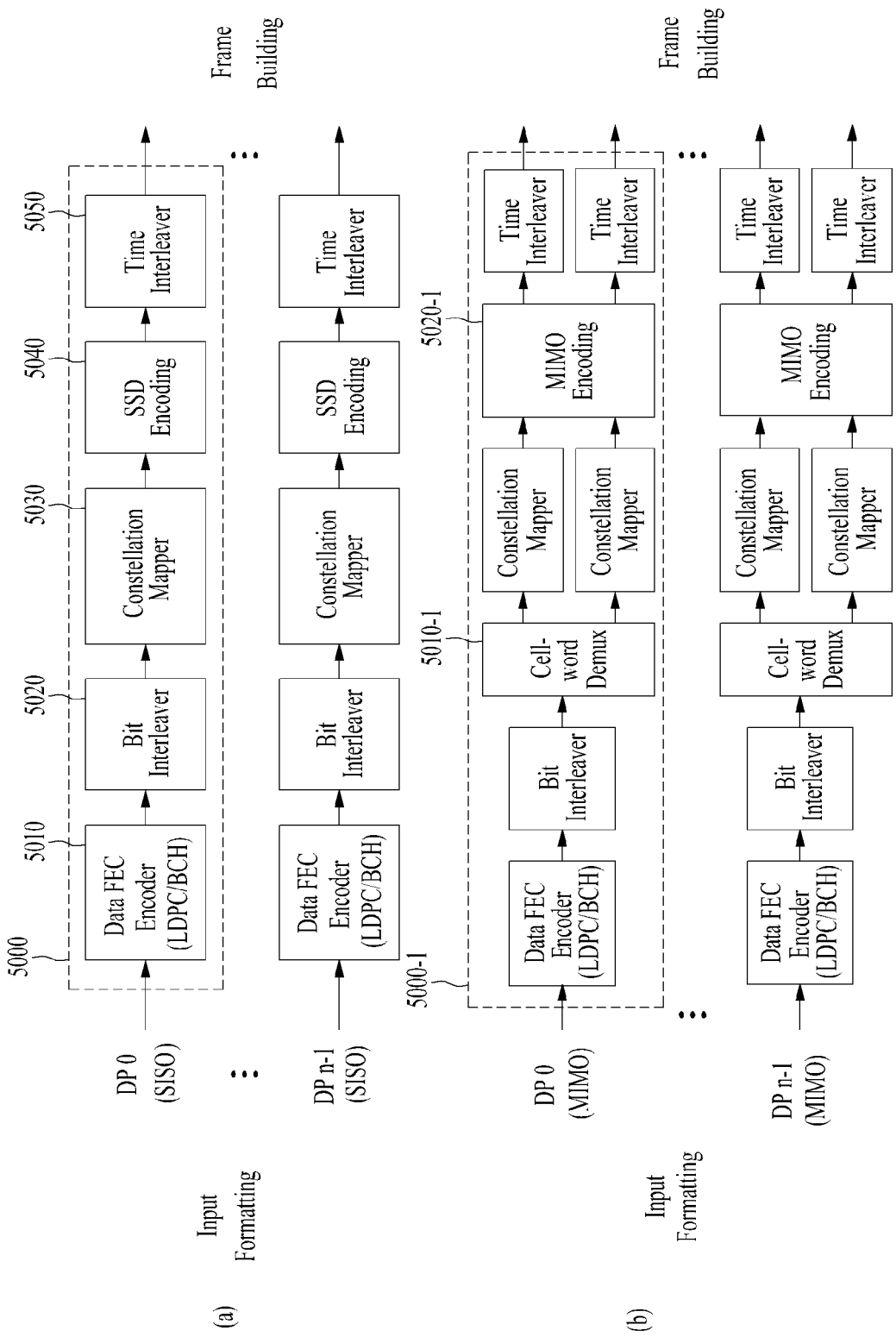
FIG. 5 illustrates a BICM block according to an embodiment of the present invention.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, $e_f$. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ ($e_{1,i}$ and $e_{2,i}$) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

Figure 6:
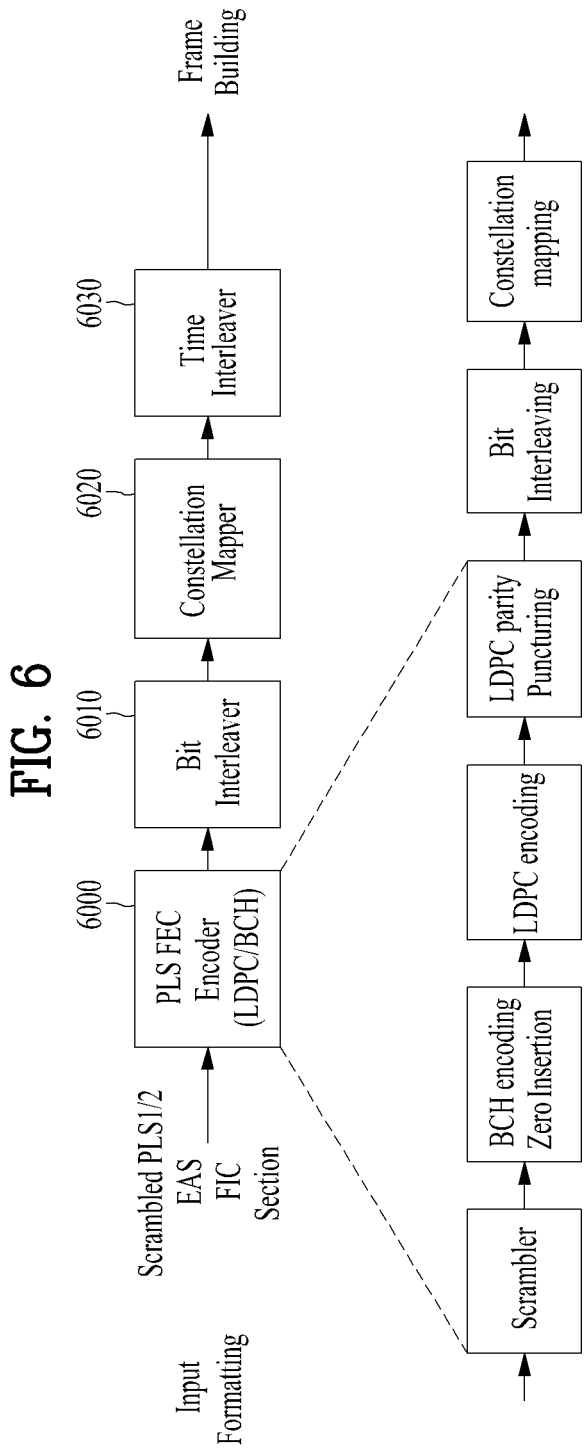
FIG. 6 illustrates a BICM block according to another embodiment of the present invention.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010, a constellation mapper 6020 and time interleaver 6030.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, $C_{ldpc}$, parity bits, $P_{ldpc}$ are encoded systematically from each zero-inserted PLS information block, $I_{ldpc}$ and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Expression 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ $(=N_{bch})$ | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit ineterlaeved PLS1 data and PLS2 data onto constellations.

The time interleaver 6030 can interleave the mapped PLS1 data and PLS2 data.

The above-described blocks may be omitted or replaced by blocks having similar or identical functions.

Figure 7:
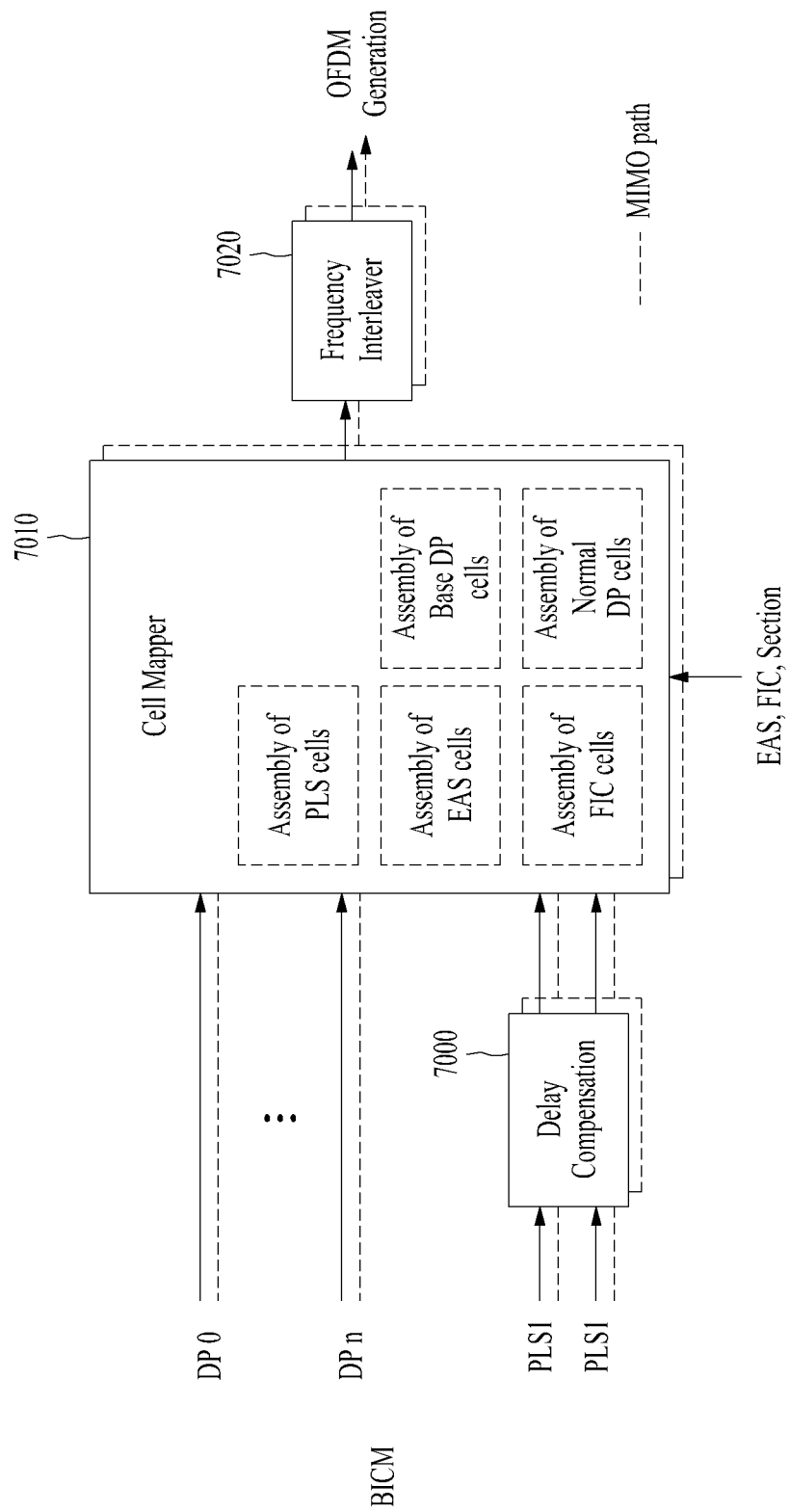
FIG. 7 illustrates a frame building block according to one embodiment of the present invention.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

Figure 8:
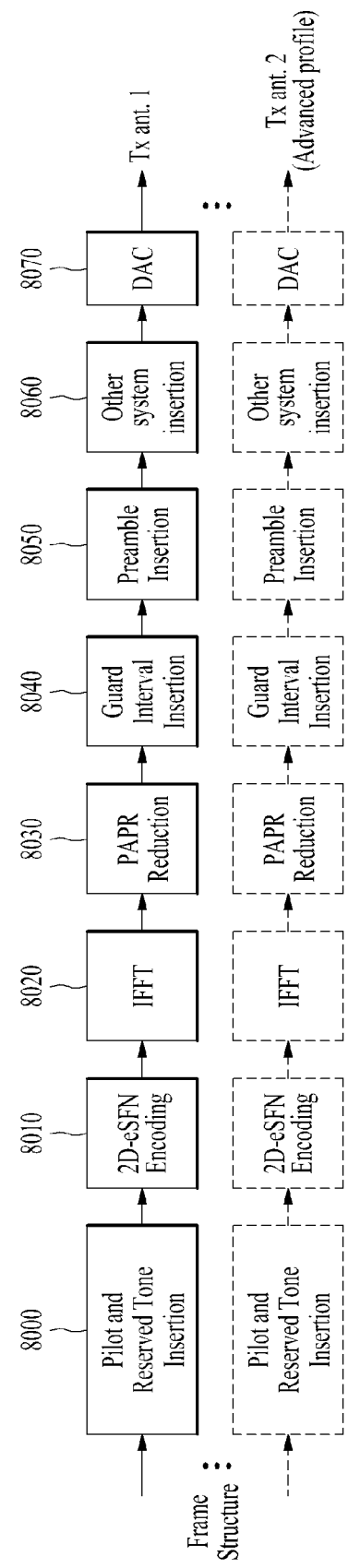
FIG. 8 illustrates an OFMD generation block according to an embodiment of the present invention.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

Figure 9:
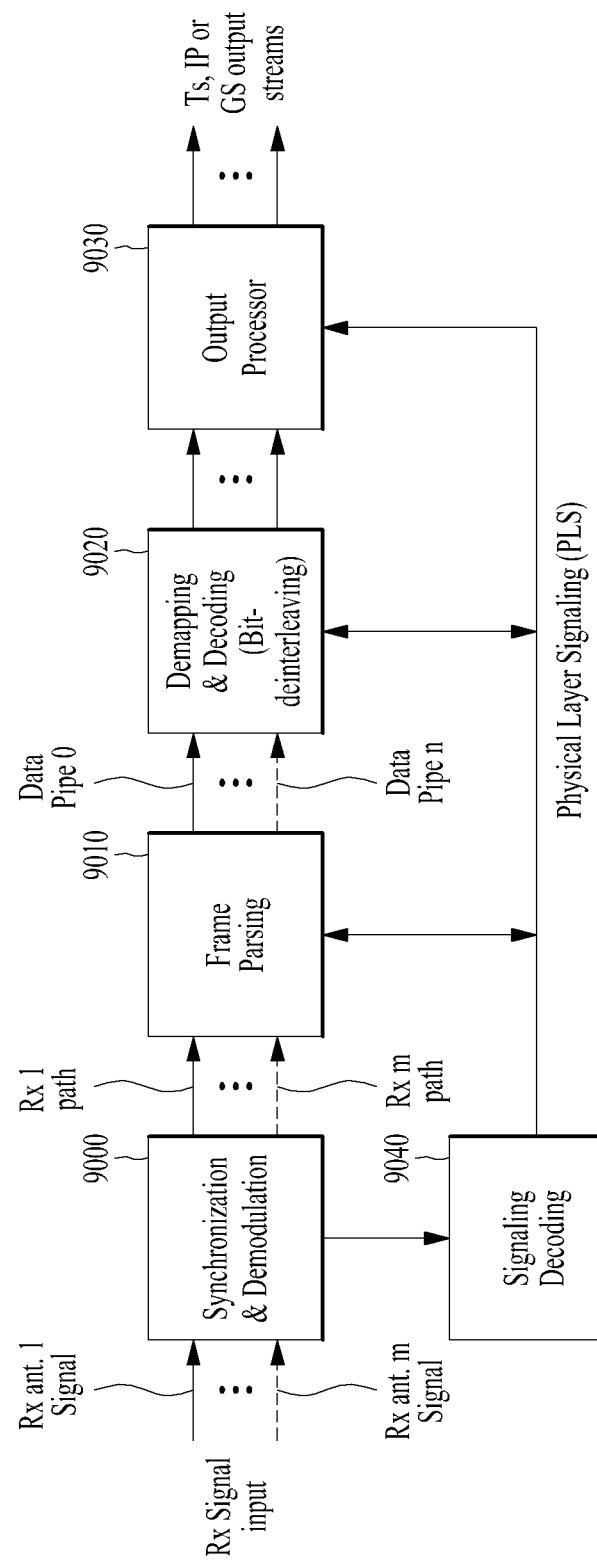
FIG. 9 illustrates a structure of an apparatus for receiving broadcast signals for future broadcast services according to an embodiment of the present invention.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

Figure 10:
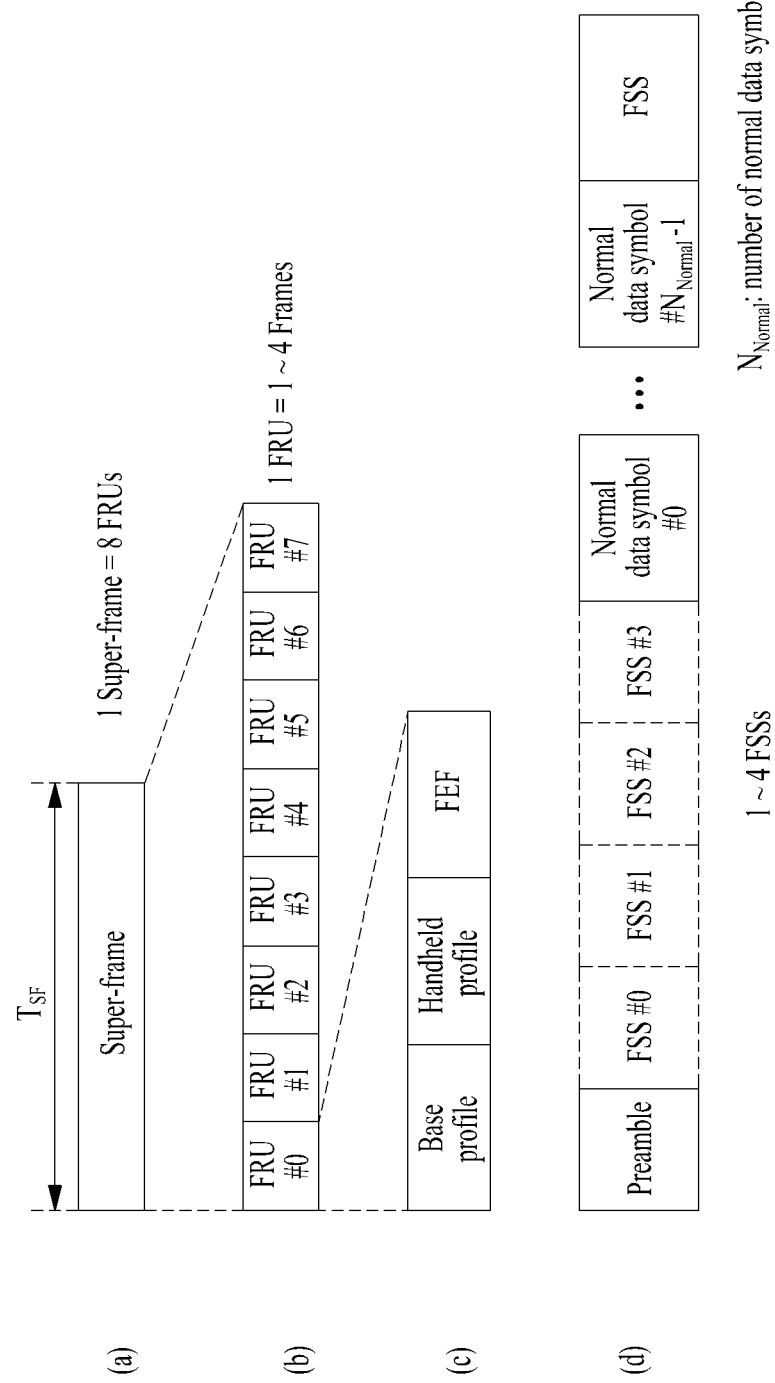
FIG. 10 illustrates a frame structure according to an embodiment of the present invention.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figures 11, 12:
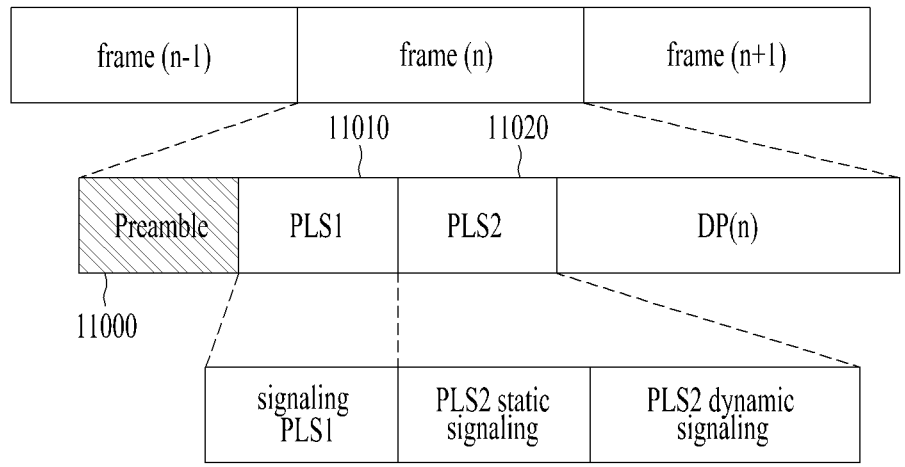
FIG. 11 illustrates a signaling hierarchy structure of the frame according to an embodiment of the present invention.
FIG. 12 illustrates preamble signaling data according to an embodiment of the present invention.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
| --- | --- |
| 000 | Base profile |
| 001 | Handheld profile |
| 010 | Advanced profiled |

TABLE 5-continued

| Value | PHY profile |
| --- | --- |
| 011~110 | Reserved |
| 111 | FEF |

FFT_SIZE: This 2 bit field indicates the FFT size of the current frame within a frame-group, as described in below table 6.

TABLE 6

| Value | FFT size |
| --- | --- |
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
| --- | --- |
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
| --- | --- | --- | --- | --- |
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |

TABLE 8-continued

|  | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the $(i+1)^{th}$ (i is the loop index) frame of the associated FRU. This field uses the same signaling format as shown in the table 8.

FRU_FRAME_LENGTH: This 2-bit field indicates the length of the $(i+1)^{th}$ frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the $(i+1)^{th}$ frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates $C_{total\_partial\_block}$, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates $C_{total\_partial\_block}$, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates $C_{total\_full\_block}$. The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
| --- | --- |
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field.

PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
| --- | --- |
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
| --- | --- |
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
| --- | --- |
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates $P_I$, the number of the frames to which each TI group is mapped, and there is one TI-block per TI group ($N_{TI}=1$). The allowed $P_I$ values with 2-bit field are defined in the below table 18.

If the DP_TI_TYPE is set to the value '0', this field indicates the number of TI-blocks $N_{TI}$ per TI group, and there is one TI group per frame ($P_I=1$). The allowed $P_I$ values with 2-bit field are defined in the below table 18.

TABLE 18

| 2-bit field | $P_I$ | $N_{TI}$ |
| --- | --- | --- |
| 00 | 1 | 1 |
| 01 | 2 | 2 |
| 10 | 4 | 3 |
| 11 | 8 | 4 |

DP_FRAME_INTERVAL: This 2-bit field indicates the frame interval ($I_{JUMP}$) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
| --- | --- |
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
| --- | --- |
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |

TABLE 25-continued

| Value | Header compression mode |
|---|---|
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 15, 16:
FIG. 15 illustrates PLS2 data according to another embodiment of the present invention.
FIG. 16 illustrates a logical structure of a frame according to an embodiment of the present invention.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| PHY profile | DP_START field size | |
|---|---|---|
| | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 17:
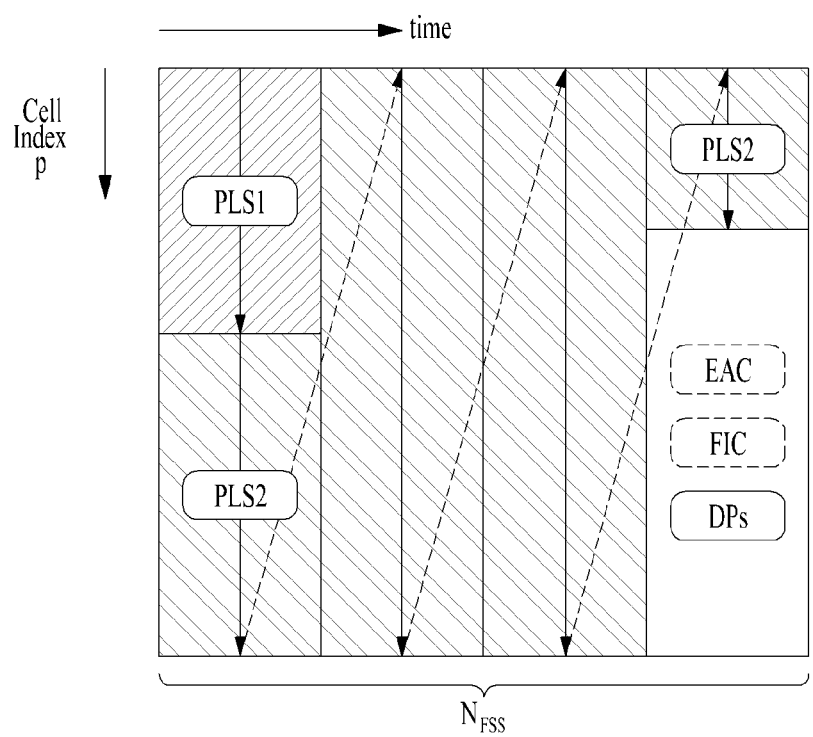
FIG. 17 illustrates PLS mapping according to an embodiment of the present invention.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the $N_{FSS}$ FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 18:
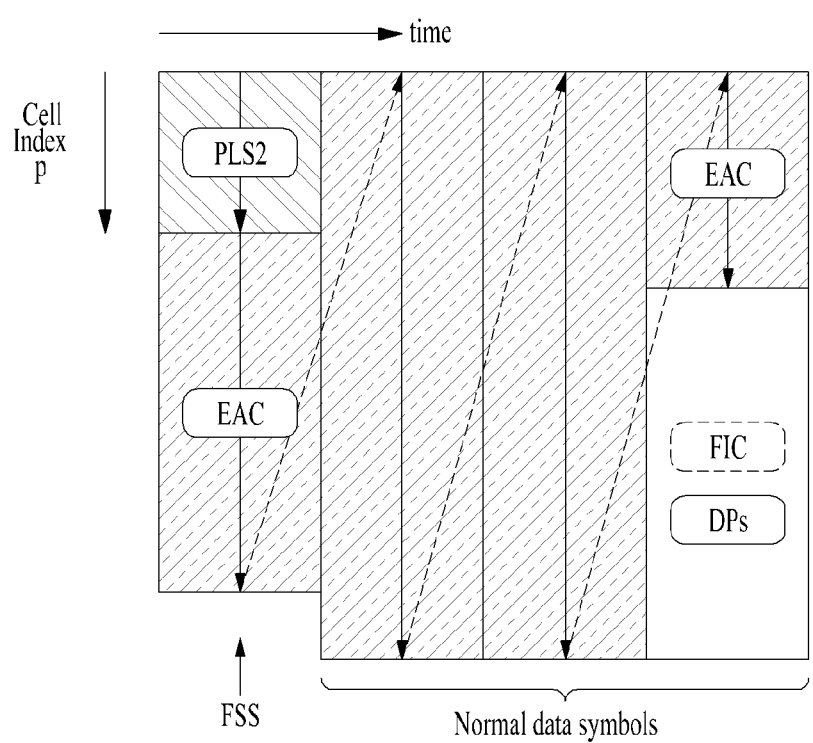
FIG. 18 illustrates EAC mapping according to an embodiment of the present invention.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 19:
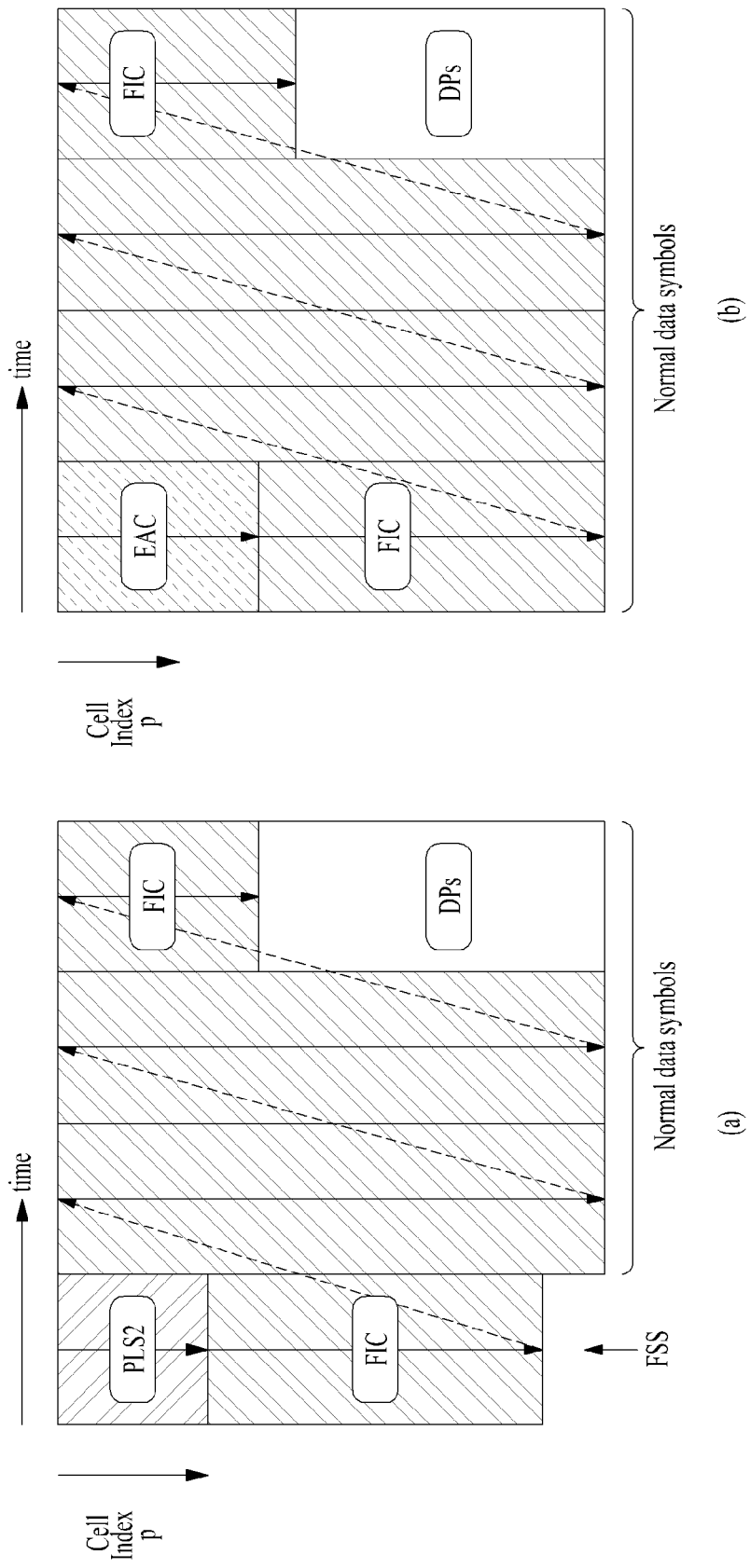
FIG. 19 illustrates FIC mapping according to an embodiment of the present invention.

FIG. 19 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 20:
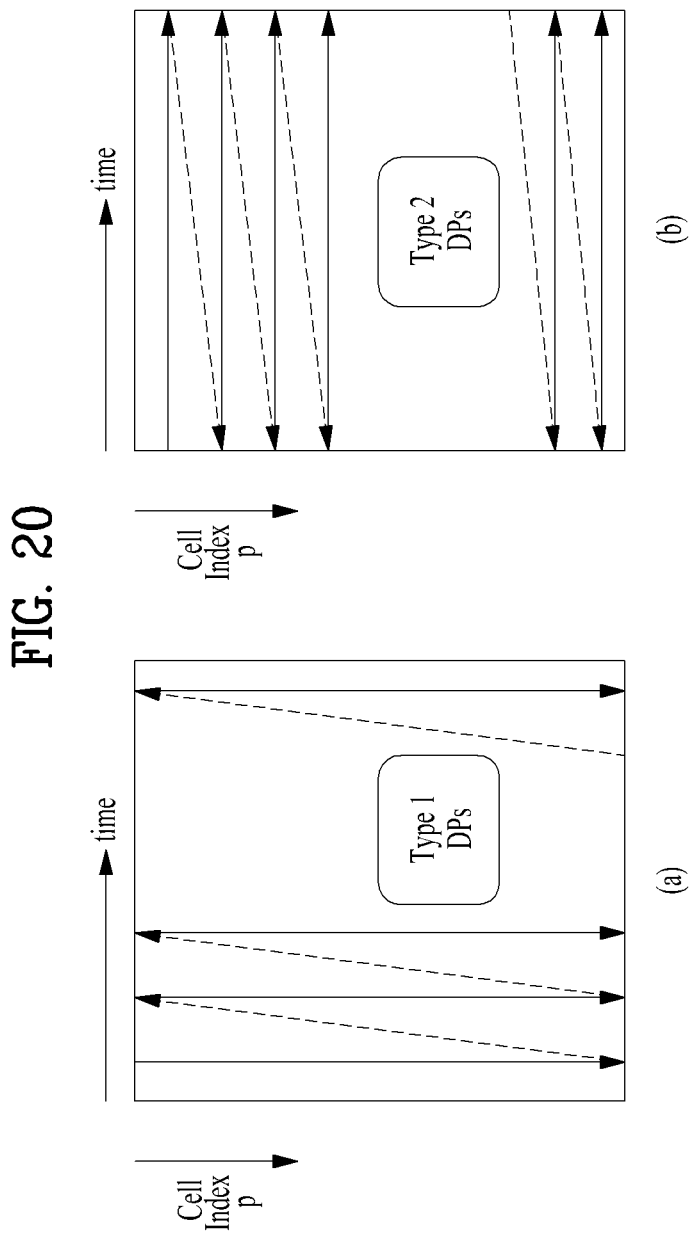
FIG. 20 illustrates a type of DP according to an embodiment of the present invention.

FIG. 20 illustrates a type of DP according to an embodiment of the present invention.

(a) shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2} \leq D_{DP}$$ [Expression 2]

where $D_{DP1}$ is the number of OFDM cells occupied by Type 1 DPs, $D_{DP2}$ is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

Figure 21:
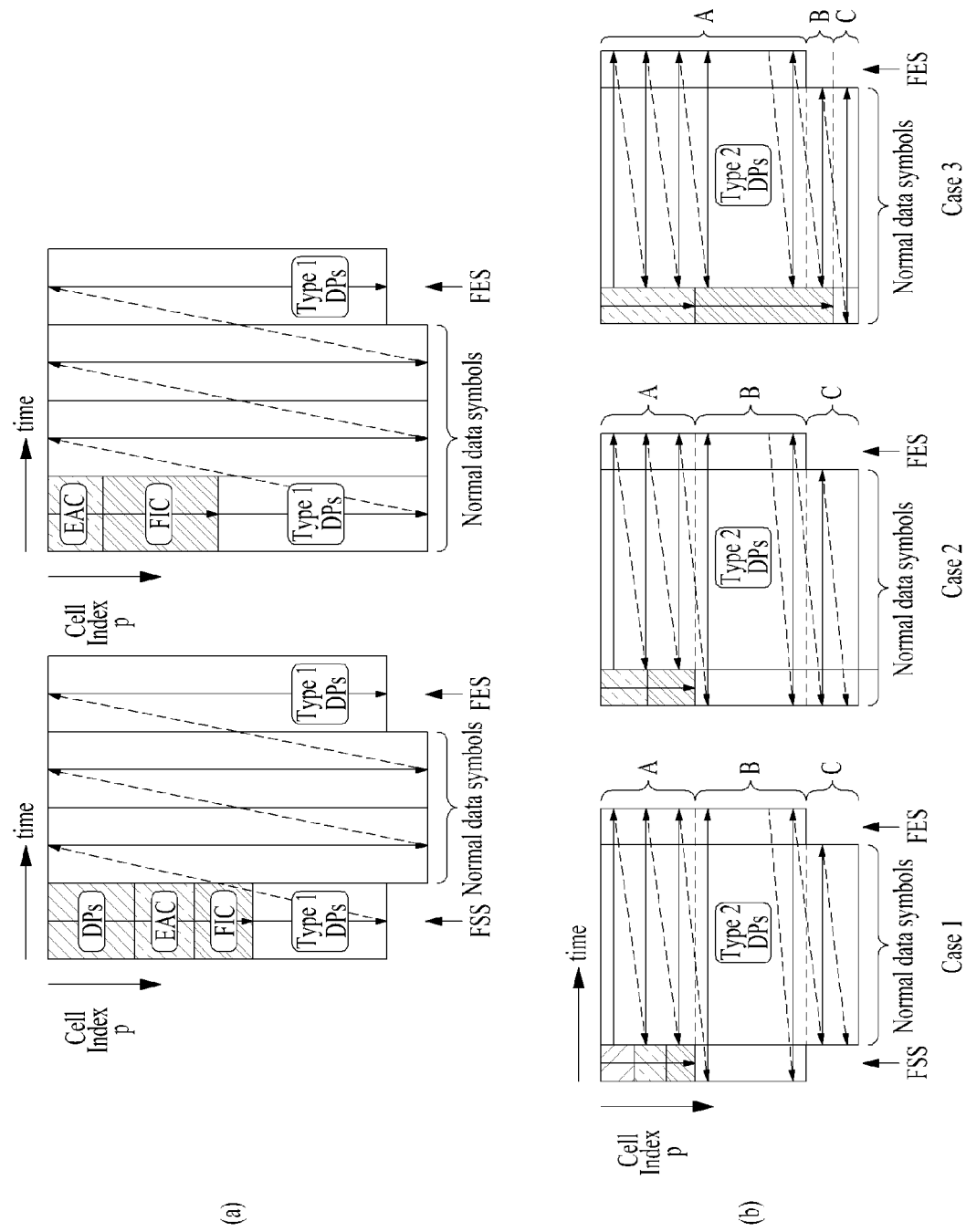
FIG. 21 illustrates DP mapping according to an embodiment of the present invention.

FIG. 21 illustrates DP mapping according to an embodiment of the present invention.

(a) shows an addressing of OFDM cells for mapping type 1 DPs and (b) shows an an addressing of OFDM cells for mapping for type 2 DPs.

Addressing of OFDM cells for mapping Type 1 DPs (0, . . . , $D_{DP1}-1$) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, $D_DP_2-1$) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than $C_{FSS}$. The third case, shown on the right side in (b), is the same as the second case except that the number of FIC cells mapped on that symbol exceeds $C_{FSS}$.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, $N_{cells}$, is dependent on the FECBLOCK size, $N_{ldpc}$, and the number of transmitted bits per constellation symbol. A DPU is defined as the greatest common divisor of all possible values of the number of cells in a XFECBLOCK, $N_{cells}$, supported in a given PHY profile. The length of a DPU in cells is defined as $L_{DPU}$. Since each PHY profile supports different combinations of FECBLOCK size and a different number of bits per constellation symbol, $L_{DPU}$ is defined on a PHY profile basis.

Figure 22:
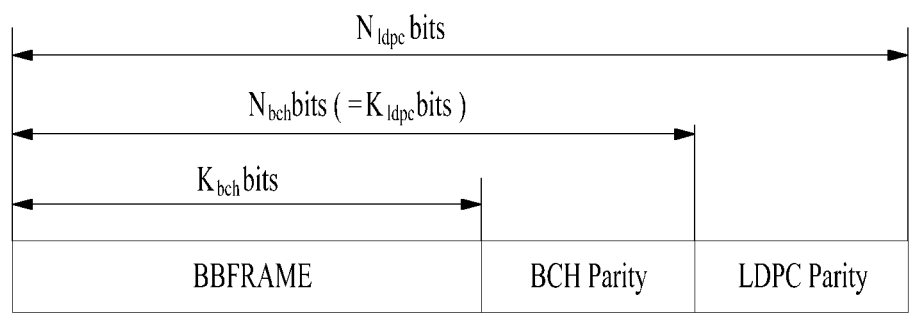
FIG. 22 illustrates an FEC structure according to an embodiment of the present invention.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF ($K_{bch}$ bits), and then LDPC encoding is applied to BCH-encoded BBF ($K_{ldpc}$ bits=$N_{bch}$ bits) as illustrated in FIG. 22.

The value of $N_{ldpc}$ is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed $B_{ldpc}$ (FECBLOCK), $P_{ldpc}$ (parity bits) is encoded systematically from each $I_{ldpc}$ (BCH-encoded BBF), and appended to $I_{ldpc}$. The completed $B_{ldpc}$ (FECBLOCK) are expressed as follow Expression.

$$B_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$  [Expression 3]

The parameters for long FECBLOCK and short FECBLOCK are given in the above table 28 and 29, respectively.

The detailed procedure to calculate $N_{ldpc}-K_{ldpc}$ parity bits for long FECBLOCK, is as follows:

1) Initialize the parity bits, $$p_0 = p_1 = p_2 = \ldots = p_{N_{ldpc}-K_{ldpc}-1} = 0$$ [Expression 4]

2) Accumulate the first information bit-$i_0$, at parity bit addresses specified in the first row of an addresses of parity check matrix. The details of addresses of parity check matrix will be described later. For example, for rate 13/15:

$$p_{983} = p_{983} \oplus i_0 \; p_{2815} = p_{2815} \oplus i_0$$

$$p_{4837} = p_{4837} \oplus i_0 \; p_{4989} = p_{4989} \oplus i_0$$

$$p_{6138} = p_{6138} \oplus i_0 \; p_{6458} = p_{6453} \oplus i_0$$

$$p_{6921} = p_{6921} \oplus i_0 \; p_{6974} = p_{6974} \oplus i_0$$

$$p_{7572} = p_{7572} \oplus i_0 \; p_{8260} = p_{8260} \oplus i_0$$

$$p_{8496} = p_{8496} \oplus i_0$$ [Expression 5]

3) For the next 359 information bits, $i_s$, s=1, 2, . . . , 359 accumulate $i_s$ at parity bit addresses using following Expression.

$$\{x + (s \bmod 360) \times Q_{ldpc}\} \bmod (N_{ldpc} - K_{ldpc})$$ [Expression 6]

where x denotes the address of the parity bit accumulator corresponding to the first bit $i_0$, and $Q_{ldpc}$ is a code rate dependent constant specified in the addresses of parity check matrix. Continuing with the example, $Q_{ldpc}=24$ for rate 13/15, so for information bit $i_1$, the following operations are performed:

$$p_{1007} = p_{1007} \oplus i_1 \; p_{2839} = p_{2839} \oplus i_1$$

$$p_{4861} = p_{4861} \oplus i_1 \; p_{5013} = p_{5013} \oplus i_1$$

$$p_{6162} = p_{6162} \oplus i_1 \; p_{6487} = p_{6482} \oplus i_1$$

$$p_{6945} = p_{6945} \oplus i_1 \; p_{6998} = p_{6998} \oplus i_1$$

$$p_{7596} = p_{7596} \oplus i_1 \; p_{8784} = p_{8284} \oplus i_1$$

$$p_{8520} = p_{8520} \oplus i_1$$ [Expression 7]

4) For the $361^{st}$ information bit $i_{360}$, the addresses of the parity bit accumulators are given in the second row of the addresses of parity check matrix. In a similar manner the addresses of the parity bit accumulators for the following 359 information bits $i_s$, s=361, 362, . . . , 719 are obtained using the Expression 6, where x denotes the address of the parity bit accumulator corresponding to the information bit $i_{360}$, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i = p_i \oplus p_{i-1}, \; i=1, 2, \ldots, N_{ldpc} - K_{ldpc} - 1$$ [Expression 8]

where final content of $p_i$, i=0, 1, . . . , $K_{ldpc}$−1 is equal to the parity bit $p_i$.

TABLE 30

| Code Rate | $Q_{ldpc}$ |
|---|---|
| 5/15 | 120 |
| 6/15 | 108 |
| 7/15 | 96 |

TABLE 30-continued

| Code Rate | $Q_{ldpc}$ |
|---|---|
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 23:
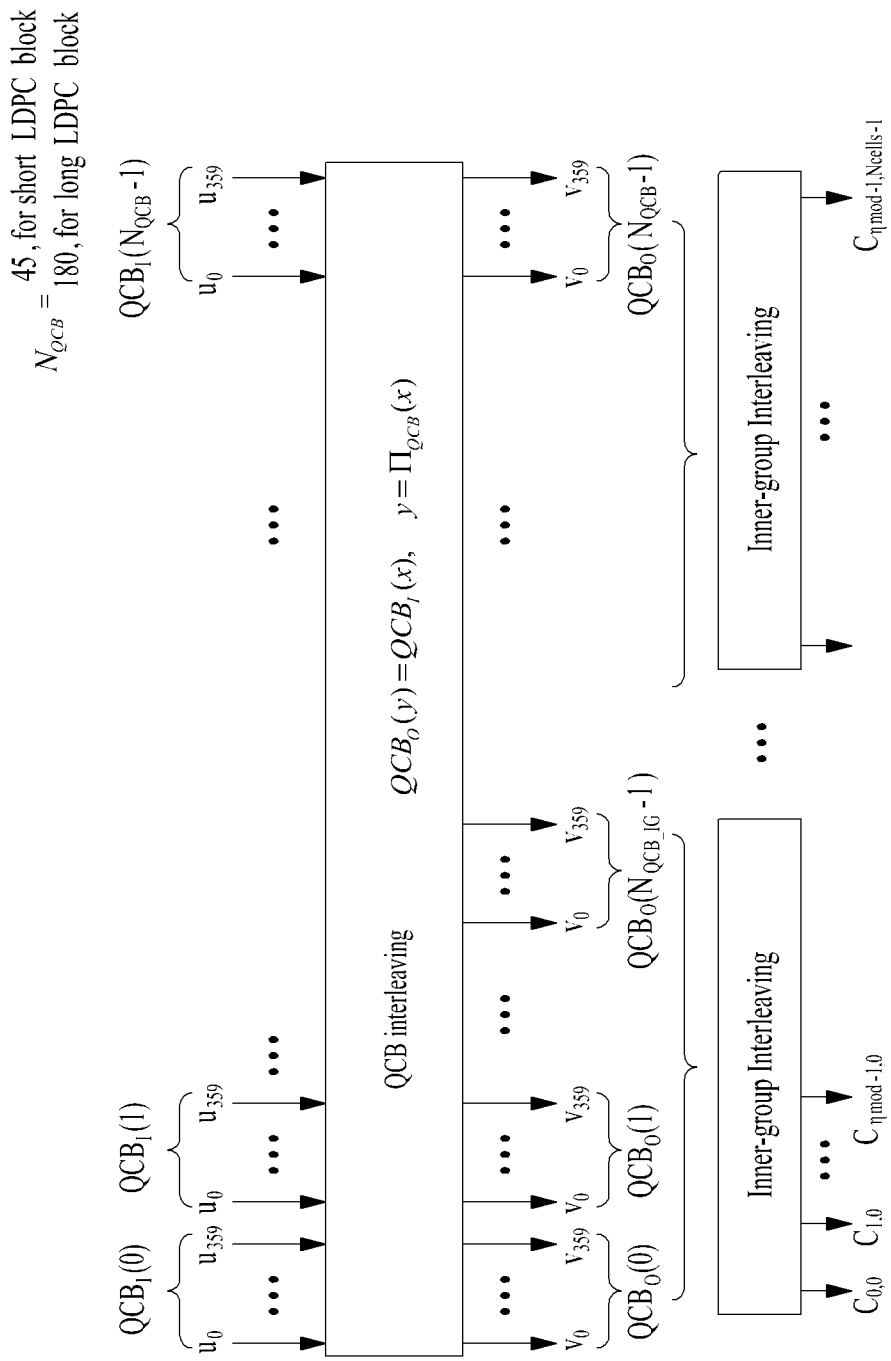
FIG. 23 illustrates a bit interleaving according to an embodiment of the present invention.

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

(a) shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where $N_{cells}=64800/\eta_{mod}$ or $16200/\eta_{mod}$ according to the FECBLOCK length. The QCB interleaving pattern is unique to each combination of modulation type and LDPC code rate.

After QCB interleaving, inner-group interleaving is performed according to modulation type and order ($\eta_{mod}$) which is defined in the below table 32. The number of QC blocks for one inner-group, $N_{QCB\_IG}$, is also defined.

TABLE 32

| Modulation type | $\eta_{mod}$ | $N_{QCB\_IG}$ |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |

TABLE 32-continued

| Modulation type | $\eta_{mod}$ | $N_{QCB\_IG}$ |
|---|---|---|
| NUC-256 | 8 | 8 |
| NUQ-1024 | 10 | 5 |
| NUC-1024 | 10 | 10 |

The inner-group interleaving process is performed with $N_{QCB\_IG}$ QC blocks of the QCB interleaving output. Inner-group interleaving has a process of writing and reading the bits of the inner-group using 360 columns and $N_{QCB\_IG}$ rows. In the write operation, the bits from the QCB interleaving output are written row-wise. The read operation is performed column-wise to read out m bits from each row, where m is equal to 1 for NUC and 2 for NUQ.

Figure 24:
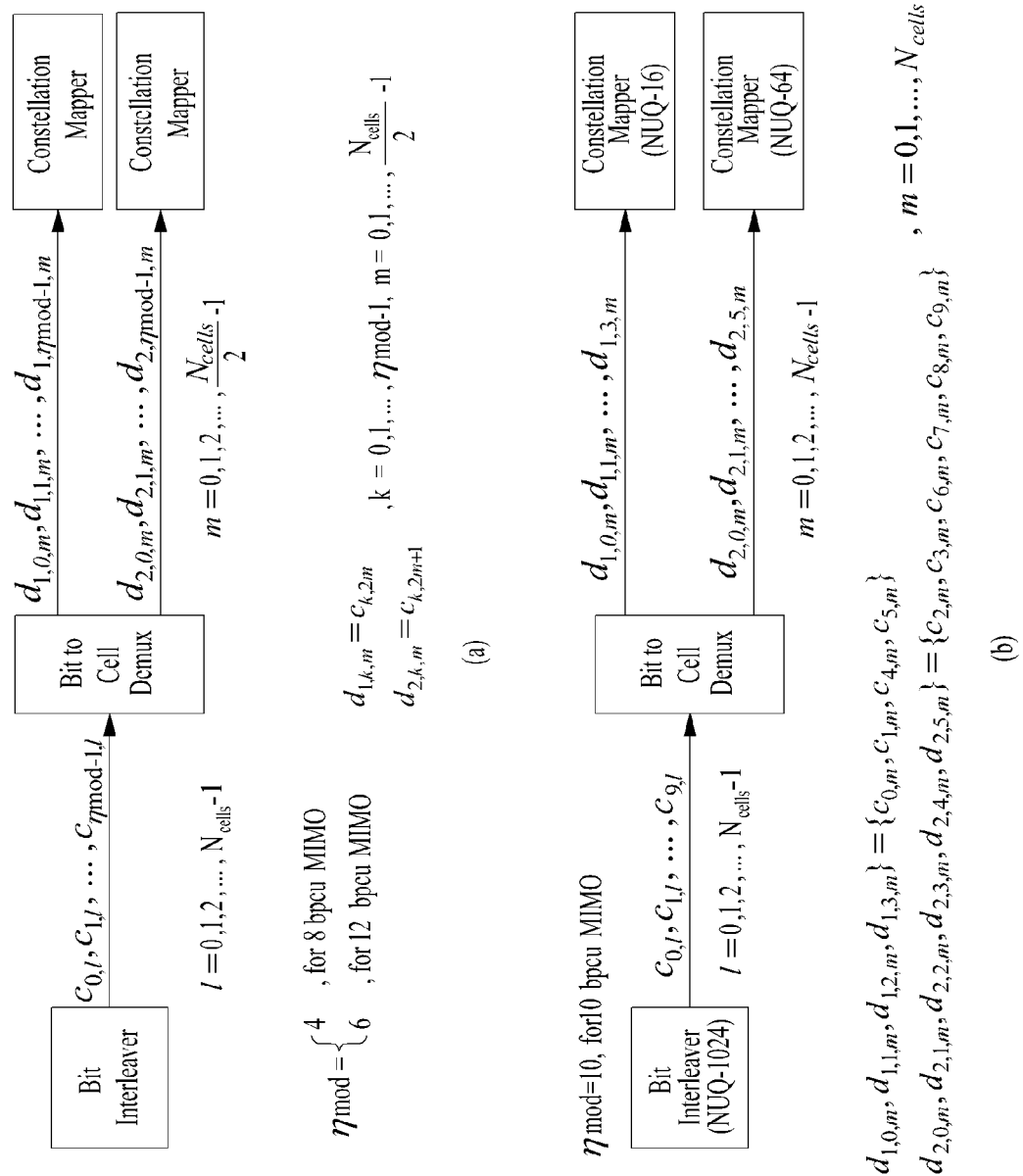
FIG. 24 illustrates a cell-word demultiplexing according to an embodiment of the present invention.

FIG. 24 illustrates a cell-word demultiplexing according to an embodiment of the present invention.

(a) shows a cell-word demultiplexing for 8 and 12 bpcu MIMO and (b) shows a cell-word demultiplexing for 10 bpcu MIMO.

Each cell word $(c_{0,l}, c_{1,l}, \ldots, c_{\eta mod-1,l})$ of the bit interleaving output is demultiplexed into $(d_{1,0,m}, d_{1,1,m} \ldots, d_{1,\eta mod-1, m})$ and $(d_{2,0,m}, d_{2,1,m} \ldots, d_{2,\eta mod-1,m})$ as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word $(c_{0,l}, c_{1,l}, \ldots, c_{9,l})$ of the Bit Interleaver output is demultiplexed into $(d_{1,0,m}, d_{1,1,m} \ldots, d_{1,3,m})$ and $(d_{2,0,m}, d_{2,1,m} \ldots, d_{2,5,m})$, as shown in (b).

Figure 25:
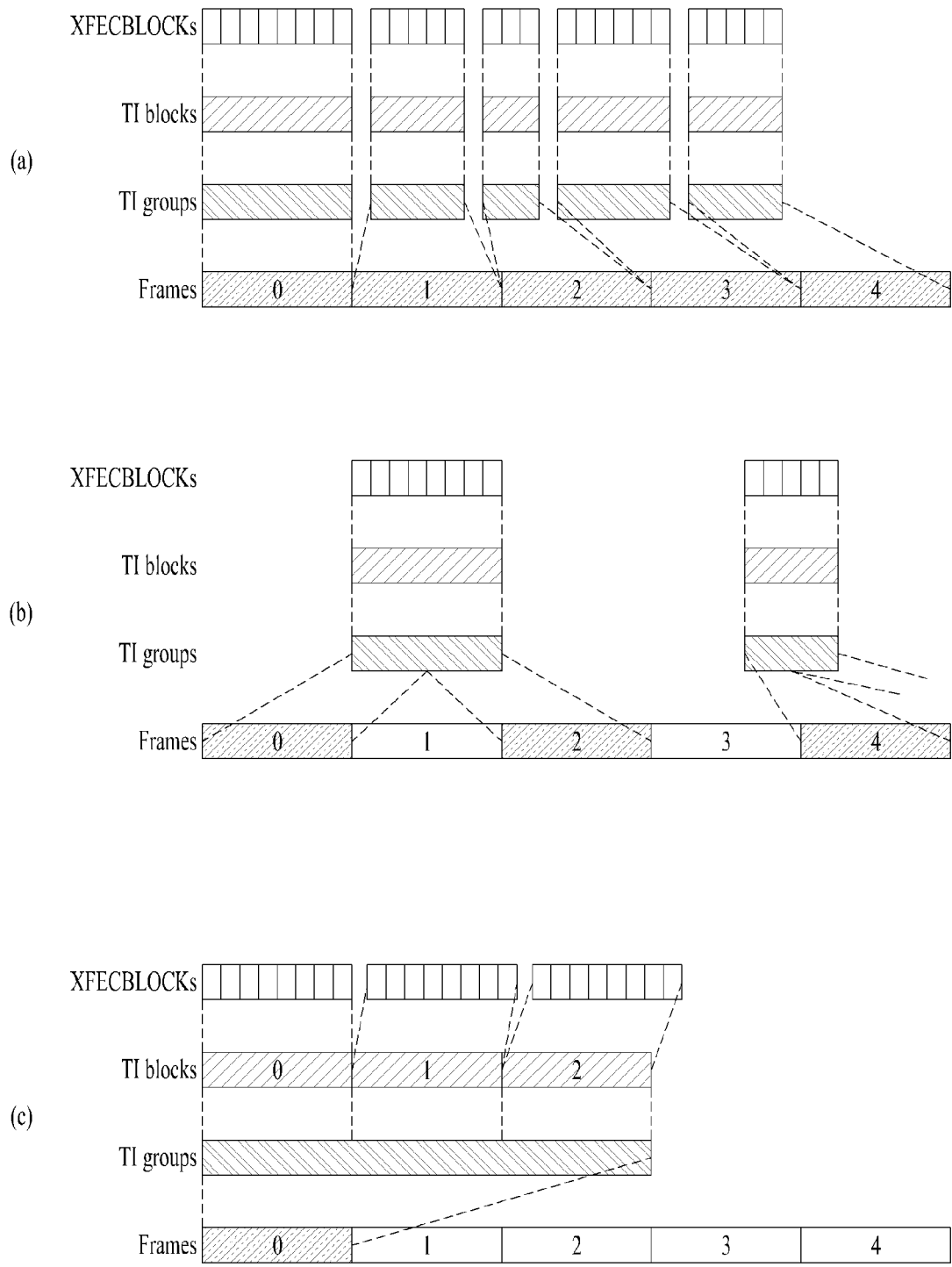
FIG. 25 illustrates a time interleaving according to an embodiment of the present invention.

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames $P_i$ spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames $L_{jump}$ between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from the minimum value of 0 to the maximum value $N_{xBLOCK\_Group\_MAX}$ (corresponding to DP_NUM_BLOCK_MAX) of which the largest value is 1023.

Each TI group is either mapped directly onto one frame or spread over $P_I$ frames. Each TI group is also divided into more than one TI blocks ($N_{TI}$), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

In each DP, the TI memory stores the input XFECBLOCKs (output XFECBLOCKs from the SSD/MIMO encoding block). Assume that input XFECBLOCKs are defined as $(d_{n,s,0,0}, d_{n,s,0,1}, \ldots, d_{n,s,0,N_{cells}-1}, d_{n,s,1,0}, \ldots, d_{n,s,1,N_{cells}-1}, \ldots, d_{n,s,N_{xBLOCK\_TI}(n,s)-1,0}, \ldots, d_{n,s,N_{xBLOCK\_TI}(n,s)-1,N_{cells}-1})$, where $d_{n,s,r,q}$ is the qth cell of the rth XFECBLOCK in the sth TI block of the nth TI group and represents the outputs of SSD and MIMO encodings as follows. dn,s,r,q=
$\{ g_{n,s,r,q}$, the output of MIMO encoding
$f_{n,s,r,q}$, the output of SSD encoding In addition, assume that output XFECBLOCKs from the time interleaver are defined as $(h_{n,s,0}, h_{n,s,1}, \ldots, h_{n,s,i}, \ldots h_{n,s,N_{xBLOCK\_TI}(n,s) \times N_{cells}-1})$ where $h_{n,s,i}$ is the ith output cell (for i=0, ..., $N_{xBLOCK\_TI}$(n,s)×$N_{cells}$−1) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}$ (n,s).

Figure 26:
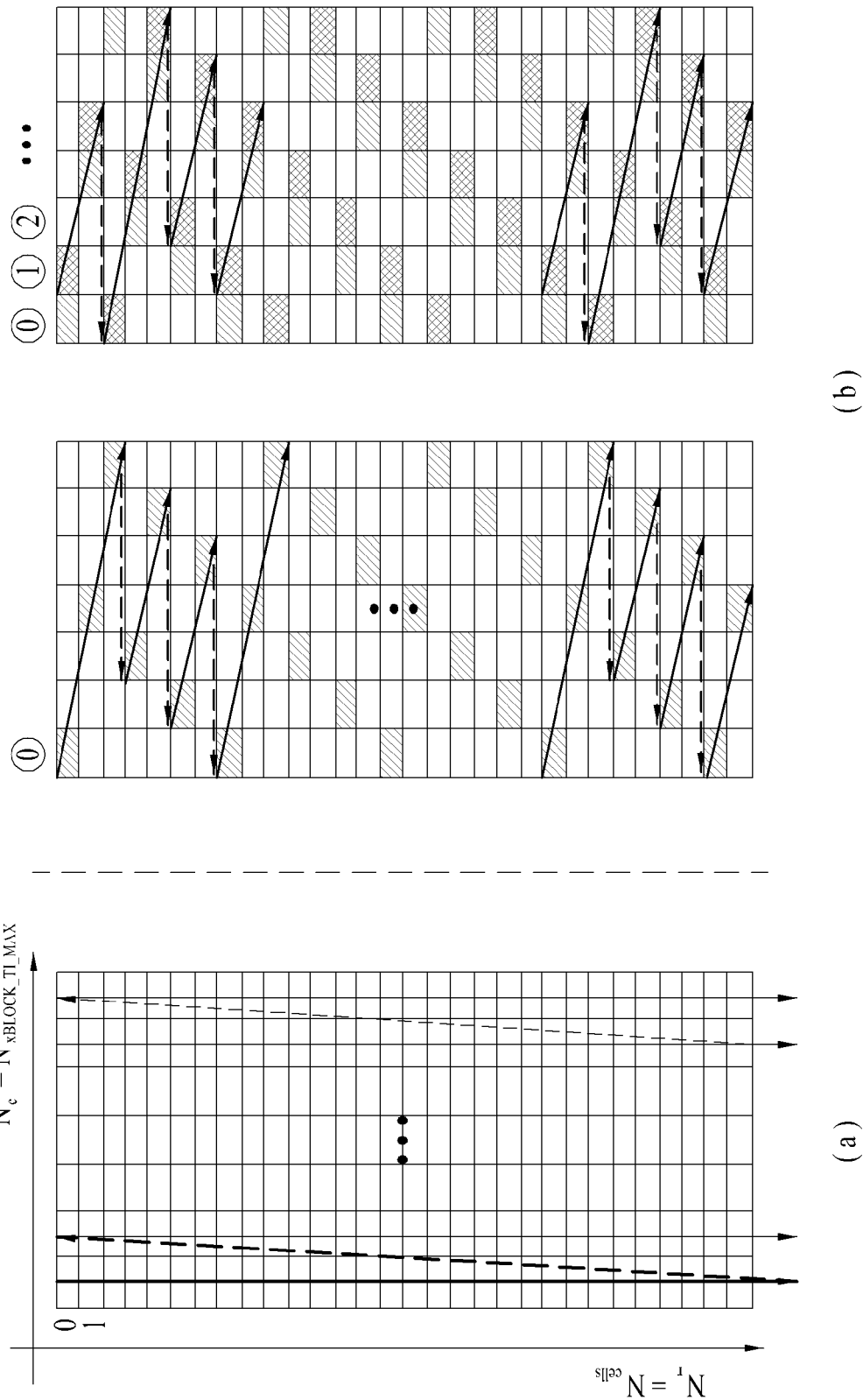
FIG. 26 illustrates the basic operation of a twisted row-column block interleaver according to an embodiment of the present invention.

FIG. 26 illustrates the basic operation of a twisted row-column block interleaver according to an embodiment of the present invention.

shows a writing operation in the time interleaver and (b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (i=0, . . . , $N_r N_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows expression.

$$\text{GENERATE}(R_{n,s,i}, C_{n,s,i}) = \quad \text{[Expression 9]}$$
$$\{$$
$$R_{n,s,i} = \text{mod}(i, N_r),$$
$$T_{n,s,i} = \text{mod}(S_{shift} \times R_{n,s,i}, N_c),$$
$$C_{n,s,i} = \text{mod}\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}$ (n, s) and it is determined by $N_{xBLOCK\_TI\_MAX}$ given in the PLS2-STAT as follows expression.

$$\text{for} \begin{cases} N'_{xBLOCK\_TI\_MAX} = N_{xBLOCK\_TI\_MAX} + 1, & \text{if } N_{xBLOCK\_TI\_MAX} \text{mod} 2 = 0 \\ N'_{xBLOCK\_TI\_MAX} = N_{xBLOCK\_TI\_MAX}, & \text{if } N_{xBLOCK\_TI\_MAX} \text{mod} 2 = 1 \end{cases} \quad \text{[Expression 10]}$$

$$S_{shift} = \frac{N'_{xBLOCK\_TI\_MAX} - 1}{2}$$

As a result, the cell positions to be read are calculated by a coordinate as

Figure 27:
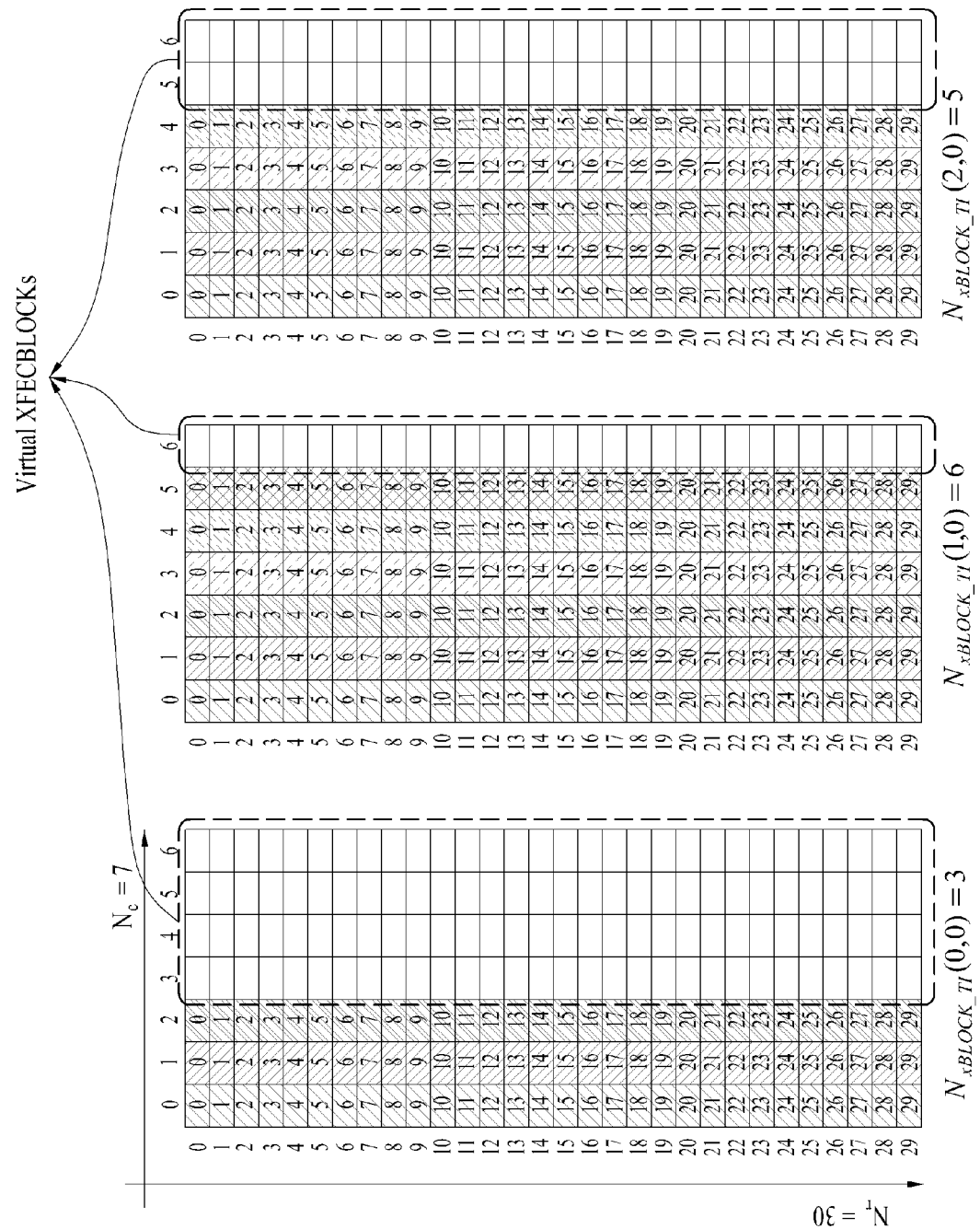
FIG. 27 illustrates an operation of a twisted row-column block interleaver according to another embodiment of the present invention.

FIG. 27 illustrates an operation of a twisted row-column block interleaver according to another embodiment of the present invention.

More specifically, FIG. 27 illustrates the interleaving array in the TI memory for each TI group, including virtual XFECBLOCKs when $N_{xBLOCK\_TI}$ (0, 0)=3, $N_{xBLOCK\_TI}$ (1,0)=6, $N_{xBLOCK\_TI}$ (2,0)=5.

The variable number $N_{xBLOCK\_TI}$(n, s)=$N_r$ will be less than or equal to $N'_{xBLOCK\_TI\_MAX}$. Thus, in order to achieve a single-memory deinterleaving at the receiver side, regardless of $N_{xBLOCK\_TI}(n, s)$, the interleaving array for use in a twisted row-column block interleaver is set to the size of $N_r \times N_c = N_{cells} \times N'_{xBLOCK\_TI\_MAX}$ by inserting the virtual XFECBLOCKs into the TI memory and the reading process is accomplished as follow expression.

```
p = 0;                                                    [Expression 11]
for i = 0;i < N_cells N'_xBLOCK_TI_MAX; i = i + 1
{GENERATE (R_n,s,i, C_n,s,i);
V_i = N_r C_n,s,j + R_n,s,j
  if V_i < N_cells N_xBLOCK_TI(n,s)
  {
    Z_n,s,p = V_i; p = p + 1;
  }
}
```

The number of TI groups is set to 3. The option of time interleaver is signaled in the PLS2-STAT data by DP_TI_TYPE='0', DP_FRAME_INTERVAL='1', and DP_TI_LENGTH='1', $I_{JUMP}$=1, and $P_I$=1. The number of XFECBLOCKs, each of which has $N_{cells}$=30 cells, per TI group is signaled in the PLS2-DYN data by $N_{xBLOCK\_TI}(0, 0)$=3, $N_{xBLOCK\_TI}(1,0)$=6, and $N_{xBLOCK\_TI}(2,0)$=5, respectively. The maximum number of XFECBLOCK is signaled in the PLS2-STAT data by $N_{xBLOCK\_Group\_MAX}$, which leads to $\lfloor N_{xBLOCK\_Group\_MAX}/N_{TI}\rfloor = N_{xBLOCK\_TI\_MAX}$=6.

Figure 28:
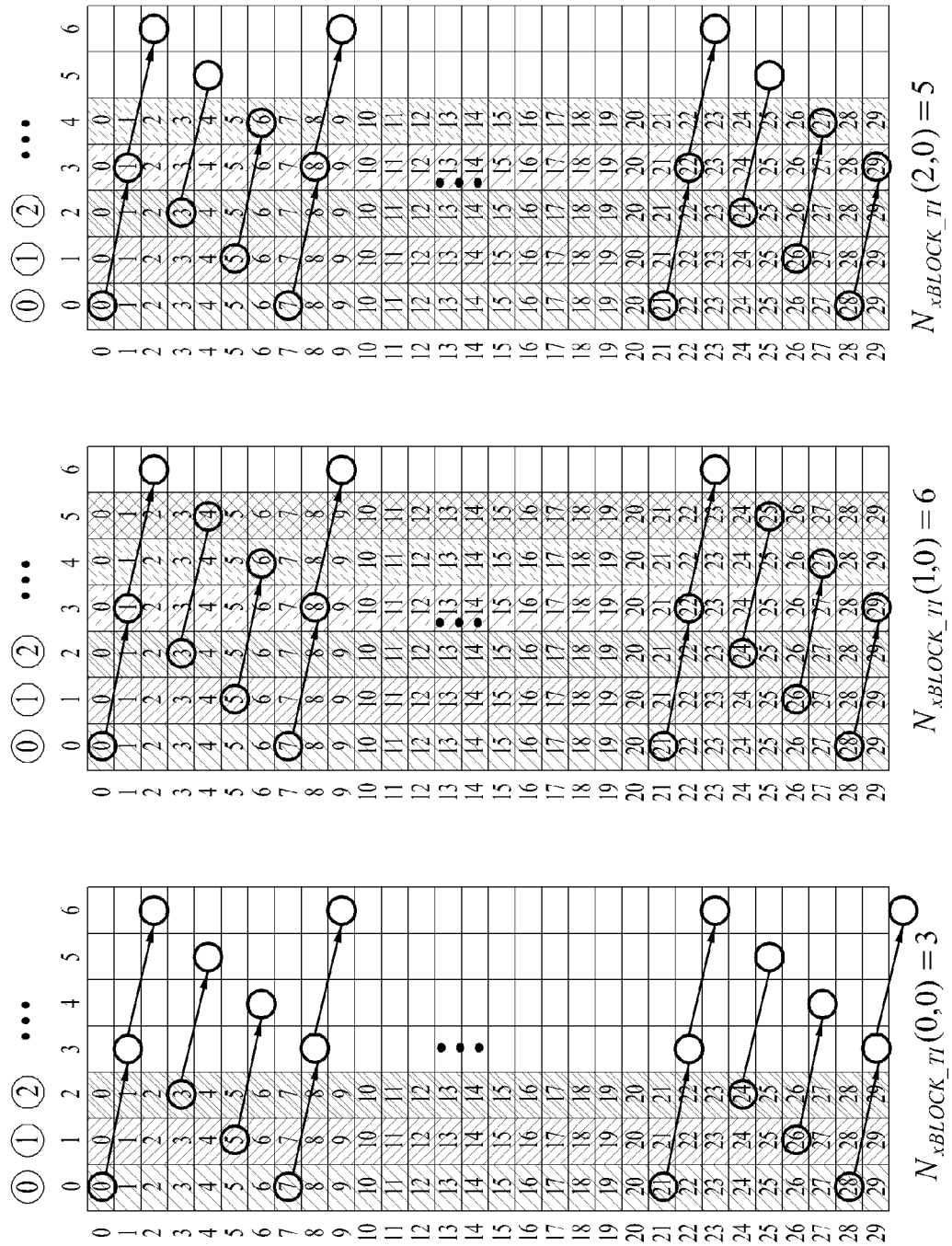
FIG. 28 illustrates a diagonal-wise reading pattern of a twisted row-column block interleaver according to an embodiment of the present invention.

FIG. 28 illustrates a diagonal-wise reading pattern of a twisted row-column block interleaver according to an embodiment of the present invention.

More specifically FIG. 28 shows a diagonal-wise reading pattern from each interleaving array with parameters of $N'_{xBLOCK\_TI\_MAX}$=7 and $S_{Shift}$=(7−1)/2=3. Note that in the reading process shown as pseudocode above, if $V_i \geq N_{cells} N_{xBLOCK\_TI}(n,s)$ the value of $V_i$ is skipped and the next calculated value of $V_i$ is used.

Figure 29:
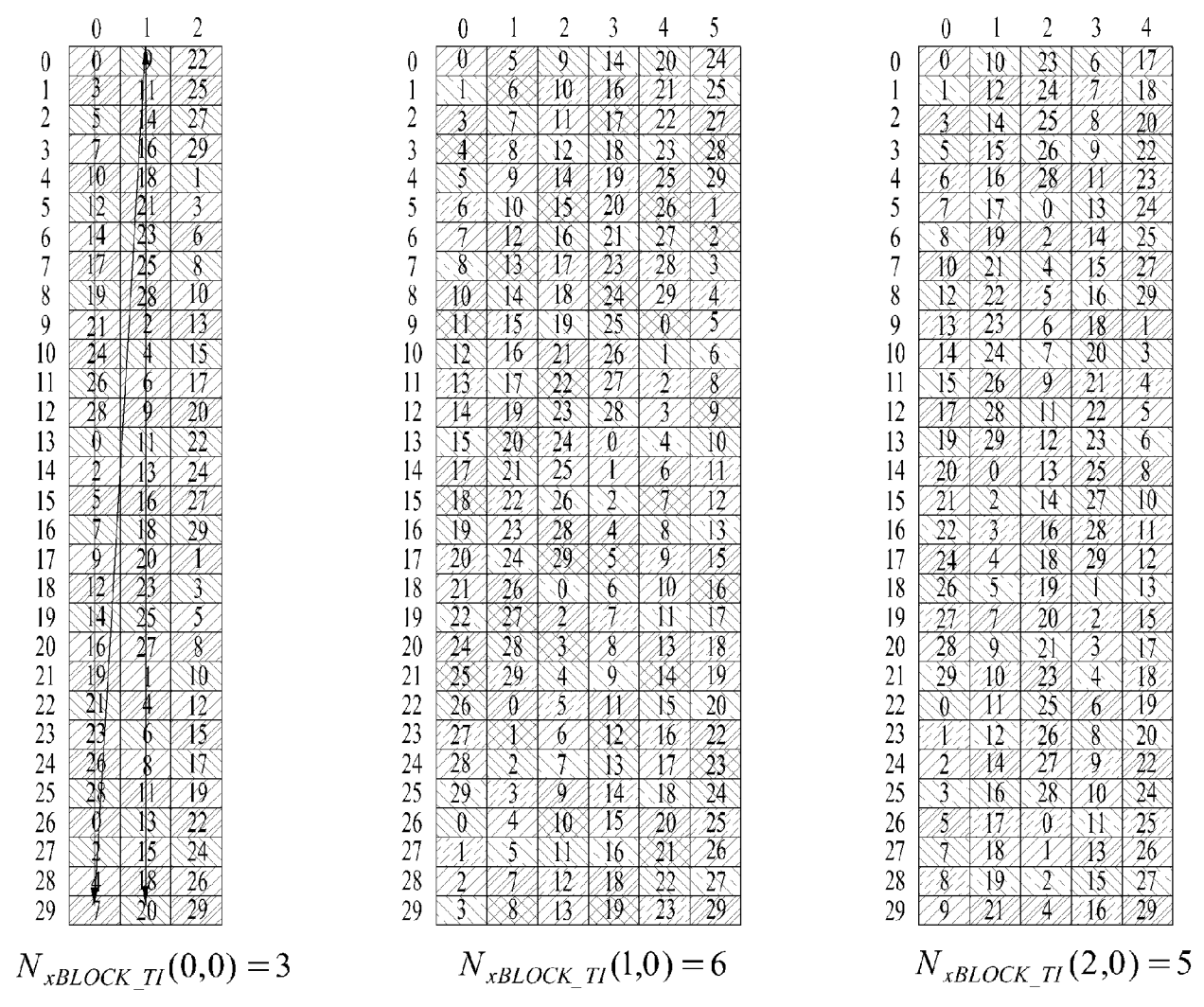

FIG. 29 illustrates interlaved XFECBLOCKs from each interleaving array according to an embodiment of the present invention.

FIG. 29 illustrates the interleaved XFECBLOCKs from each interleaving array with parameters of $N'_{xBLOCK\_TI\_MAX}$=7 and $S_{shift}$=3.

Figure 30:
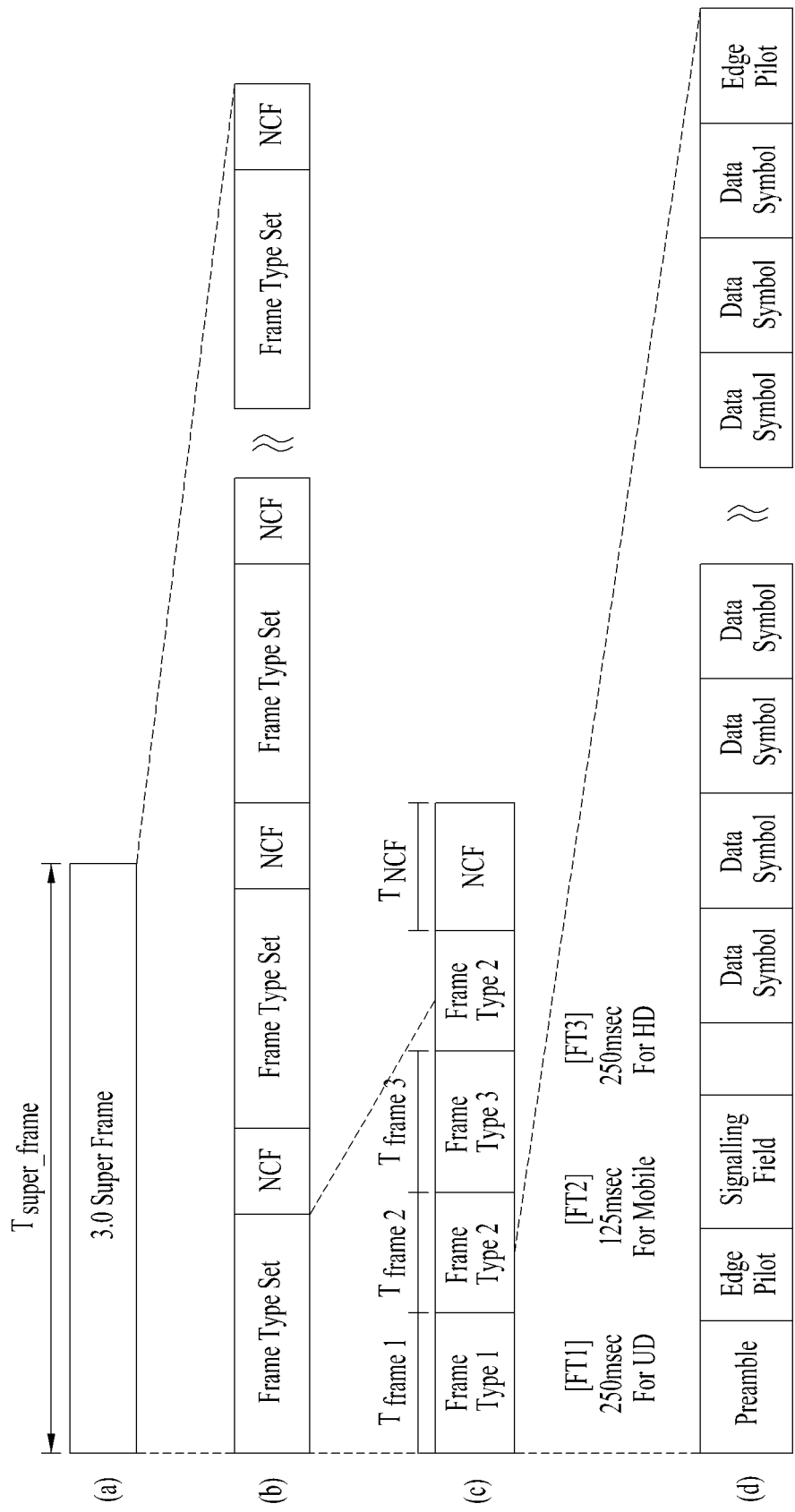
FIG. 30 illustrates a frame structure of a broadcast system according to an embodiment of the present invention.

FIG. 30 illustrates a frame structure of a broadcast system according to an embodiment of the present invention.

A cell mapper included in the aforementioned frame structure module may arrange cells transmitting input DP data processed according to SISO, MISO or MIMO, cells transmitting common DP and cells transmitting PLS data in a signal frame according to scheduling information. Then, generated signal frames may be continuously transmitted.

A broadcast signal transmission apparatus and method according to an embodiment of the present invention can multiplex different signals of a broadcast transmission/reception system in the same RF channel and transmit the multiplexed signals and a broadcast signal reception apparatus and method according to an embodiment of the present invention can process the signals. Accordingly, the present invention can provide a flexible broadcast transmission/reception system.

The broadcast signal transmission apparatus according to an embodiment of the present invention can continuously transmit a plurality of superframes carrying data related to a broadcast service.

FIG. 30(a) illustrates a superframe according to an embodiment of the present invention. The duration of the superframe can be represented by Tsuper_frame. As shown in FIG. 30(b), the superframe may include a plurality of frame type sets and non-compatible frames (NCFs). A signal frame according to an embodiment of the present invention is a TDM (Time Division Multiplexing) signal frame at a physical layer, generated in the aforementioned frame structure module, and the NCF is a frame that can be used for new broadcast service systems in future.

The superframe according to an embodiment of the present invention may include 8 frame type sets. A frame type set may be referred to as a frame repetition unit (FRU). The FRU is a basic multiplexing unit for TDM of a signal frame.

FIG. 30(c) illustrates a configuration of the frame type set according to an embodiment of the present invention. Each frame type set may include a plurality of frames.

Signal frames according to an embodiment of the present invention can transmit different services. Each signal frame according to an embodiment of the present invention transmits one of UD (Ultra high Definition) service, mobile service or HD (High Definition) service. Signal frames have different durations Tframe1, Tframe2, and Tframe3 depending on transmitted services. As shown in FIG. 30, a signal frame transmitting UD service may be referred to as frame type 1 having a duration of 250 msec. A signal frame transmitting mobile service may be referred to as frame type 2 having a duration of 125 msec. A signal frame transmitting HD service may be referred to as frame type 3 having a duration of 250 msec.

The names of signal frames, types of services transmitted by the signal frames and durations of the signal frames, suggested in the present invention, are exemplary and may be changed according to designer.

The signal frame according to an embodiment of the present invention may transmit data for one of a base profile, handheld profile and advanced profile. That is, data corresponding to each profile can be transmitted on a signal frame basis. The broadcast signal reception apparatus may identify each profile according to a received signal frame and obtain a broadcast service suitable therefor. One frame type set may include a plurality of signal frames corresponding to the same profile. This may be changed according to designer.

FIG. 30(d) illustrates a configuration of each signal frame. Each signal frame may include a preamble, edge pilot, signaling field and a plurality of data symbols. This configuration may be changed according to designer.

The preamble is located at the head of the signal frame and may carry basic transmission parameters for identifying a broadcast system and type of each signal frame, information for synchronization of the time domain and frequency domain, information related to EAS (Emergency Alert System) messages (or EAC messages) and the like. The broadcast signal reception apparatus according to an embodiment of the present invention can perform frame synchronization since the broadcast signal reception apparatus can detect the preamble to acquire the frame start point.

The preamble according to an embodiment of the present invention is a basic transmission parameter and may include type of profile transmitted through a signal frame, FFT size, guard interval length, pilot pattern, etc.

Accordingly, the broadcast signal reception apparatus according to an embodiment of the present invention can identify the corresponding broadcast system and frame type by detecting the preamble of the signal frame first and selectively receive and decode a broadcast signal corresponding to receiver type.

That is, even when a broadcast signal in which frames including various broadcast services such as UHD, mobile and MISO/MIMSO services are multiplexed is received through the one RF, the broadcast signal reception apparatus according to an embodiment of the present invention can obtain information of the corresponding frames by decoding preambles of the frames.

Edge symbols may be located after the preamble of each signal frame or at the end of each signal frame. Names, positions and number of edge symbols may be changed according to designer. Edge symbols may be inserted into each signal frame to support freedom of preamble design and multiplexing of signal frames of different types. An edge symbol may include a larger number of pilots than a data symbol to enable frequency-only interpolation and time interpolation between data symbols. Accordingly, a pilot pattern of the edge symbol has higher density than a data symbol pilot pattern.

The signaling field is a field for transmitting the aforementioned PLS data and may include additional system information (network topology/configuration, PAPR use and the like) and frame type UD/configuration information and information necessary to extract and decode each DP.

A data symbol is used to transmit DP data. The aforementioned cell mapper can arrange a plurality of DPs in the data symbol.

The present invention suggests a normal preamble and a robust preamble as a preamble structure in the time domain and frequency domain and a method for signaling an EAS related signal through a preamble.

The broadcast signal transmission apparatus according to an embodiment of the present invention may insert a preamble structure depending on a target SNR of a service to be provided into a signal frame. The robust preamble according to an embodiment of the present invention, which will be described later, has excellent detection performance even in a low SNR environment but may generate unnecessary overhead in a receiver since an FFT size and guard interval increase. Accordingly, the broadcast signal transmission apparatus according to an embodiment of the present invention can insert the normal preamble into a signal frame transmitted in a high SNR environment and insert the robust preamble into a signal frame transmitted in a low SNR environment.

The above-described three profiles can be defined as broadcast signal transmission/reception scenarios for providing services corresponding to different reception environments. Accordingly, the broadcast signal transmission apparatus according to an embodiment of the present invention can insert the normal preamble or the robust preamble according to a profile transmitted through a signal frame.

A description will be given of generation processes, structures and signaling information of the normal preamble and the robust preamble according to an embodiment of the present invention.

Figure 31:
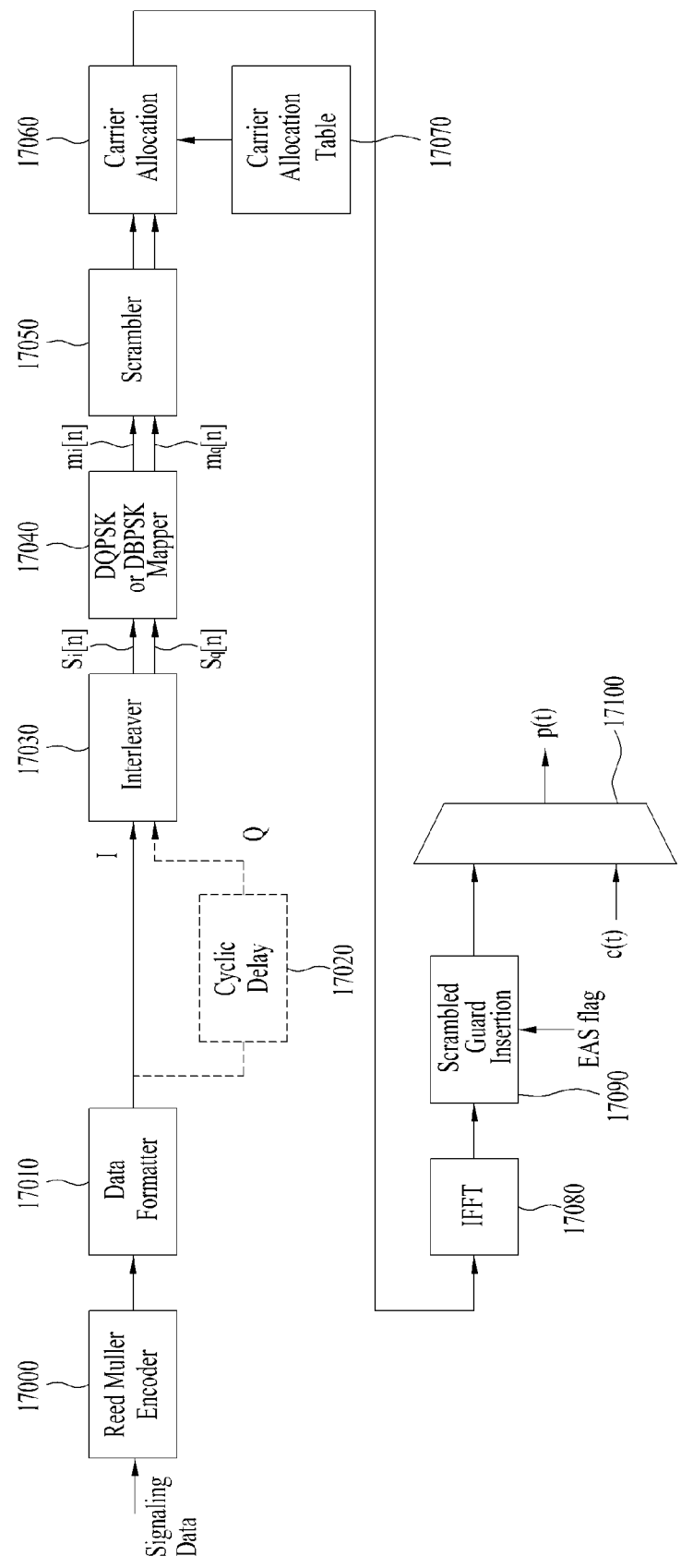
FIG. 31 illustrates a preamble insertion block according to an embodiment of the present invention.

FIG. 31 illustrates a preamble insertion block according to an embodiment of the present invention.

FIG. 31 shows another embodiment of the preamble insertion block 7500 described above. As shown in FIG. 31, the preamble insertion block according to an embodiment of the present invention may include a Reed Muller encoder 17000, a data formatter 17010, a cyclic delay block 17020, an interleaver 17030, a DQPSK (Differential Quadrature Phase Shift Keying)/DBPSK (Differential Binary Phase Shift Keying) mapper 17040, a scrambler 17050, a carrier allocation block 17060, a carrier allocation table block 17070, an IFFT block 17080, a scrambled guard insertion block 17090 and a multiplexing block 17100. Each block may be modified according to designer or may not be included in the preamble insertion block. A description will be given of operation of each block.

The Reed Muller encoder 17000 may receive signaling information to be transmitted through a preamble and perform Reed Muller encoding of the input signaling information. When Reed Muller encoding is performed, signaling performance can be improved over conventional signaling using an orthogonal sequence.

The data formatter 17010 may receive bits of the Reed-Muller-encoded signaling information and perform formatting for repeating and arranging the input bits.

The DQPSK/DBPSK mapper 17040 may map the formatted signaling information bits according to DBPSK or DQPSK and output the mapped signaling information.

When the DQPSK/DBPSK mapper 17040 maps the formatted signaling information bits according to DBPSK, the operation of the cyclic delay block 17020 may be skipped. The interleaver 17030 may receive the formatted signaling information bits, frequency-interleave the formatted signaling information bits and output interleaved data. In this case, the operation of the interleaver 17030 may be omitted according to designer.

When the DQPSK/DBPSK mapper 17040 maps the formatted signaling information bits according to DQPSK, the data formatter 17010 may output the formatted signaling information bits to the interleaver 17030 through a path I shown in FIG. 31. The cyclic delay block 17020 may cyclic-delay the formatted signaling information bits output from the data formatter 17010 and then output the delayed signaling information bits to the interleaver 17030 through a path Q shown in FIG. 31. When cyclic Q-delay is performed, performance in a frequency selective fading channel is improved.

The interleaver 17030 may perform frequency interleaving on the signaling information and cyclic Q-delayed signal information, input through the path I and path Q, and output interleaved information. In this case, the operation of the interleaver 17030 may be omitted according to designer.

The scrambler 17050 may receive the mapped signaling information output from the DQPSK/DBPSK mapper 17040 and multiply the signaling information by a scrambling sequence.

The carrier allocation block 17060 may arrange the signaling information processed by the scrambler 17050 in a predetermined carrier position using position information output from the carrier allocation table block 17070.

The IFFT block 17080 may transform carriers output from the carrier allocation block 17060 into an OFDM signal of the time domain.

The scrambled guard insertion block 17090 may insert a scrambled guard interval into the OFDM signal to generate a preamble. The scrambled guard insertion block 17090 according to an embodiment of the present invention may generate the scrambled guard interval by multiplying a guard interval in the form of a cyclic prefix by a scrambling sequence. The scrambled guard interval will be described later in detail. In the present invention, the scrambled guard interval can be referred to as a scrambled GI.

The scrambled guard insertion block 17090 may select the scrambling sequence according to whether an EAS message is inserted. The scrambled guard insertion block 17090 may determine whether to insert the EAS message using EAS flag information that indicates whether the EAS message is present in the preamble.

The multiplexing block 17100 may multiplex the output of the scrambled guard insertion block 17090 and a signal c(t) output from the guard sequence insertion block 7400 to output an output signal p(t). The output signal p(t) may be input to the waveform processing block 7600 described above.

The preamble insertion block according to an embodiment of the present invention can improve signaling performance over conventional signaling using an orthogonal sequence by performing Reed Muller encoding and enhance performance in a frequency selective fading channel by performing cyclic Q-delay.

FIG. 32 shows mathematical expressions representing relationships between input information and output information or mapping rules of the DQPSK/DBPSK mapper 17040 according to an embodiment of the present invention.

FIG. 32(*a*) shows mathematical expressions representing a relationship between input information and output information or a mapping rule when the DQPSK/DBPSK mapper 17040 according to an embodiment of the present invention maps the input signaling information according to DBPSK.

FIG. 32(*b*) shows mathematical expressions representing a relationship between input information and output information or a mapping rule when the DQPSK/DBPSK mapper 17040 according to an embodiment of the present invention maps the input signaling information according to DQPSK.

As shown in FIG. 32, the input information of the DQPSK/DBPSK mapper 17040 may be represented as si[n] and sq[n] and the output information of the DQPSK/DBPSK mapper 17040 may be represented as mi[n] and mq[n] for convenience of description.

FIG. 33 illustrates preamble structures according to an embodiment of the present invention.

FIG. 33(*a*) shows a structure of the normal preamble and FIG. 33(*b*) shows a structure of the robust preamble.

In the structure of the robust preamble according to an embodiment of the present invention, the normal preamble is repeated. Specifically, in the robust preamble structure according to an embodiment of the present invention, the normal preamble is repeated twice. The robust preamble according to an embodiment of the present invention is designed to detect and decode the preamble symbol under harsh channel conditions like mobile reception.

The normal preamble shown in FIG. 33(*a*) may be generated by the preamble insertion block shown in FIG. 31. The robust preamble shown in FIG. 33(*b*) may be generated by a preamble insertion block according to an embodiment of the present invention, shown in FIG. 34 or 21, which will be described later.

The normal preamble according to an embodiment of the present invention may include a scrambled GI region and an OFDM data region. The scrambled GI region of the preamble according to an embodiment of the present invention may be a scrambled cyclic postfix or a scrambled cyclic prefix. The scrambled cyclic postfix may be located after an OFDM symbol, distinguished from a scrambled prefix and may be generated through the same process as used to generate the scrambled cyclic prefix, which will be described later. The process of generating the scrambled cyclic postfix may be modified according to designer.

The scrambled GI region shown in FIG. 33 may be generated by scrambling some or all OFDM symbols and used as a guard interval. The scrambled GI and OFDM data of the normal preamble according to an embodiment of the present invention may have the same length. In FIG. 33, the scrambled GI and OFDM data have a length of N and normal preamble has a length of 2N. N, which relates to the length of the preamble according to an embodiment of the present invention, may refer to an FFT size.

The preamble according to an embodiment of the present invention is composed of 3 signaling fields, namely S1, S2 and S3. Each signaling field contains 7 signaling bits, and the preamble carries 21 signaling bits in total. Each signaling field is encoded with a first-order Reed Muller (64, 7) code.

The signaling fields according to an embodiment of the present invention may include the aforementioned signaling information. The signaling fields will be described in detail later.

The broadcast signal reception apparatus according to an embodiment of the present invention can detect a preamble through guard interval correlation using a guard interval in the form of a cyclic prefix even when frequency synchronization cannot be performed.

In addition, the guard interval in the form of a scrambled cyclic prefix according to an embodiment of the present invention can be generated by multiplying (or combining) an OFDM symbol by (or with) a scrambling sequence (or sequence). Furthermore, the guard interval in the form of a scrambled cyclic prefix according to an embodiment of the present invention can be generated by scrambling the OFDM symbol and the scrambling sequence. The scrambling sequence according to an embodiment of the present invention can be any type of signal according to designer.

The method of generating the guard interval in the form of a scrambled cyclic prefix according to an embodiment of the present invention has the following advantages.

Firstly, the preamble can be easily detected by discriminating the preamble from the normal OFDM symbol. The guard interval in the form of a scrambled cyclic prefix is generated through scrambling using the scrambling sequence, distinguished from the normal OFDM symbol, as described above. In this case, when the broadcast signal reception apparatus according to an embodiment of the present invention performs guard interval correlation, the preamble can be easily detected since a correlation peak according to the normal OFDM symbol is not generated and only a correlation peak according to the preamble is generated.

Secondly, when the guard interval in the form of a scrambled cyclic prefix according to an embodiment of the present invention is used, dangerous delay can be prevented. For example, when multipath interference having a delay corresponding to an OFDM symbol period Tu exists, since a correlation value according to multiple paths is present all the time when the broadcast signal reception apparatus performs guard interval correlation, preamble detection performance may be deteriorated. However, when the broadcast signal reception apparatus according to an embodiment of the present invention performs guard interval correlation, the preamble can be detected without being affected by a correlation value according to multiple paths since only a peak according to the scrambled cyclic prefix is generated, as described above.

Finally, influence of continuous wave (CW) interference can be prevented. When a received signal includes CW interference, a DC component according to CW is present all the time during guard interval correlation performed by the broadcast signal reception apparatus and thus signal detection performance and synchronization performance of the broadcast signal reception apparatus may be deteriorated. However, when the guard interval in the form of a scrambled cyclic prefix according to an embodiment of the present invention is used, the influence of CW can be prevented since the DC component according to CW is averaged out by the scrambling sequence.

(b) The robust preamble according to an embodiment of the present invention has repeated normal preambles, as shown in FIG. 33. Accordingly, the robust preamble may include the scrambled GI region and the OFDM data region.

The robust preamble is a kind of repetition of the normal preamble, and carries the same signaling fields S1, S2 and S3 with a different signaling scrambler sequence (SSS).

The first half of the robust preamble, shown in FIG. 33(b), is exactly the same as the normal preamble. The second half of the robust preamble is a simple variation of the normal preamble where the difference arises from the sequence SSS applied in the frequency domain. Accordingly, the second half of the robust preamble includes the same information as that of the normal preamble but may have different data in the frequency domain. In addition, OFDM data B has the same signaling data as OFDM data A but may have a different output waveform in the time domain. That is, while inputs of the Reed Muller encoder 17000 for respectively generating the first half of the robust preamble and the second half of the robust preamble are identical, the IFFT block 17080 may output different waveforms.

The doubled length of the robust preamble according to an embodiment of the present invention improves the detection performance in the time domain, and the repetition of the signaling fields improves the decoding performance for the preamble signaling data. The generation process of the robust preamble symbol is shown in FIG. 33. The detailed functional steps are described in the following description.

The signaling fields will be described in detail with reference to FIGS. 24, 25 and 26 and the robust preamble generation process will be described in detail with reference to FIGS. 20 and 21.

The robust preamble according to an embodiment of the present invention can be detected even by a normal reception apparatus in an environment having a high SNR (Signal to Noise Ratio) since the robust preamble includes the normal preamble structure. In an environment having a low SNR, the robust preamble can be detected using the repeated structure. In FIG. 33(b), the robust preamble has a length of 4N.

When the broadcast signal reception apparatus according to an embodiment of the present invention receives a signal frame including the robust preamble, the broadcast signal reception apparatus can stably detect the preamble to decode signaling information even in a low SNR situation.

FIGS. 20 and 21 illustrate two methods for generating the robust preamble according to an embodiment of the present invention. The robust preamble structure according to an embodiment of the present invention improves the detection performance of signals of a broadcast reception apparatus. The robust preamble may include structure of normal preamble. The robust preamble may additionally include repeated signaling data same as the normal preamble. In this case, the signals of a broadcast transmission apparatus according to an embodiment of the present invention can design differently repeated signaling data of waveform which is included the robust preamble in time domain than signaling data of waveform which is included the normal preamble in time domain. A robust preamble insertion block illustrated in FIG. 34 may generate the robust preamble by multiplying signaling information of the preamble by different scrambling sequences in scramblers to output multiple pieces of scrambled signaling information and allocating the multiple pieces of scrambled signaling information multiplied by the scrambling sequences to OFDM symbol carriers on the basis of the same carrier allocation table.

Figure 35:
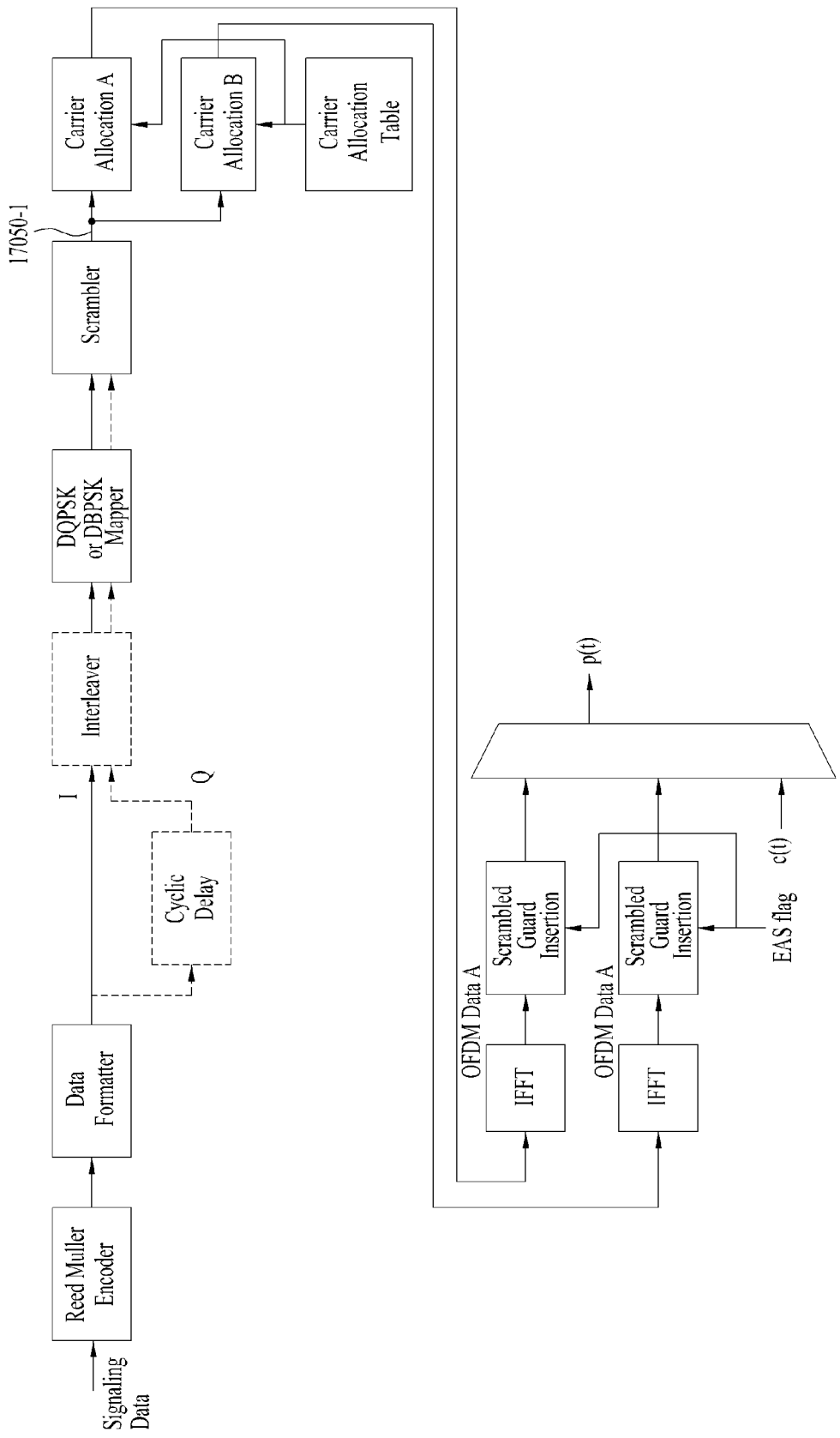
FIG. 35 illustrates a preamble insertion block according to an embodiment of the present invention.

A robust preamble insertion block illustrated in FIG. 35 may generate the robust preamble by multiplying preamble signaling information by the same scrambling sequence and allocating the preamble signaling information multiplied by the scrambling sequence to OFDM symbol carriers on the basis of different carrier allocation tables.

Detailed embodiments will now be described with reference to the figures.

Figure 34:
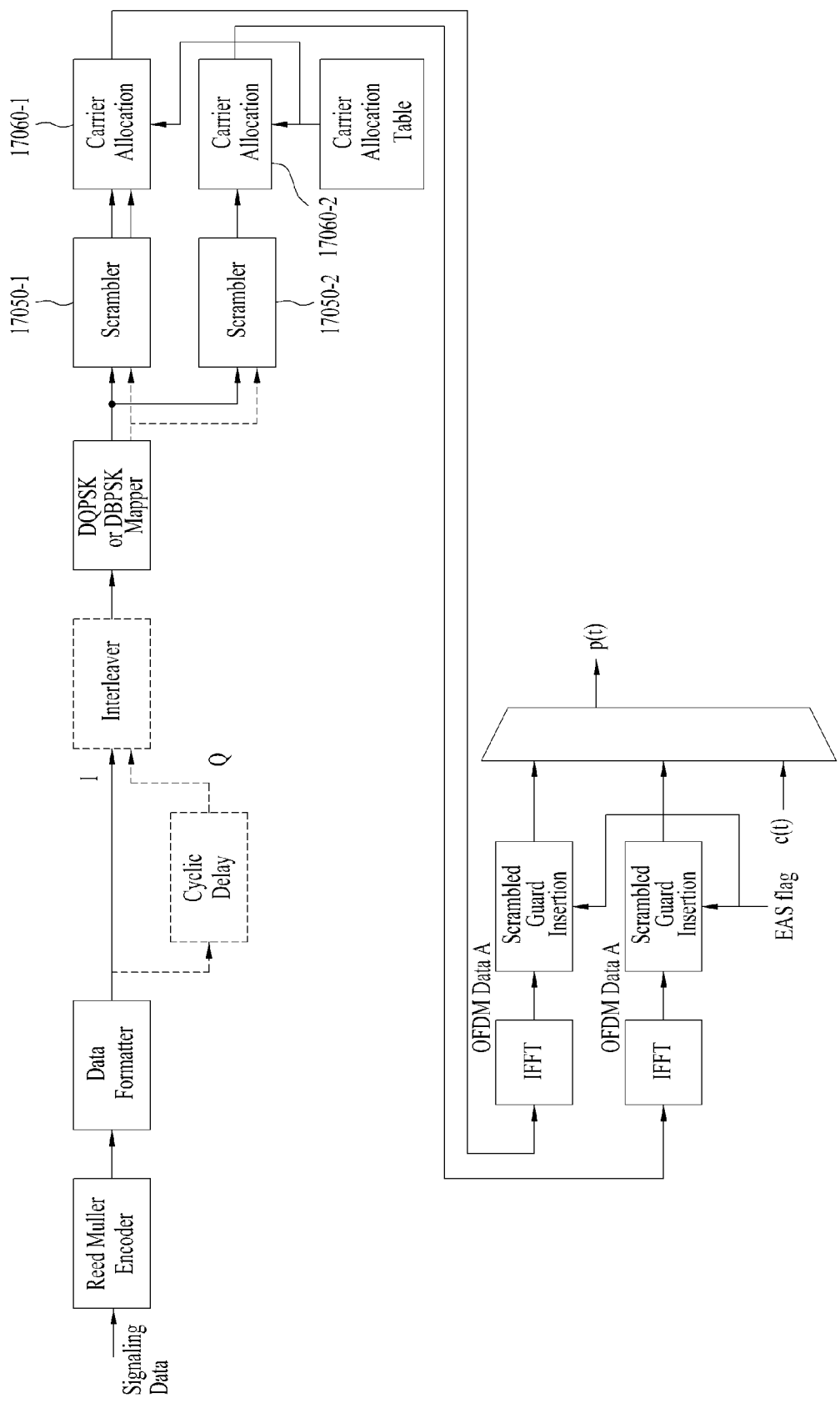
FIG. 34 illustrates a preamble insertion block according to an embodiment of the present invention.

FIG. 34 illustrates a preamble insertion block according to an embodiment of the present invention.

Specifically, FIG. 34 shows another embodiment of the preamble insertion block 7500 described above. The preamble insertion block shown in FIG. 34 may generate the robust preamble. Referring to FIG. 34, the preamble insertion block according to an embodiment of the present invention may include a Reed Muller encoder 17000, a data formatter 17010, a cyclic delay block 17020, an interleaver 17030, a DQPSK (Differential Quadrature Phase shift Keying)/DBPSK (Differential Binary Phase Shift Keying) mapper 17040, a scrambler 17050, a carrier allocation block 17060, a carrier allocation table block 17070, an IFFT block 17080, a scrambled guard insertion block 17090 and a multiplexing block 17100. Each block may be modified or may not be included in the preamble insertion block according to designer. Operations of the blocks may be the same as those of corresponding blocks shown in FIG. 31. A description will be given focusing on a difference between the robust preamble generation process and the normal preamble generation process.

As described above, the robust preamble is composed of the first half of the robust preamble and the second half of the robust preamble and the first half of the robust preamble may be the same as the normal preamble.

Robust preamble generation differs from normal preamble generation only by applying the sequence SSS in the frequency domain as described. Consequently, the Reed Muller encoder 17000, the data formatter 17010 and the DQPSK/DBPSK mapper block 17040 are shared with the normal preamble generation.

The first half of the robust preamble may be generated through the same process as used to generate the normal preamble. In FIG. 34, OFDM data A of the first half of the robust preamble may be generated by scrambling signalling data input to the Reed Muller encoder 17000 through a scrambler A block 17050-1, a carrier allocation block 17060-1 and an IFFT module, allocating the scrambled data to active carriers and transforming carriers output from the carrier allocation block 17060-1 into an OFDM signal of the time domain.

OFDM data B of the second half of the robust preamble may be generated by scrambling signalling data input to the Reed Muller encoder 17000 through a scrambler B block 17050-2, a carrier allocation block 17060-2 and an IFFT module, allocating the scrambled data to active carriers and transforming carriers output from the carrier allocation block 17060-2 into an OFDM signal of the time domain.

The carrier allocation blocks 17060-1 and 17060-2 according to an embodiment of the present invention can allocate the signaling data of the first half of the robust preamble and the signaling data of the second half of the robust preamble to carriers on the basis of the same allocation table.

Scrambled guard insertion modules may respectively scramble OFDM data A and OFDM data B respectively processed through the IFFT modules to generate scrambled GI A and scrambled GI B, thereby generating the first half of the robust preamble and the second half of the robust preamble.

FIG. 35 illustrates a preamble insertion block according to an embodiment of the present invention.

Specifically, FIG. 35 shows another embodiment of the preamble insertion block 7500 described above. The preamble insertion block shown in FIG. 34 may generate the robust preamble. Referring to FIG. 35, the preamble insertion block according to an embodiment of the present invention may include a Reed Muller encoder 17000, a data formatter 17010, a cyclic delay block 17020, an interleaver 17030, a DQPSK (Differential Quadrature Phase shift Keying)/DBPSK (Differential Binary Phase Shift Keying) mapper 17040, a scrambler 17050, a carrier allocation block 17060, a carrier allocation table block 17070, an IFFT block 17080, a scrambled guard insertion block 17090 and a multiplexing block 17100. Each block may be modified or may not be included in the preamble insertion block according to designer. Operations of the blocks may be the same as those of corresponding blocks shown in FIG. 31.

A description will be given focusing on a difference between the robust preamble generation process and the robust preamble generation process of FIG. 34.

The procedure of processing signaling data of the robust preamble according to an embodiment of the present invention through the Reed Muller encoder, data formatter, cyclic delay, interleaver, DQPSK/DBPSK mapper and scrambler modules may correspond to the aforementioned procedure of processing the signaling data of the normal preamble through the respective modules.

The signaling data scrambled by the scrambler module may be input to a carrier allocation A module and a carrier allocation B module. The signaling information input to the carrier allocation A module and the carrier allocation B module may be represented as p[n] (n being a integer greater than 0). Here, p[n] may be represented as p[0] to p[N−1] (N being the number of carriers to which all signaling information is allocated (or arranged). The carrier allocation A module and the carrier allocation B module may allocate (or arrange) the signaling information p[n] to carriers on the basis of different carrier allocation tables.

For example, the carrier allocation A module can respectively allocate p[0], p[1] and p[N−1] to the first, second and N-th carriers. The carrier allocation B module can respectively allocate p[N−1], p[N−2], p[N−3] and p[0] to the first, second, third and N-th carriers.

The preamble insertion blocks illustrated in FIGS. 20 and 21 can generate the first half of the robust preamble and the second half of the robust preamble using different scrambling sequences or using the same scrambling sequence and different carrier allocation schemes. Signal waveforms of the first half and the second half of the robust preamble generated according to an embodiment of the present invention may differ from each other. Accordingly, data offset due to a multipath channel is not generated even when the same signaling information is repeatedly transmitted in the time domain.

Figure 36:
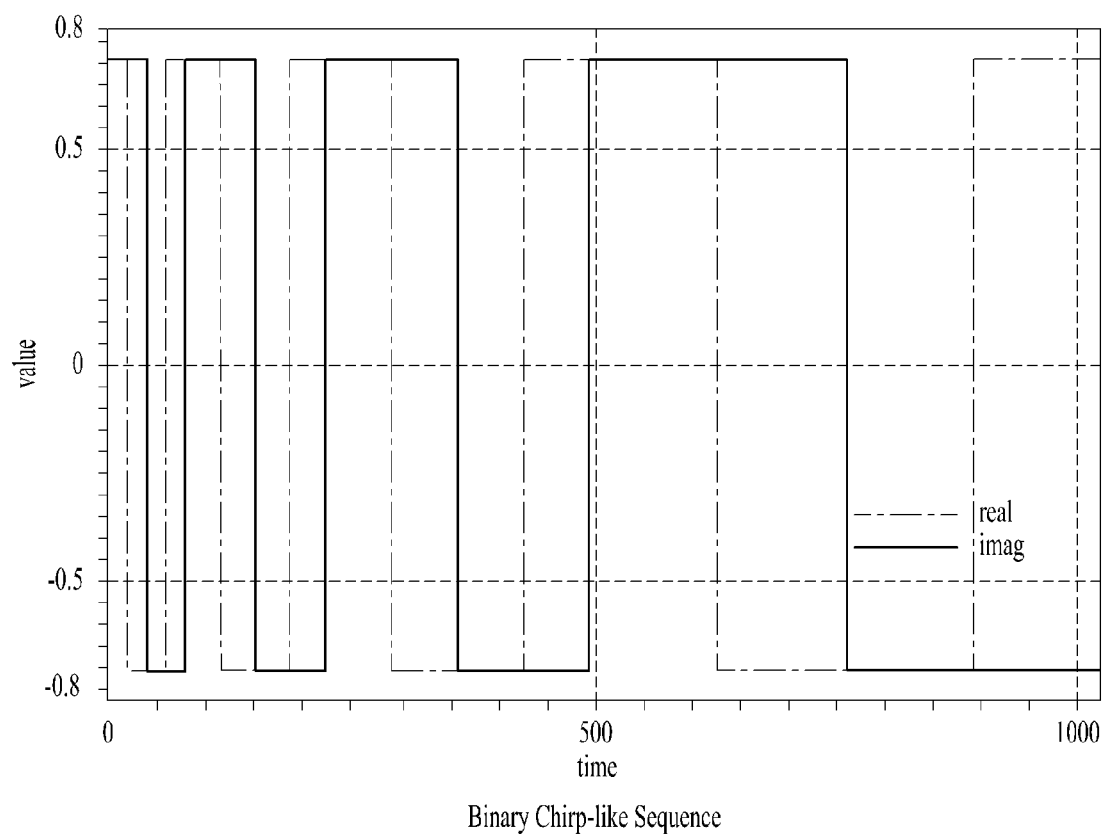
FIG. 36 is a graph showing a scrambling sequence according to an embodiment of the present invention.

FIG. 36 is a graph showing a scrambling sequence according to an embodiment of the present invention.

This graph shows a waveform of a binary chirp-like sequence. The binary chirp-like sequence is an embodiment of a signal that can be used as a scrambling sequence of the present invention. The binary chirp-like sequence is a sequence which is quantized such that the real part and imaginary part of each signal value respectively have only '1' and '−1'. The binary chirp-like sequence shown in FIG. 36 is composed of a plurality of square waves having different periods and a sequence period is 1024 according to an embodiment.

The binary chirp-like sequence has the following advantages. Firstly, the binary chirp-like sequence does not generate dangerous delay since the binary chirp-like sequence is composed of signals having different periods. Secondly, the binary chirp-like sequence provides correct symbol timing information compared to conventional broadcast systems since correlation characteristics are similar to those of guard interval correlation and is resistant to noise on a multipath channel compared to a sequence having delta-like correlation such as an m-sequence. Thirdly, when scrambling is performed using the binary chirp-like sequence, bandwidth is less increased compared to the original signal. Fourthly, the binary chirp-like sequence is a binary sequence and thus can be used to design a device having low complexity.

In the graph showing the waveform of the binary chirp-like sequence, the solid line represents a waveform corresponding to a real part and a dotted line represents an imaginary part. The waveforms of the real part and the imaginary part of the binary chirp-like sequence correspond to square waves.

Figure 37:
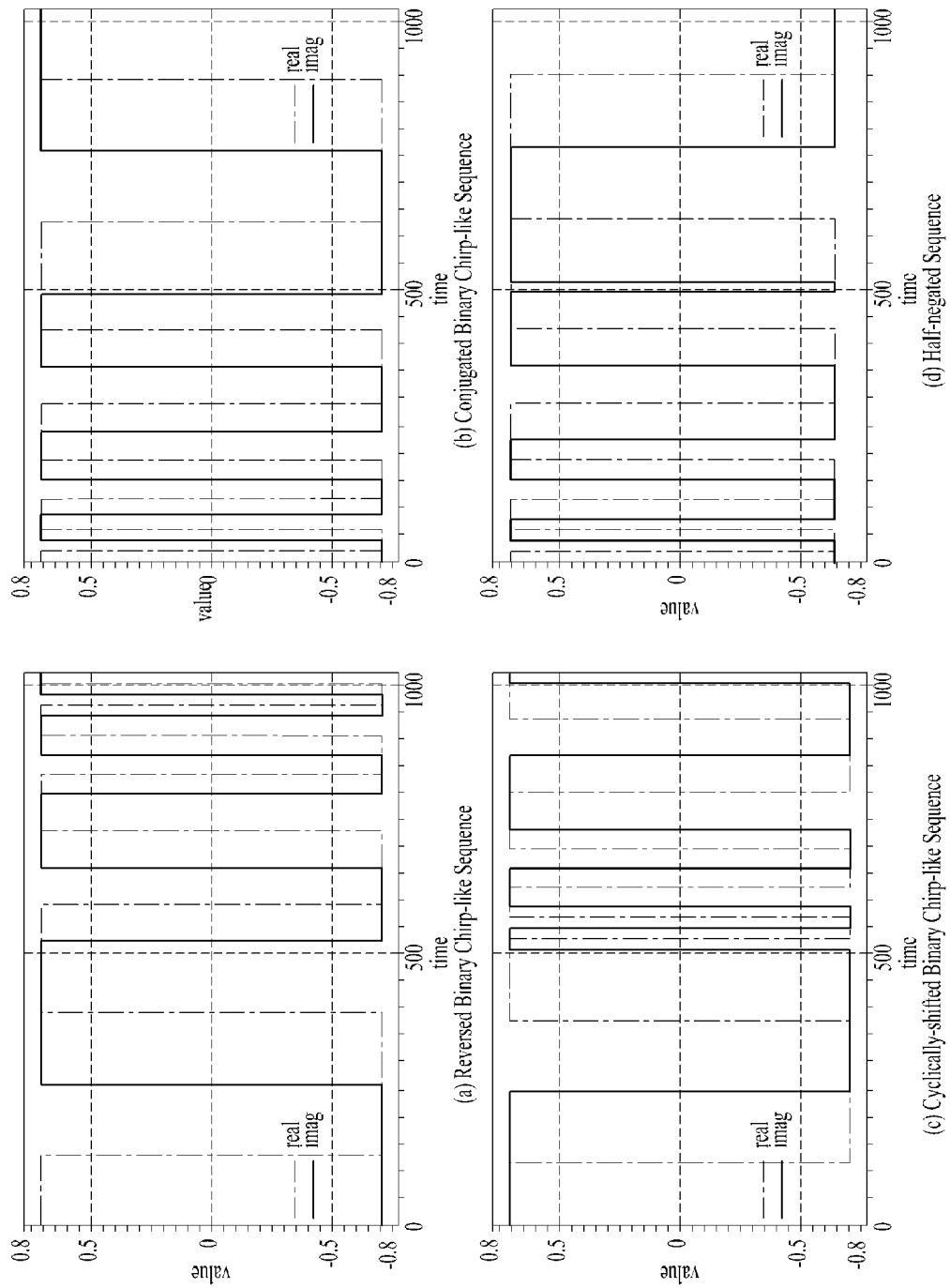
FIG. 37 illustrates examples of scrambling sequences modified from the binary chirp-like sequence according to an embodiment of the present invention.

FIG. 37 illustrates examples of scrambling sequences modified from the binary chirp-like sequence according to an embodiment of the present invention.

FIG. 37($a$) shows a reversed binary chirp-like sequence obtained by reversely arranging the binary chirp-like sequence in the time domain.

FIG. 37($b$) shows a conjugated binary chirp-like sequence obtained by complex conjugating the binary chirp-like sequence. That is, the real part of the conjugated binary chirp-like sequence equals the real part of the binary chirp-like sequence and the imaginary part of the conjugated binary chirp-like sequence equals the imaginary part of the binary chirp-like sequence in terms of absolute value and is opposite to the imaginary part of the binary chirp-like sequence in terms of sign.

FIG. 37($c$) shows a cyclically-shifted binary chirp-like sequence obtained by cyclically shifting the binary chirp-like sequence by a half period, that is, 512.

FIG. 37($d$) shows a half-negated sequence. A front half period, that is, 0 to 512 of the half-negated chirp-like sequence equals that of the binary chirp-like sequence and the real part and imaginary part of a rear half period, that is, 513 to 1024 of the half-negated chirp-like sequence equals that of the binary chirp-like sequence in terms of absolute value and is opposite to the binary chirp-like sequence in terms of sign.

The average of the above-described scrambling sequence is 0. Even when a continuous wave interference is generated in a signal and thus a complex DC is present in an output of a differential decoder of the broadcast signal reception apparatus, the scrambling sequence having an average of 0 can be multiplied by the complex DC of the output of the differential decoder to prevent the complex DC from affecting signal detection performance.

The broadcast signal transmission apparatus according to an embodiment of the present invention can use the scrambling sequences shown in FIGS. 22 and 23 differently according to whether the EAS message is included in the preamble. For example, when the broadcast signal transmission apparatus does not include the EAS message in the preamble, the guard interval of the preamble can be scrambled using the scrambling sequence of FIG. 36. When the broadcast signal transmission apparatus includes the EAS message in the preamble, the guard interval of the preamble can be scrambled using one of the scrambling sequences of FIG. 37.

The scrambling sequences shown in the figures are exemplary and may be modified according to designer.

Figure 38:
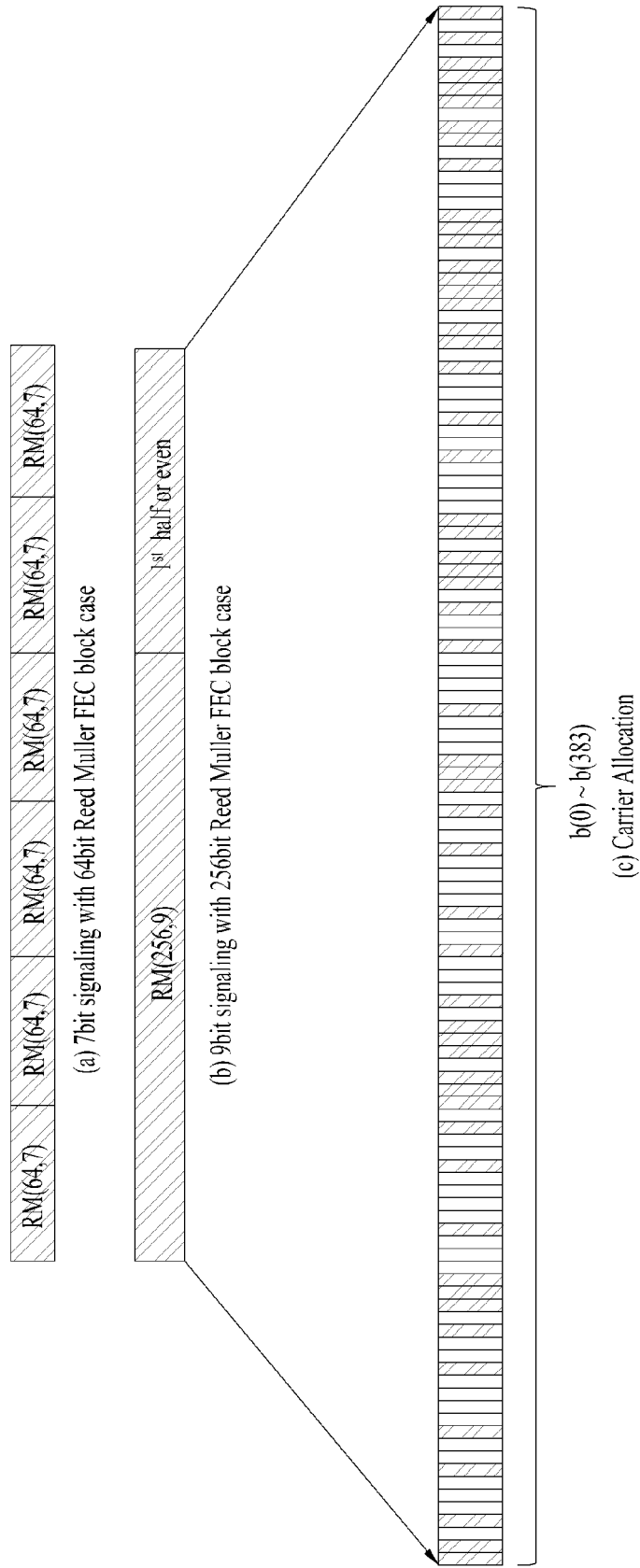
FIG. 38 illustrates a signaling information structure in the preamble according to an embodiment of the present invention.

FIG. 38 illustrates a signaling information structure in the preamble according to an embodiment of the present invention.

Specifically, FIG. 38 shows the structure of signaling information transmitted through the preamble in the frequency domain according to an embodiment of the present invention.

FIGS. 24(a) and 24(b) illustrate repetition or arrangement of data by the data formatter 17010 according to the length of a code block of Reed Muller encoding performed by the Reed Muller encoder 17000. The code block of Reed Muller encoding may be referred to as a Reed Muller FEC block.

The data formatter 17010 may repeat or arrange the signaling information output from the Reed Muller encoder 17000 according to the length of the code block such that the signaling information corresponds to the number of active carriers. FIGS. 24(a) and (b) show an embodiment in which the number of active carriers is 384.

Accordingly, when the Reed Muller encoder 17000 performs Reed Muller encoding on a 64-bit block, as shown in FIG. 38(a), the data formatter 17010 can repeat the same data six times. In this case, the Reed Muller encoder 17000 can use a $1^{st}$ order Reed Muller code and signaling information of each Reed Muller code may be 7 bits.

When the Reed Muller encoder 17000 performs Reed Muller encoding on a 256-bit block, as shown in FIG. 38(b), the data formatter 17010 can repeat front 128 bits or rear 128 bits of the 256-bit code block or repeat even-numbered 128 bits or odd-numbered 128 bits of the 256-bit code block to arrange data as 384 bits. In this case, the Reed Muller encoder 17000 can use a $1^{st}$ order Reed Muller code and signaling information of each Reed Muller code may be 9 bits.

As described above, the signaling information formatted by the data formatter 17010 may be processed through the cyclic delay block 17020 and the interleaver 17030 or not, mapped through the DQPSK/DBPSK mapper 17040, scrambled by the scrambler 17050 and then input to the carrier allocation block 17060.

FIG. 38(c) illustrates a method for allocating the signaling information to active carriers through the carrier allocation block 17060 according to an embodiment of the present invention. In FIG. 38(c), b(n) (n being an integer equal to or greater than 0) represents carriers to which data is allocated. In one embodiment, the number of carriers is 384. Colored carriers from among the carriers shown in FIG. 38(c) denote active carriers and uncolored carriers denote null carriers. Positions of the active carriers shown in FIG. 38(c) may be changed according to designer.

Figure 39:
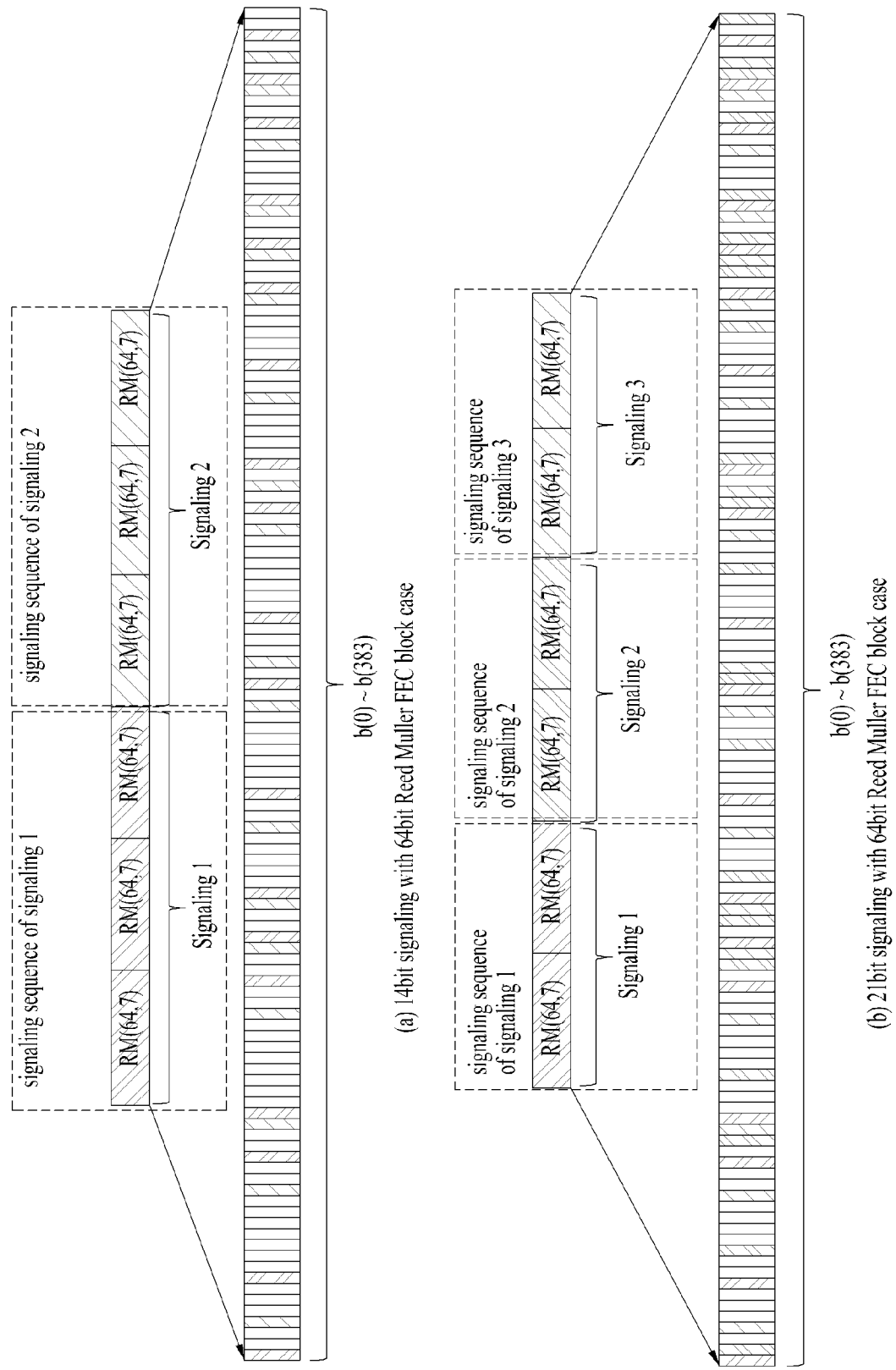
FIG. 39 illustrates a procedure of processing signaling data transmitted through the preamble according to an embodiment of the present invention.

FIG. 39 illustrates a procedure of processing signaling data transmitted through the preamble according to an embodiment of the present invention.

The signaling data transmitted through the preamble may include a plurality of signaling sequences. Each signaling sequence may be 7 bits. The number and size of the signaling sequences may be changed according to designer.

FIG. 39(a) shows a procedure of processing the signaling data transmitted through the preamble when the signaling data is 14 bits according to an embodiment of the present invention. In this case, the signaling data transmitted through the preamble may include two signaling sequences which may be referred to as signaling 1 and signaling 2. Signaling 1 and signaling 2 may be the same signaling sequences as the aforementioned signaling sequences S1 and S2.

FIG. 39(b) shows a procedure of processing the signaling data transmitted through the preamble when the signaling data is 21 bits according to an embodiment of the present invention. In this case, the signaling data transmitted through the preamble may include three signaling sequences which may be referred to as signaling 1, signaling 2 and signaling 3. Signaling 1, signaling 2 and signaling 3 may be the same signaling sequences as the aforementioned signaling sequences S1, S2 and S3.

As shown in FIG. 39, the interleaving block 17030 according to an embodiment of the present invention may sequentially alternately assign S1 and S2 to active carriers.

The number of carriers is 384 and the carriers may be represented by sequential numerals starting from 0 in one embodiment. Accordingly, the first carrier according to an embodiment of the present invention can be represented by b(0), as shown in FIG. 39). Uncolored active carriers shown in FIG. 39 denote null carriers to which S1, S2 or S3 is not arranged (or allocated).

A detailed description will be given of assignment of signaling information to signaling fields and active carriers.

Bit sequences of S1 and bit sequences of S2 according to an embodiment of the present invention are signaling sequences which may be allocated to active carriers in order to transmit independent signaling information (or signaling fields) included in the preamble.

Specifically, S1 can carry 3-bit signaling information and can be configured in a structure in which a 64-bit sequence is repeated twice. In addition, S1 can be arranged before and after S2. S2 is a 256-bit sequence and can carry 4-bit signaling information. The bit sequences of S1 and S2 of the present invention may be represented by sequential numerals starting from 0 according to one embodiment. Accordingly, the first bit sequence of S1 can be represented as S1(0) and the first bit sequence of S2 can be represented as S2(0). Representation of the bit sequences may be changed according to designer.

S1 may carry information for identifying each signal frame included in the superframe described above with reference to FIG. 30, for example, information indicating an SISO-processed signal frame, MISO-processed signal frame or FEF. S2 may carry information about an FFT size of the current signal frame or information indicating whether frames multiplexed in one superframe are of the same type. Information carried through S2 may be changed according to designer.

Signaling 1 and signaling 2 may be respectively encoded into 64-bit Reed Muller codes by the aforementioned Reed Muller encoder. FIG. 39(a) shows a Reed-Muller-encoded signaling sequence block.

The encoded signaling sequence blocks of signaling 1 and signaling 2 may be repeated three times by the aforementioned data formatter. FIG. 39(a) shows the repeated signaling sequence block of signaling 1 and the repeated signaling sequence block of signaling 2. Since the Reed-Muller-encoded signaling sequence block is 64 bits, the signaling sequence block of each of signaling 1 and signaling 2, repeated three times, is 192 bits.

Data of signaling 1 and signaling 2, composed of 6 blocks, alternately rearranged, sequentially input to the cyclic delay block 17020 and the interleaver 17030 and processed therein or mapped by the DBPSK/DQPSK mapper 17040 without undergoing processing of the cyclic delay block 17020 and the interleaver 17030, and then allocated to 384 carriers by the aforementioned carrier allocation block. In FIG. 39(a), b(0) may denote the first carrier and b(1) and b(2) may denote carriers. In one embodiment of the present invention, a total of 384 carriers b(0) to b(383) may be present. From among carriers shown in the figure, colored carriers denote active carriers and uncolored carriers denote null carriers. Active carriers represent carriers to which signaling data is allocated and null carriers represent carriers to which signaling data is not allocated. As described above, the data of signaling 1 and signaling 2 may be alternately allocated to carriers. For example, data of signaling 1 can be allocated to b(0), data of signaling 2 can be allocated to b(3) and data of signaling 1 can be allocated to b(7). The positions of the active carriers and null carriers may be changed according to designer.

(b) The signaling information transmitted through the preamble according to an embodiment of the present invention may be transmitted through the bit sequences of S1, bit sequences of S2 and bit sequences of S3.

S1, S2 and S3 according to an embodiment of the present invention are signaling sequences which can be allocated to active carriers in order to transmit independent signaling information (or signaling fields) included in the preamble.

Specifically, S1, S2 and S3 can respectively carry 3-bit signaling information and can be configured in a structure in which a 64-bit sequence is repeated twice. Accordingly, S1, S2 and S3 can further carry 2-bit signaling information compared to the embodiment of FIG. 39(b).

In addition, S1 and S2 can carry the signaling information described with reference to FIG. 39 and S3 can carry signaling information about a guard interval length (or guard length). Signaling information carried through S1, S2 and S3 may be changed according to designer.

Data of signaling 1, signaling 2 and signaling 3, composed of 6 blocks, is alternately rearranged, sequentially input to the cyclic delay block 17020 and the interleaver 17030 and processed thereby or mapped by the DBPSK/DQPSK mapper 17040 without undergoing processing of the cyclic delay block 17020 and the interleaver 17030, and then allocated to 384 carriers by the aforementioned carrier allocation block.

The bit sequences of S1, S2 and S3 may be represented by sequential numerals starting from 0, that is, m S1(0), . . . . Referring to FIG. 39(b), the number of carriers is 384 and the carriers may be represented by sequential numerals starting from 0, that is b(0), . . . according to one embodiment of the present invention. The number and representation method of the carriers may be changed according to designer.

Figure 40:
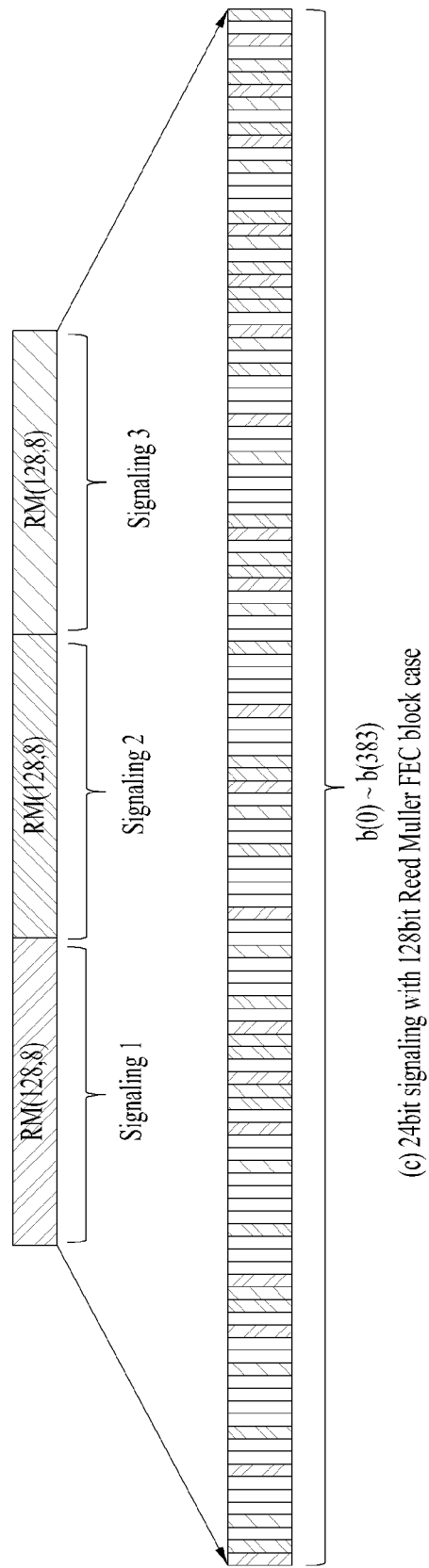
FIG. 40 illustrates a procedure of processing signaling data transmitted through the preamble according to an embodiment of the present invention.

Referring to FIG. 40, S1, S2 and S3 may be sequentially alternately allocated to active carriers in determined positions in the frequency domain.

Specifically, the bit sequences of S1, S2 and S3 can be sequentially allocated to active carriers other than null carriers from among the active carriers b(0) to b(383).

Each of signaling 1, signaling 2 and signaling 3 may be respectively encoded into a 64-bit Reed Muller code by the aforementioned Reed Muller encoder. FIG. 40(b) shows a Reed-Muller-encoded signaling sequence block.

The encoded signaling sequence blocks of signaling 1, signaling 2 and signaling 3 may be repeated twice by the aforementioned data formatter. FIG. 40(b) shows the repeated signaling sequence block of signaling 1, the repeated signaling sequence block of signaling 2 and the repeated signaling sequence block of signaling 3. Since each Reed-Muller-encoded signaling block is 64 bits, the signaling sequence block of each of signaling 1, signaling 2 and signaling 3, repeated twice, is 128 bits.

Signaling 1, signaling 2 and signaling 3, composed of six blocks, may be allocated to 384 carriers by the aforementioned carrier allocation block. In FIG. 40(b), b(0) may be the first carrier and b(1) and b(2) may be other carriers. In one embodiment, 384 carriers b(0) to b(383) may be present. Colored carriers from among the carriers shown in the figure denote active carriers and uncolored carriers denote null carriers. Active carriers may be carriers to which signaling data is allocated and null carriers may be carriers to which signaling data is not allocated. Data of signaling 1, signaling 2 and signaling 3 may be alternately allocated to carriers. For example, data of signaling 1 can be allocated to b(0), data of signaling 2 can be allocated to b(1), data of signaling 3 can be allocated to b(3) and data of signaling 1 can be allocated to b(7). The positions of the active carriers and null carriers shown in the figure may be changed according to designer.

FIG. 40 illustrates a procedure of processing signaling data transmitted through the preamble according to an embodiment of the present invention.

In FIG. 40(c) shows a procedure of processing signaling data transmitted through the preamble when the signaling data is 24 bits. In this case, the signaling data transmitted through the preamble may include three signaling sequences which may be referred to as signaling 1, signaling 2 and signaling 3. Signaling 1, signaling 2 and signaling 3 may be the same signaling sequences as the aforementioned signaling information 51, S2 and S3. The procedure of processing the signaling data is the same as the procedure described with reference to FIG. 39(b).

As described above with reference to FIGS. 25 and 26, a signaling data capacity and a signaling data protection level can be traded off by controlling the length of an FEC-encoded signaling data block. That is, while the signaling data capacity increases as the length of the signaling data block increases, the number of repetitions of the data formatter decreases and the signaling data protection level is lowered. Accordingly, it is possible to select various signaling capacities.

Furthermore, the interleaver 17030 according to an embodiment of the present invention can uniformly interleave data of each signaling field in the frequency domain. Accordingly, frequency diversity characteristics of the preamble can be maximized and robustness against frequency selective fading can be improved.

Figure 41:
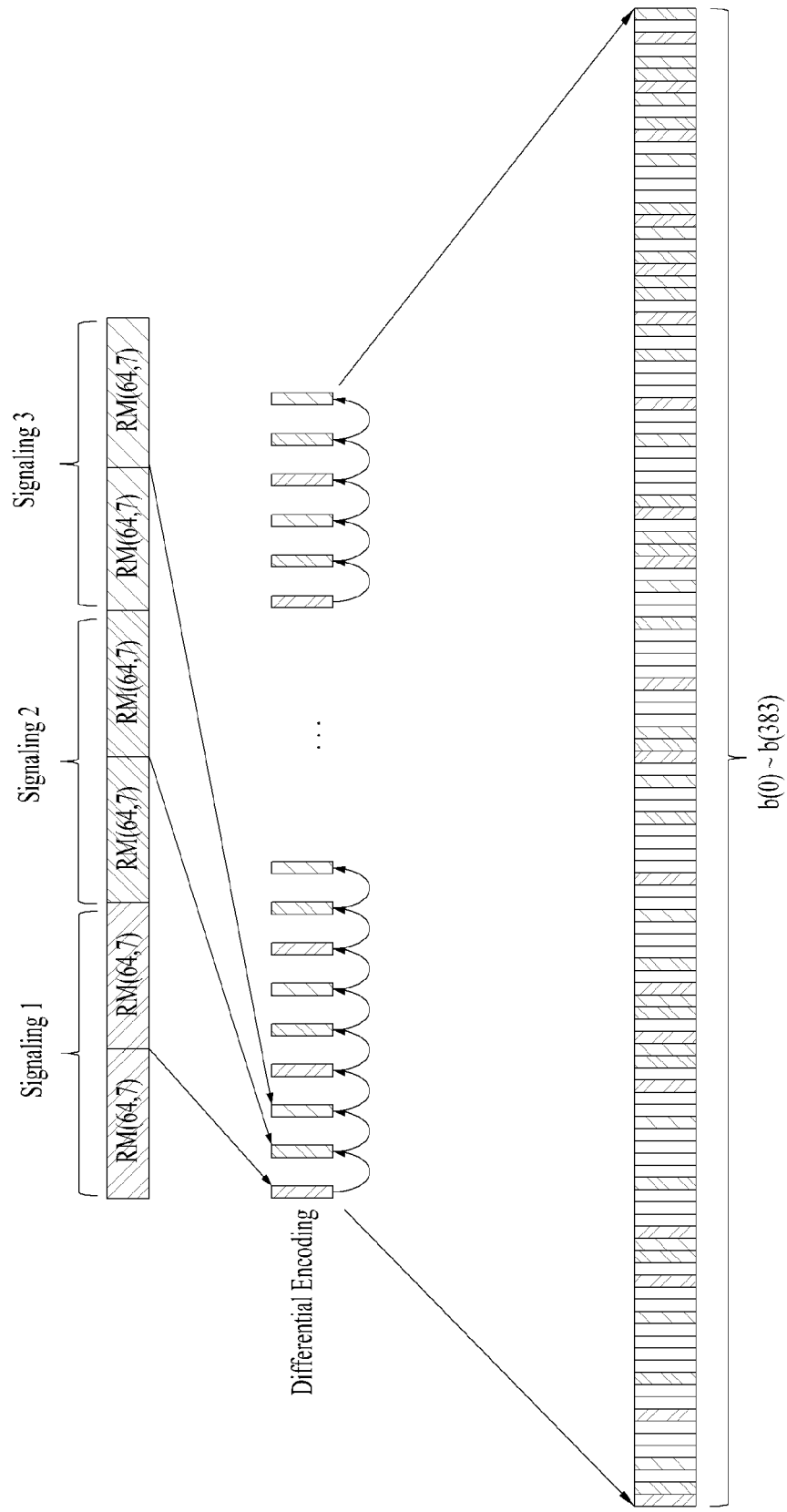
FIG. 41 illustrates a differential encoding operation that can be performed by a preamble insertion module according to an embodiment of the present invention.

FIG. 41 illustrates a differential encoding operation that can be performed by a preamble insertion module according to an embodiment of the present invention.

The preamble insertion module according to an embodiment of the present invention may repeat signaling information (51, S2 and S3 represented as signaling 1, signaling 2 and signaling 3 in FIG. 41) twice. Then, the preamble insertion module may sequentially alternately arrange repeated bits of S1, S2 and S3. Alternatively, the data formatter according to an embodiment of the present invention may repeat and arrange the signaling information, as described above. Subsequently, the preamble insertion module may differential-encode consecutive bits (indicated by curved arrows in the figure). Alternatively, the data formatter or DQPSK/DBPSK mapper according to an embodiment of the present invention may differential-encode the consecutive bits, as described above. The preamble insertion module may scramble the differentially encoded signaling bits and sequentially alternately allocate the bits of S1, S2 and S3 to corresponding carriers. Alternatively, the carrier allocation module according to an embodiment of the present invention may scramble the differential encoded signaling bits and sequentially alternately allocate the bits of S1, S2 and S3 to the corresponding carriers.

Figure 42:
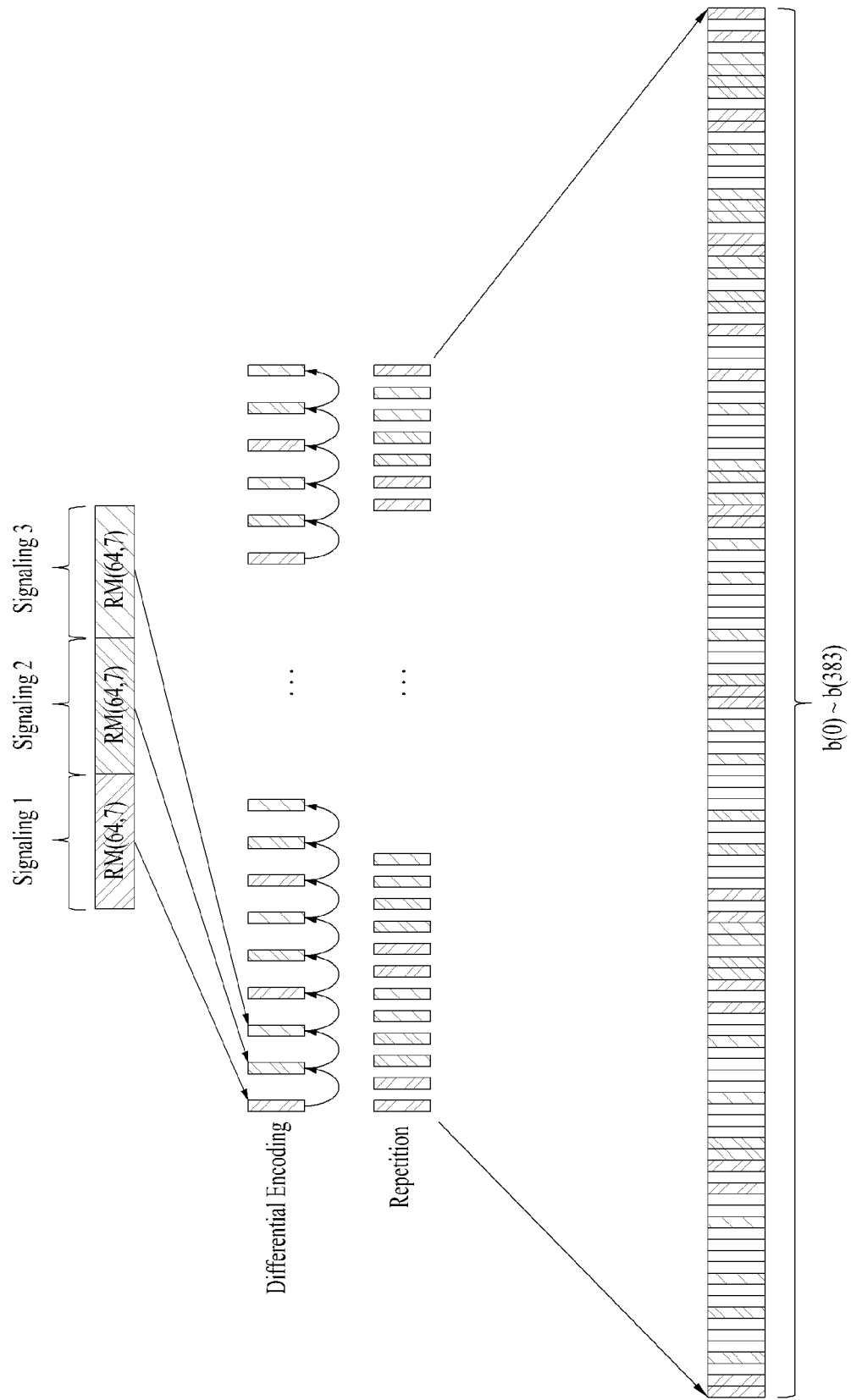
FIG. 42 illustrates a differential encoding operation that can be performed by a preamble insertion module according to another embodiment of the present invention.

FIG. 42 illustrates a differential encoding operation that can be performed by a preamble insertion module according to another embodiment of the present invention.

Operations of the preamble insertion module according to the present embodiment shown in FIG. 42 may correspond to the operations of the preamble insertion modules shown in FIG. 41. In addition, operations of the data formatter, DQPSK/DBPSK mapper and carrier allocation module which may be included in the preamble insertion module according to the present embodiment, shown in FIG. 42, may correspond to operations of modules which may be included in the preamble insertion module shown in FIG. 41.

However, order of the operations may be changed. Specifically, the preamble insertion module according to the present embodiment may repeat signaling information after differential encoding, distinguished from the operation of the preamble insertion module shown in FIG. 41. That is, the preamble insertion module can sequentially alternately arrange the unrepeated bits of S1, S2 and S3. Then, the preamble insertion module can perform differential encoding of the arranged consecutive bits (indicated by curved arrows in the figure). Then, the preamble insertion module may repeat the differentially encoded signaling bits and sequentially alternately allocate the repeated bits to corresponding carriers.

Operations of a signaling decoder of a preamble detector, which will be described later, may depend on the order of differential encoding and data repetition of the preamble insertion modules described with reference to FIGS. 27 and 28. Detailed operations of the signaling decoder will be described later.

Figure 43:
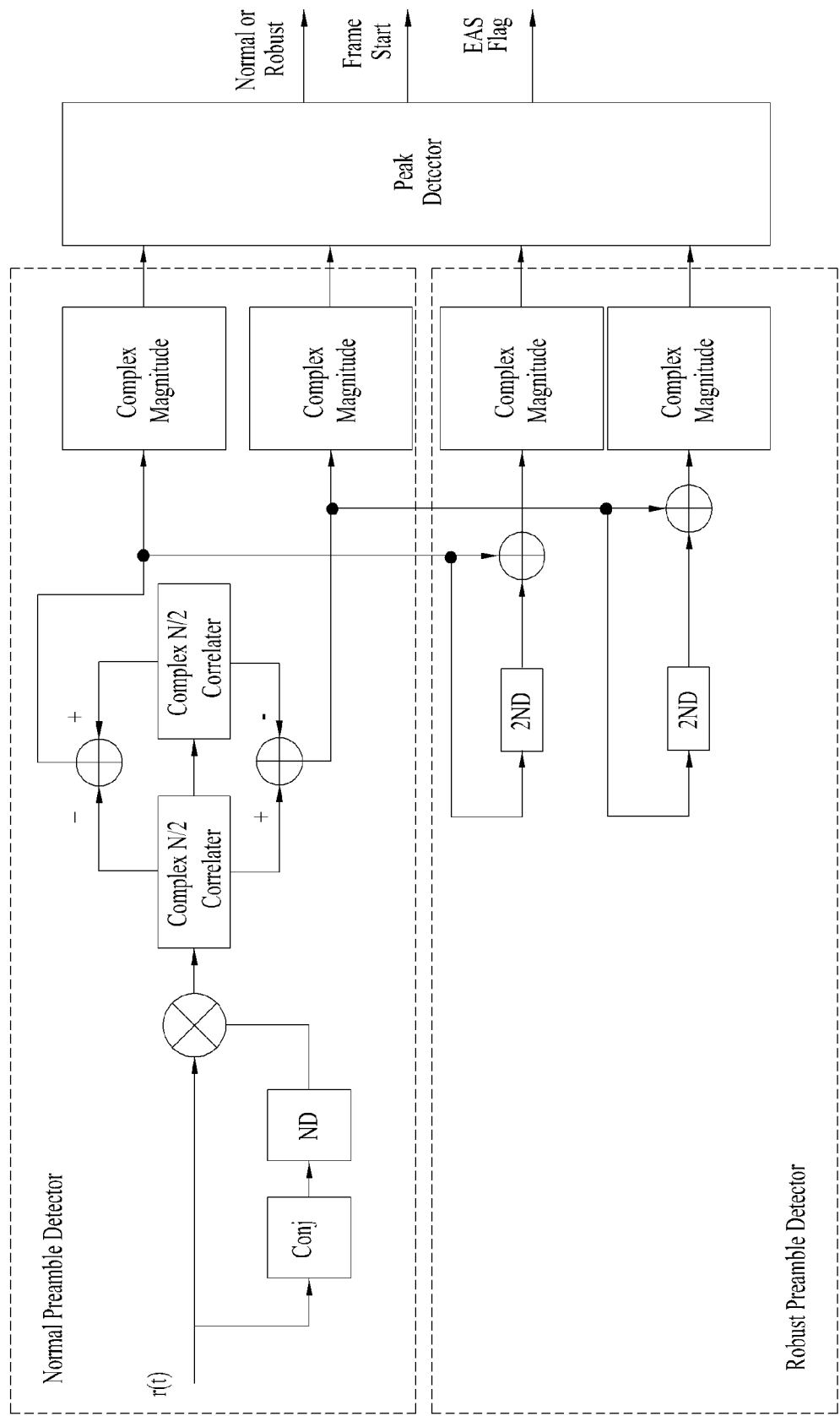
FIG. 43 is a block diagram of a correlation detector included in a preamble detector according to an embodiment of the present invention.

FIG. 43 is a block diagram of a correlation detector included in a preamble detector according to an embodiment of the present invention.

Specifically, FIG. 43 shows a configuration of the aforementioned preamble detector 9300 according to one embodiment, that is, a configuration of a preamble correlation detector for detecting the aforementioned robust preamble.

The preamble correlation detector according to an embodiment of the present invention may include a normal preamble correlation detector (represented as a normal preamble detector in FIG. 43) and a robust preamble correlation detector (represented as a robust preamble detector in FIG. 43).

The robust preamble according to an embodiment of the present invention may have a structure in which the scrambled guard interval and data region are alternately arranged. The normal preamble correlation detector may obtain correlation of the first half of the robust preamble. The robust preamble correlation detector may obtain correlation of the second half of the robust preamble.

A description will be given of operation of the normal preamble correlation detector when the preamble received by the normal preamble correlation detector includes information related to the EAS message and the broadcast signal transmission apparatus uses the binary chirp-like sequence of FIG. 36 and the half-negated sequence of FIG. 37($d$) to signal the information related to the EAS message through the preamble.

The normal preamble correlation detector may multiply signals (i) and (ii), obtained by delaying received signals (i) r(t) and (ii) r(t) by an FFT size, N, and conjugating the delayed signals, by each other.

The normal preamble correlation detector may generate the signal (ii) by conjugating r(t) and then delaying the conjugated r(t) by the FFT size, N. In FIG. 43, a block conj and a block ND (N Delay) can generate the signal (ii).

A complex N/2 correlator may output correlation between the signal obtained by multiplying (i) by (ii) and a scrambling sequence. As described above, the first half period N/2 of the half-negated sequence equals the first half period N/2 of the binary chirp-like sequence and the sign of the second half period of the half-negated sequence is opposite to the sign of the second half period N/2 of the binary chirp-like sequence. Accordingly, the sum of outputs of two complex N/2 correlators may be correlation with respect to the binary chirp-like sequence and a difference between the outputs of the two complex N/2 correlators may be correlation with respect to the half-negated sequence.

The robust preamble correlation detector may detect correlation on the basis of the two sequence correlations detected by the normal preamble detector. The robust preamble correlation detector may detect correlation of the binary chirp-like sequence by summing (i) correlation detected by the normal preamble detector and (ii) correlation obtained by delaying a sequence detected by the normal preamble detector by 2N.

The robust preamble correlation detector can detect correlation by delaying a sequence detected by the normal preamble detector by 2N corresponding to the length of OFDM data and scrambled GI since the robust preamble has a structure in which the OFDM data and scrambled GI are repeated twice.

Complex magnitude blocks of the normal preamble correlation detector and the robust preamble correlation detector may output complex magnitude values of correlations detected through correlators. A peak detector block may detect a peak of complex magnitude values of input correlations. The peak detector block may detect a preamble position from the detected peak and perform OFDM symbol timing synchronization and fractional frequency offset synchronization to output frame start information. In addition peak detector block may output information about preamble type, that is, the normal preamble or the robust preamble and information (EAS flag) about whether the preamble includes the EAS message.

Figure 44:
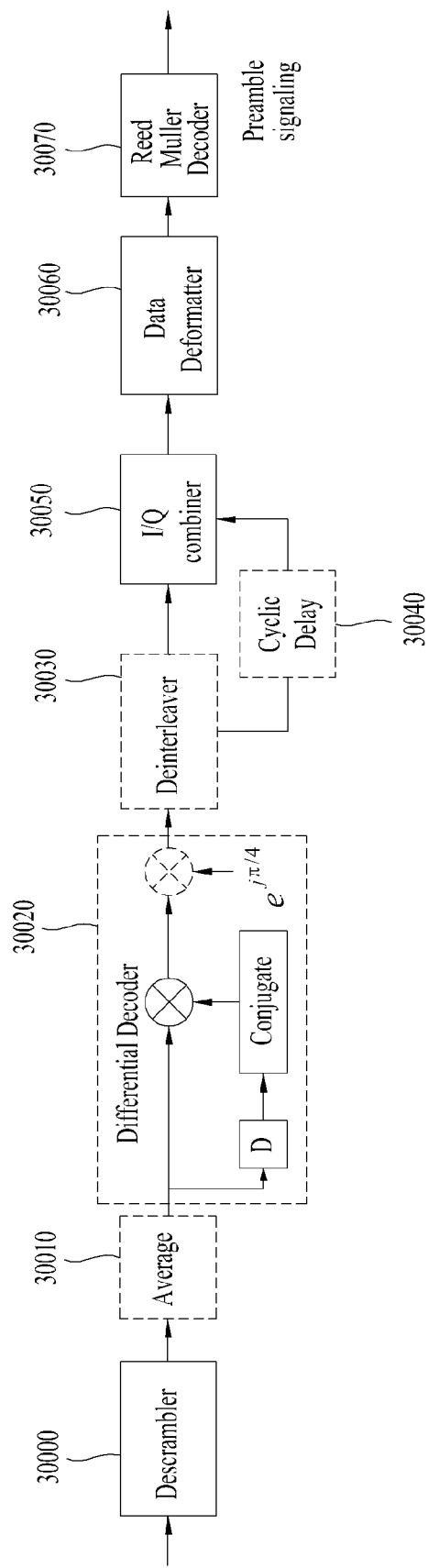
FIG. 44 illustrates a signaling decoder of a preamble detector according to an embodiment of the present invention.

FIG. 44 illustrates a signaling decoder of a preamble detector according to an embodiment of the present invention.

Specifically, FIG. 44 shows an embodiment of the preamble detector 9300 described above, which can perform a reverse of the operation of the preamble insertion block shown in FIG. 31.

The preamble detector according to an embodiment of the present invention may include a correlation detector, an FFT block, an ICFO estimator, a carrier allocation table block, a data extractor and a signaling decoder. Each block may be modified according to designer or may not be included in the preamble detector.

A description will be given of modules constituting the signaling decoder and operations thereof.

The signaling decoder may include a descrambler 30000, an average block 30010, a differential decoder 30020, a deinterleaver 30030, a cyclic delay block 30040, an I/Q combiner 30050, a data deformatter 30060 and a Reed Muller decoder 30070.

The descrambler 30010 may descramble received signaling data.

When the broadcast signal transmission apparatus repeats signaling information and then differential-encodes the repeated signaling information, as described with reference to FIG. 41, the average block 30010 can be omitted. The differential decoder 30020 may receive the descrambled signal and perform DBPSK or DQPSK demapping on the descrambled signal.

Alternatively, when the broadcast signal transmission apparatus differential-encodes signaling information and then repeats the differential encoded signaling information, as described with reference to FIG. 42, the average block 30010 may average corresponding symbols of the descrambled signaling data and then the differential decoder 30020 may perform DBPSK or DQPSK demapping on the averaged signal. The average block may calculate a data average on the basis of the number of repetitions of the signaling information.

A description will be given of detailed operation of the differential decoder 30020.

When a transmitter receives a DQPSK-mapped signal, the differential decoder 30020 may perform phase rotation by π/4 on the differential decoded signal. Accordingly, the differential decoded signal can be segmented into in-phase and quadrature components.

When the transmitter has performed interleaving, the deinterleaver 30030 may deinterleave the signal output from the differential decoder 30020.

When the transmitter has performed cyclic delay, the cyclic delay block 30040 may perform a reverse of the cyclic delay operation performed in the transmitter.

The I/Q combiner 30050 may combine I and Q components of the deinterleaved signal or delayed signal.

When the signal received from the transmitter has been DBPSK mapped, the I/Q combiner 30050 can output only the I component of the deinterleaved signal.

Then, the data deformatter 30060 may combine bits of signals output from the I/Q combiner 30050 per signaling field to output the signaling information. When the broadcast signal transmission apparatus repeats the signaling information and then differential encode the repeated signaling information, the data deformatter 30060 can average the bits of the signaling information.

Subsequently, the Reed Muller decoder 30070 may decode the signaling information output from the data deformatter 30060.

Accordingly, the broadcast signal reception apparatus according to an embodiment of the present invention can obtain the signaling information transmitted using the preamble through the aforementioned procedure.

Figure 45:
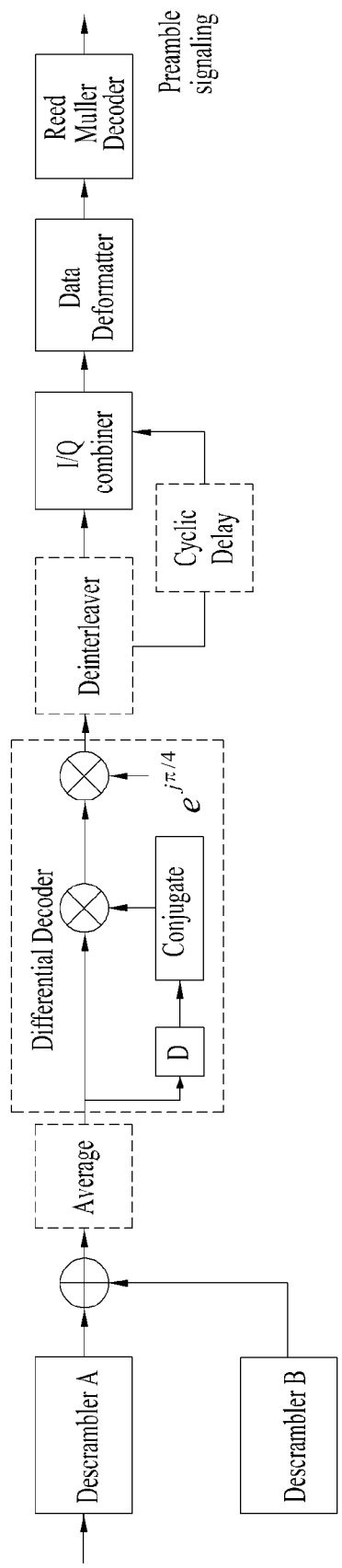
FIG. 45 illustrates a signaling decoder of a preamble detector according to an embodiment of the present invention.

FIG. 45 illustrates a signaling decoder of a preamble detector according to an embodiment of the present invention.

Specifically, FIG. 45 shows an embodiment of the preamble detector 9300 described above, which can perform a reverse of the operation of the preamble insertion block shown in FIG. 34, that is, detect the robust preamble.

The preamble detector according to an embodiment of the present invention may include a correlation detector, an FFT block, an ICFO estimator, a carrier allocation table block, a data extractor and a signaling decoder, as described above. Each block may be modified according to designer or may not be included in the preamble detector.

Modules constituting the signaling decoder and operations thereof will now be described.

The signaling decoder may include a descrambler A, a descrambler B, an average block, a differential decoder, a deinterleaver, a cyclic delay block, an I/Q combiner, a data deformatter and a Reed Muller decoder.

Operations of the descrambler A and descrambler B may correspond to the operation of the aforementioned descrambler 30000.

Operations of other modules may correspond to operations of the modules shown in FIG. 44.

The descrambler A and descrambler B according to an embodiment of the present invention may descramble OFDM data A and OFDM data B by multiplying the OFDM data A and OFDM data B by a scrambling sequence. Then, the signaling decoder may sum descrambled data output from the descrambler A and descrambler B. Subsequent operations of the signaling decoder may be identical to corresponding operations of the signaling decoder shown in FIG. 44.

Figure 46:
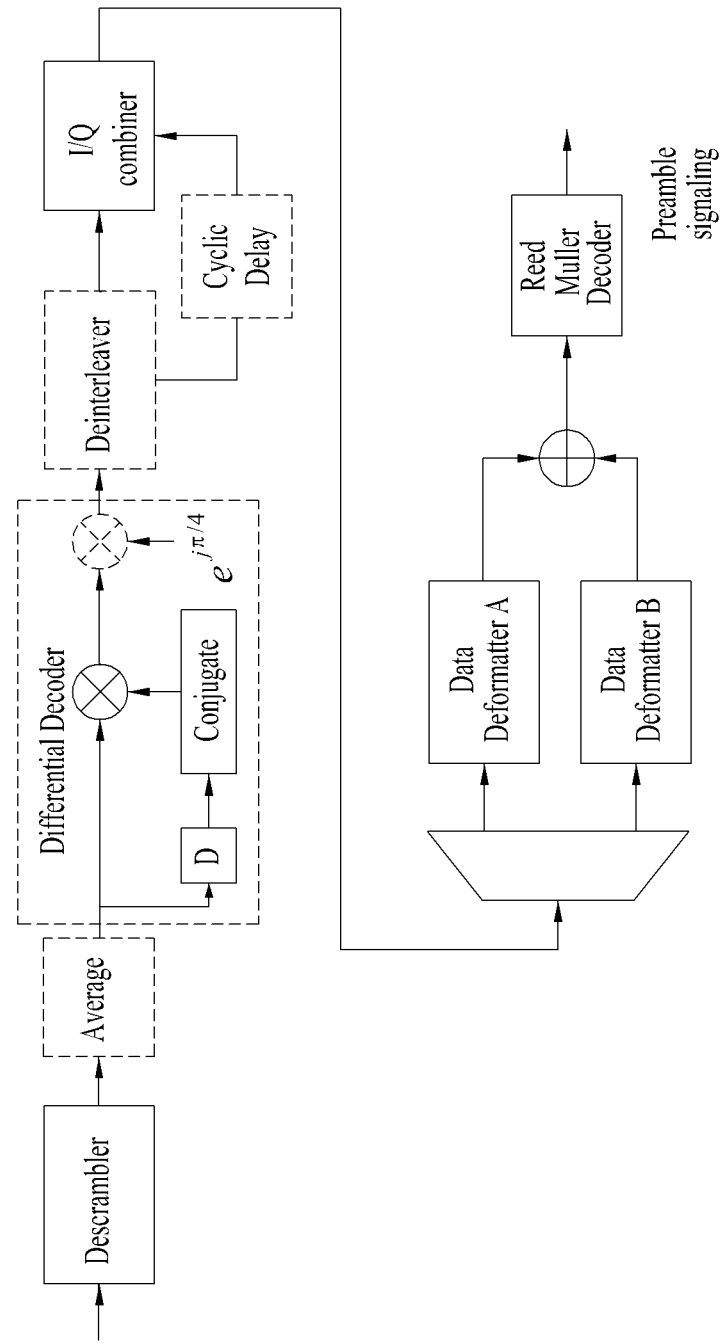
FIG. 46 illustrates a signaling decoder of a preamble detector according to an embodiment of the present invention.

FIG. 46 illustrates a signaling decoder of a preamble detector according to an embodiment of the present invention.

Specifically, FIG. 46 shows an embodiment of the preamble detector 9300 described above, which can perform a reverse of the operation of the preamble insertion block shown in FIG. 35, that is, detect the robust preamble. The preamble detector according to an embodiment of the present invention may include a correlation detector, an FFT block, an ICFO estimator, a carrier allocation table block, a data extractor and a signaling decoder. Each block may be modified according to designer or may not be included in the preamble detector.

Modules constituting the signaling decoder and operations thereof will now be described.

The signaling decoder may include a descrambler, an average block, a differential decoder, a deinterleaver, a cyclic delay block, an I/Q combiner, a data deformatter A, a data deformatter B and a Reed Muller decoder.

Operations of the data deformatter A and data deformatter B may correspond to the operation of the aforementioned data deformatter 30060. Operations of the descrambler, average block, differential decoder, deinterleaver, cyclic delay block and I/Q combiner may correspond to the operations of the modules shown in FIG. 44.

Specifically, the data deformatter A and data deformatter B may combine signaling information corresponding to OFDM data A or OFDM data B from among bits of signals output from the I/Q combiner per signaling field to output signaling information. Then, the signaling information combined per OFDM data output from the data deformatter A and data deformatter B and per signaling field are combined and input to the Reed Muller decoder module. The Reed Muller decoder module may decode the input signaling information.

Figure 47:
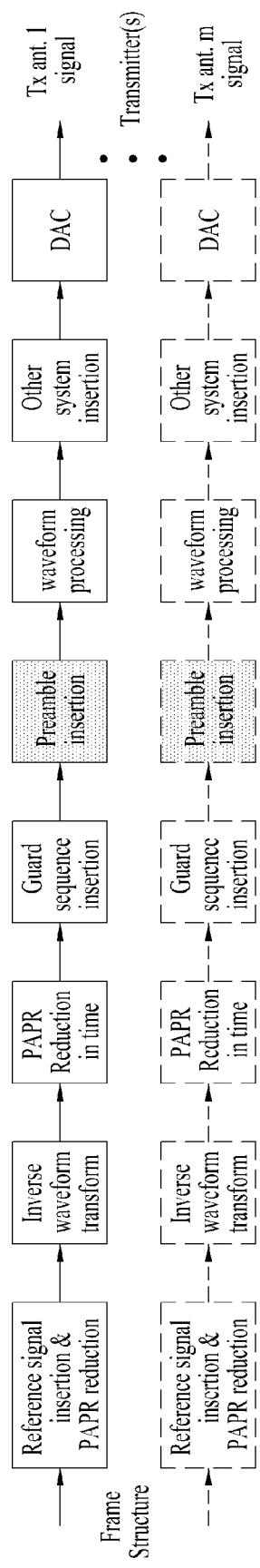
FIG. 47 shows an OFDM generation block according to another embodiment of the present invention.

FIG. 47 shows an OFDM generation block according to another embodiment of the present invention.

This invention may relate to preamble signaling for fast scan. The present invention proposes that the FRU_CONFIGURE field be carried in the preamble. Fast channel scan may be implemented by FRU_CONFIGURE. The present invention may solve the disadvantage of the mixed flag that is conventionally used, enabling fast scan for any signal configuration.

Operation of the OFDM generation block according to another embodiment may be similar to that of the OFDM generation block described in the previous embodiment. In this embodiment, the OFDM generation block may receive signal frames output from the frame structure module described above, and demodulate and transmit the received signal frames according to the number of antennas outputting the signal frames.

According to another embodiment, the OFDM generation block may have m paths. The data carried along the respective path may be transmitted through the m antennas.

According to another embodiment, the OFDM generation block may include a reference signal insertion & PAPR reduction block, an inverse waveform transform block, a PAPR reduction in time block, a guard sequence insertion block, a preamble insertion block, a waveform processing block, an Other system insertion block and/or a digital analog conversion (DAC) block.

The reference signal insertion & PAPR reduction block may insert a reference signal in a predetermined position of each signal block. In addition, this block may employ a PAPR reduction scheme to reduce the PAPR value in the time domain. In the case of an OFDM system, the reference signal insertion & PAPR reduction block may reserve some active subcarriers rather than using them. The PAPR reduction operation may be omitted in another embodiment.

The inverse waveform transform block may transform an input signal and output the transformed signal. In this case, transforming may be performed in consideration of characteristics of the transmission channel. Transmission efficiency may be enhanced through this process. In the case of the OFDM system, the inverse waveform transform block may conduct inverse fast Fourier transform (IFFT). In this case, the signal in the frequency domain may change to a signal in the time domain. In the case of an embodiment, particularly, a single carrier system, the inverse waveform transform block may be omitted.

The PAPR reduction in time block may perform the same operation as the PAPR reduction block. That is, the PAPR reduction block may decrease PAPR of an input signal in the time domain. In the case of the OFDM system, the PAPR reduction process may be a process of clipping the peak of a signal.

To minimize the influence of delay spread of the transmit channel, the guard sequence insertion block may set a guard interval between signal blocks. When necessary, it may insert a specific sequence between the signal blocks. Accordingly, the receiver may easily perform synchronization or channel estimation. In the case of the OFDM system, the guard sequence insertion block may insert a cyclic prefix in the guard interval of an OFDM symbol.

The preamble insertion block may perform an operation similar to the operation of the preamble insertion block described above. That is, the preamble insertion block may insert a preamble in each signal to implement fast detection of the signal. In this embodiment, the preamble insertion block may perform preamble signaling for fast scan.

The waveform processing block may perform waveform processing according to the transmission characteristics of a channel. For example, the waveform processing block may perform square-root-raised cosine (SRRC) filtering in order to obtain an out-of-band emission reference of a transmit signal. In the case of a multi-carrier system, the waveform processing block may be omitted.

The Other system insertion block may be the same as the Other system insertion block described above. That is, the Other system insertion block may multiplex signals of a plurality of broadcast transmission/reception systems in the time domain.

The DAC block may be the same as the DAC block previously described. That is, the DAC block may convert an input digital signal into an analog signal and output the analog signal.

The blocks described above may be omitted or replaced with other blocks having the same or similar function depending on the designer's intention.

The operation related to preamble signaling for fast scan described above may be performed by the preamble insertion block. This is simply illustrative, and the present invention may be performed by another block, depending on the designer's intention, or may be performed throughout a plurality of blocks.

Figure 48:
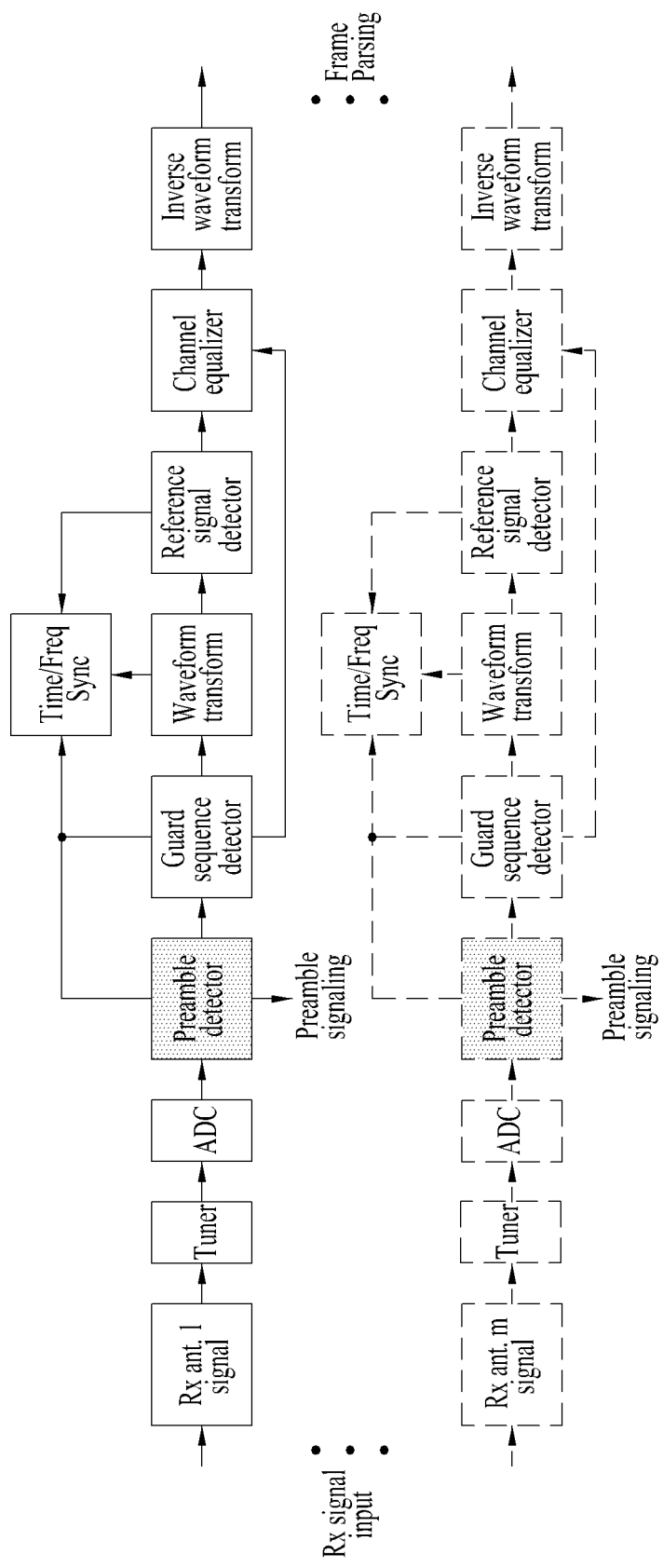
FIG. 48 shows a synchronization & demodulation module according to one embodiment of the present invention.

FIG. 48 shows a synchronization & demodulation module according to one embodiment of the present invention.

The preamble signaling for fast scan proposed in the present invention may be utilized by the receiver to implement fast scanning of channels. To this end, the receiver may detect a preamble according to an embodiment and utilize parsed information.

The synchronization & demodulation module according to this embodiment may be a receive module corresponding to the OFDM generation block of a previous embodiment. The synchronization & demodulation module according to this embodiment may receive a signal and demodulate the signal. That is, the synchronization & demodulation module according to this embodiment may perform the reverse of the operation of the OFDM generation block of the previous embodiment.

The synchronization & demodulation module according to this embodiment may include a tuner block, an ADC block, a preamble detector block, a guard sequence detector block, a waveform transform block, a time/frequency synchronization (sync) block, a reference signal detector block, a channel equalizer block, and/or an inverse waveform transform block.

The tuner block may perform the operation of a typical tuner. That is, the tuner block may deliver a signal received from an antenna to the system. The analog-to-digital conversion (ADC) block may transform an input analog signal to a digital signal.

The preamble detector block may correspond to the preamble insertion block described above. The preamble detector block may obtain preamble signaling information by detecting a preamble. To implement the fast scan proposed in the present invention, the signaled preamble may be detected by the preamble detector block.

The guard sequence detector block may detect a guard sequence inserted by the transmitter. The information obtained by the guard sequence detector block may be used for channel equalization in the channel equalizer block. The waveform transform block may function to transform the input signal. This block may correspond to the waveform processing block of the transmitter and reversely perform the operation of the waveform processing block. The time/frequency sync block may perform synchronization of received signals in the time domain and the frequency domain.

The reference signal detector may detect a reference signal inserted by the transmitter. The reference signal detector block may detect the reference signal for the frequency domain. As described above, when transmission is performed, a reference signal may be inserted in each signal. A data symbol in which the reference signal is inserted may be specified by the designer. The receiver may detect the reference signals and compensate the distortion of the signals by estimating the transmit channel and the synchronization offset. The channel equalizer block may function to synchronize the signals delivered through the transmit channel. The inverse waveform transform block may correspond to the inverse waveform transform block of the transmitter, and reversely perform the process.

The operation related to preamble signaling for fast scanning as described above may be associated with the preamble detector block shaded in the figure. According to this invention, the signaled preamble may be detected by the preamble detector block. The signaling information of the detected preamble may be utilized to perform fast scanning of a channel.

FIG. 49 illustrates a signal frame and a preamble structure thereof according to the conventional art.

A signal frame according to the conventional art may include P1 symbol, L1-pre, L1-post, and payload. P1 symbol corresponding to the preamble may include S1, S2 field1, and S2 field 2. L1-pre may contain information for decoding L1-post. L1-post may include information for decoding PLP of the payload. PLP containing desired data may be found through L1-post. The payload region may contain actual data to be transmitted.

A receiver may detect the preamble, thereby recognizing the type of a signal frame. Herein, not only the type of the signal frame is signaled, but also the type of another signal frame for current transmission may be signaled. In other words, the type of the preamble of another signal frame may also be signaled by the preamble for the current transmission.

The last bit of a 7-bit preamble may be allocated to S2 field 2. S2 field 2 may function as a mixed flag. S2 field 2 may indicate whether all preambles have a type identical to the current preamble type or a preamble of another type is transmitted in the current transmission.

If S2 field 2 is set to 0, all the preambles in the current transmission may be of the same type as that of the preamble of the corresponding signal frame. If S2 field 2 is set to 1, at least one of the preambles subject to the current transmission may be of a type different from the type of the preamble of the corresponding signal frame.

In conventional cases, such mixed flag is signaled to assist the receiver in performing fast scanning of channels.

FIG. 50 illustrates a conventional channel scanning process.

In describing the conventional channel scanning process, it is assumed that a receiver to decode a T2-lite frame scans a channel. The T2-lite frame may be mixed and transmitted with T2 frames.

Herein, the T2 frame is a signal frame based on T2 technology. T2 may represent a technology according to the second generation of the terrestrial digital video broadcasting (DVB) standard. T2-lite is a signal frame based on T2-lite technology. T2-lite, which is a subset of T2, may represent an improved technology for mobile reception of T2.

The receiver may sequentially scan the system from channel 1 to channel n. The receiver may find, through channel scan, signal frames which the receiver can receive.

Channel 1 is consists of T2 frames. Since this channel consists of identical frames, the mixed flag of the first T2 frame is set to 0. Accordingly, the receiver may decode only the first T2 frame, thereby recognizing that none of the channels has a desired T2-lite frame. Thus, the receiver may start to scan channel 2.

Channel 2 may have a mixture of T2 frames and T2-lite frames. Accordingly, the mixed flags of the preambles of the frames constituting channel 2 may all be set to 1. When the receiver parses the preamble of the first T2 frame, it may recognize that there may be a T2-lite frame in the channel since the mixed flag thereof is set to 1. Accordingly, the receiver may recognize that the system is not a system from which it can receive information, but continue to decode the next frame. When the receiver checks the T2-lite frame, it may start to scan the next channel.

Channel n consists only of T2-lite frames. Accordingly, the receiver may recognize that the channel is a receivable channel when it parses the first T2-lite frame. In this case, all the mixed flags of the preambles in channel n may be set to 0.

When the mixed flag is used as above, the receiver may stop scanning of a channel in which another system is present, and proceed to scan the next channel.

Figure 51:
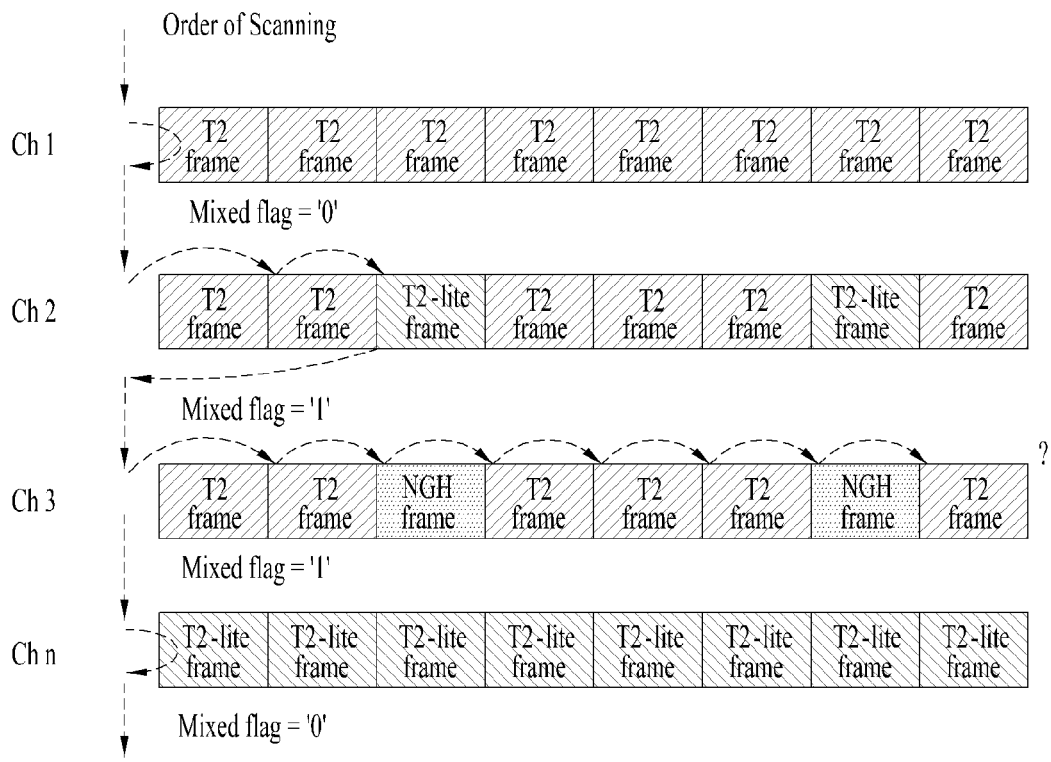
FIG. 51 illustrates a problem of the conventional channel scanning process.

FIG. 51 illustrates a problem of the conventional channel scanning process.

A problem may occur when the aforementioned T2-lite receiver scans a channel such as channel 3. Channel 3 is a channel in which T2 frames and NGH frames are present together.

Herein, the NGH frame may be a signal frame based on the NGH technology. NGH may stand for Next Generation Handheld, a broadcasting standard of DVB.

Preambles of the frames of channel 3 may have mixed flags set to 1 since T2 frames and NGH frames are transmitted together.

In this case, the T2-lite receiver may initially decode a preamble of a T2 frame. Although the T2 frame is not the same system as that of the T2-lite receiver, the receiver may continue to decode the next frame assuming that there may be a T2-lite frame because the mixed flag of the T2 frame is set to 1.

The third frame is an NGH frame representing another system, decoding may be continued since the mixed flag of the NGH frame is set to 1.

In the conventional cases of using the mixed flag as above, a receiver may limitlessly scan the system according to construction of a channel. This may lead to increase in scan time. For this reason, scanning may need to be set to be performed only for a certain time, or decoding may need to be set to be performed as long as the length of a superframe.

Figure 52:
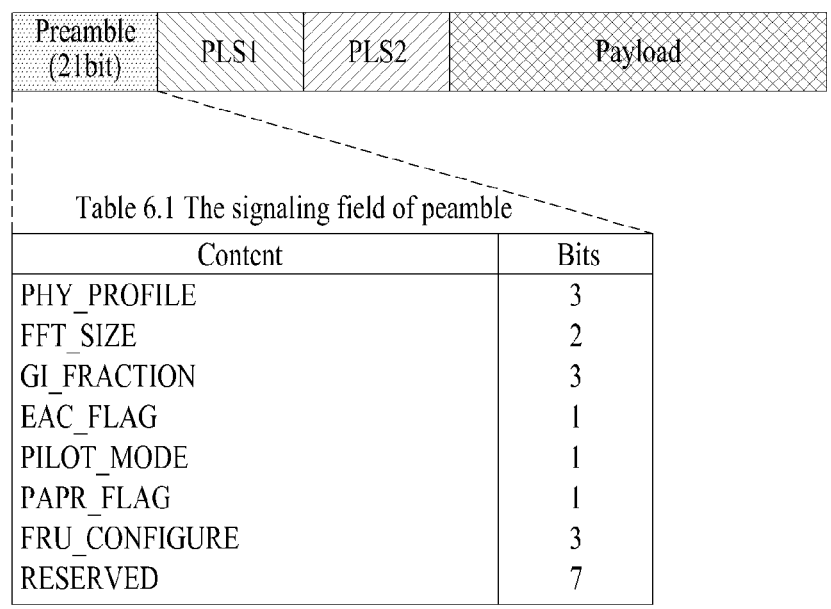
FIG. 52 illustrates a signal frame and a preamble structure thereof according to one embodiment of the present invention.

FIG. 52 illustrates a signal frame and a preamble structure thereof according to one embodiment of the present invention.

According to this embodiment, the signal frame may include a preamble, PLS1, PLS2 and/or a payload. PLS1, PLS2, and the payload are the same as those described above.

The present invention proposes preamble signaling to address the problem of the conventional art as described above.

According to one embodiment of the present invention, the preamble may include an FRU_CONFIGURE field. FRU_CONFIGURE may have a 3-bit value. With FRU_CONFIGURE, fast channel scan is possible, and the problem described above may be solved.

In addition to FRU_CONFIGURE, the preamble may include the fields of FFT_SIZE, GI_FRACTION, EAC_FLAG, PILOT_MODE, and PAPR_FLAG. Each field may represent FFT size information, guard interval-related information or emergency-related flag information. These fields have already been described above.

FIG. 53 illustrates a signaling format of FRU_CONFIGURE of a preamble according to one embodiment of the present invention.

As previously described, configuration of a frame present in a channel may be recognized through FRU_CONFIGURE. Herein, the range which can be indicated by FRU_CONFIGURE may be the whole channel or a superframe. As described above, if a superframe is constructed by repetition of a frame repetition unit (FRU), the FRUs having the same configuration may be repeated in a superframe, and therefore frame configuration of the FRU may also be recognized through FRU_CONFIGURE.

As described above, PHY_PROFILE informs of the type of a frame having the preamble. That is, if PHY_PROFILE is set to 000, the frame may be a frame according to a base profile. If it is set to 001, the frame may be a frame according to a hand-held profile. If PHY_PROFILE is set to 010, the frame may be a frame according to an advanced profile. If PHY_PROFILE is set to 111, the frame may be a future extension frame (FEF), namely, a frame for another system to be used in the future.

According to one embodiment, the FRU_CONFIGURE field may have 3 bits. Each bit may indicate whether or not a frame according to a specific profile is present in the superframe.

To represent all configurations of a superframe with a small number of bits, the FRU_CONFIGURE field indicates whether or not a frame according to a specific profile is present in the superframe in relation to the type of a current frame. That is, configurations of the superframe may be distinguished by combinations of FRU_CONFIGURE and PHY_PROFILE.

If FRU_CONFIGURE is set to 000, the channel or the superframe may consist of frames of one type which are not mixed with other types of frames. That is, if the profile of the current frame is a base profile (PHY_PROFILE=000), and the value of FRU_CONFIGURE is 000, only frames according to the base profile may be present in the superframe.

In the case in which the profile of the current frame is a base profile (PHY_PROFILE=000), if the first bit of FRU_CONFIGURE is set to 1, a frame according to the handheld profile may be present in the superframe. If the second bit of FRU_CONFIGURE is 1, a frame according to the advanced profile may be present in the superframe. If the third bit of FRU_CONFIGURE is 1, an FEF may be present in the superframe.

If the profile of the current frame is not the base profile, meaning of each bit of FRU_CONFIGURE may change. For example, in the case in which the profile of the current frame is the handheld profile (PHY_PROFILE=001), if the first bit of FRU_CONFIGURE is 1, a frame according to the base profile may be present in the superframe. If the second bit of FRU_CONFIGURE is 1, a frame according to the advanced profile may be present in the superframe. If the third bit of FRU_CONFIGURE is 1, an FEF may be present in the superframe.

For example, if the profile of the current frame is the advanced profile (PHY_PROFILE=010), and the value of FRU_CONFIGURE is 011, a frame according to the base profile is not present in the superframe, whereas a frame according to the handheld profile and an FEF are present in the superframe.

In this manner, all possible configurations that the superframe can have may be represented. With the present invention, a large number of superframe configurations may be represented with a smaller number of bits through combination with the "current frame type indicating field:" (PHY_PROFILE). That is, the present invention implements efficient signaling for a preamble with a limited number of bits, and provides minimum information allowing the receiver to implement fast channel scanning.

FIG. 54 illustrates a channel scanning process using preamble signaling according to one embodiment of the present invention.

For simplicity of description, the receiver is assumed to be a receiver capable of receiving a frame of the handheld profile. This receiver sequentially scans the channels, starting with channel 1.

In the case of channel 1, only frames of the base profile and an FEF are present in the channel. The receiver parses the preamble of the frames. The receiver may recognize through PHY_PROFILE that the current frame is a frame of the base profile. In addition, the receiver may recognize through FRU_CONFIGURE that an FEF is present in this channel, but none of the frames of the handheld and advanced profiles are present in this channel. Accordingly, the receiver may stop decoding and start to scan the next channel.

In the case of channel 2, frames of the base profile and handheld profile and an FEF are present in the channel. The receiver may recognize, through PHY_PROFILE, that the current frame is a frame of the base profile. In addition, the receiver may recognize through FRU_CONFIGURE that frames of the handheld profile and an FEF are present in this channel, but none of the frames of the advanced profiles are present in this channel. Accordingly, the receiver may continue decoding.

In the case of channel 3, frames of the base profile and advanced profile and an FEF are present in the channel. Channel 3 is a channel having a problem of the conventional art. The receiver may recognize through PHY_PROFILE that the current frame is a frame of the base profile. In addition, the receiver may recognize through FRU_CONFIGURE that none of the frames of the handheld profile are present in this channel. Accordingly, the receiver may proceed to scan the next channel without continuing decoding.

Through the preamble signaling as above, efficient signaling may be implemented and the time taken to perform channel scanning may be reduced.

Figures 55, 56:
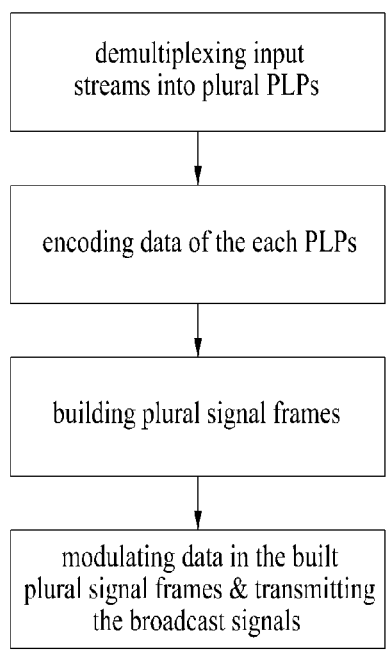
FIG. 55 illustrates preamble signaling according to one embodiment of the present invention.
FIG. 56 illustrates a method of transmitting broadcast signal according to an embodiment of the present invention.

FIG. 55 illustrates preamble signaling according to one embodiment of the present invention.

The preamble of this embodiment may transmit 21-bit information as described above. The preamble may include three signaling fields of S1, S2 and S3. Each signaling field may have the size of 7 bits.

The S1 field may include a 3-bit PHY_PROFILE field (m10, m11, m12), a 3-bit FRU_CONFIGURE field (m13, m14, m15), and a 1-bit EAC_FLAG (m16) field.

The S2 field may include 2-bit FFT_SIZE field (m20, m21), a 3-bit GI_FRACTION field (m22, m23, m24), a 1-bit PILOT_MODE field (m25), and a 1-bit PAPR_FLAG field (m26).

The S3 field may be reserved.

This configuration is simply illustrative, and data may be mapped to the respective bits of the preamble in a completely different manner.

Each signaling field may be encoded into a Reed-Muller codeword $C_i$ (i=1, 2, 3). The equation given below describes the encoding process.

$$C_i = m_i \times G = \{m_{i0}, m_{i1}, m_{i2}, m_{i3}, m_{i4}, m_{i5}, m_{i6}\} \times G = \{C_{i,0}, C_{i,1}, \ldots, C_{i,63}\} \quad \text{[Expression 12]}$$

Each signaling field may be multiplied by the generator matrix G, thereby being encoded into a 64-bit Reed-Muller codeword.

FIG. 56 illustrates a method of transmitting broadcast signal according to an embodiment of the present invention.

The method includes demultiplexing input streams, encoding data of the each PLPs (Physical Layer Pipes), building plural signal frames, and/or modulating data by OFDM method & transmitting broadcast signals.

In step of demultiplexing input streams, the above described input formatting module may process input streams. The input formatting module can process input streams into BB (Base Band) frames of PLPs. The input formatting module can demultiplex input streams into PLPs.

In step of encoding data of the PLPs, the above described coding & modulation module may encode data of the each PLPs. The PLP can be also referred to as DP. This step may include LDPC (Low Density Parity Check) encoding and/or bit interleaving. The data in in each data path can be encoded based on a code rate. Each PLPs can be encoded according to one of the physical layer profiles. The physical layer profiles may correspond to Base profile, Handheld profile, and/or advanced profile, described above. Each physical layer profiles may be configurations based on reception condition. Each physical layer profiles can include LDPC encoding and/or bit interleaving data of the PLP. The encoding with LDPC codes may correspond to LDPC encoding by LDPC encoder. The LDPC encoder may encode BB frames in the PLPs with LDPC codes. Bit interleaving may correspond to bit interleaving by bit interleaver.

In step of building plural signal frames, the above-described frame structure module can build signal frames by mapping the encoded data of the each PLPs. Super frame can include at least two built signal frames. The super frame may correspond to the super frame described above.

In step of modulating data by OFDM method & transmitting broadcast signals, the above-described waveform generation module can modulate data in OFDM method, and transmit the broadcast signals.

In this embodiment, a preamble of the signal frame can include a first signal field indicating type of the current signal frame. The first signal field may correspond to PHY_PROFILE field, described above.

In a method of transmitting broadcast signals according to other embodiment of the present invention, the preamble can further include a second signal field indicating whether data encoded for fixed reception are present in the current super frame, or not. The second signal field may correspond to FRU_CONFIGURE field. The data encoded for fixed reception may correspond to data encoded according to Base profile. That is, the second signal field can indicate whether a signal frame of Base profile is included in a superframe.

In a method of transmitting broadcast signals according to another embodiment of the present invention, the preamble can further include a second signal field indicating configuration of the physical layer profiles of the signal frames in the super frame the second signal field may correspond to FRU_CONFIGURE field. As described above, FRU_CONFIGURE field can indicate PHY profile type configuration of the FRU that are present in the current super frame.

In a method of transmitting broadcast signals according to another embodiment of the present invention, value of the second signal field indicates whether a signal frame of certain physical layer profile is present in the super frame, in combination with value of the first signal field. The second signal field may correspond to FRU_CONFIGURE field. And the first signal field may correspond to PHY_PROFILE field. Each bits of the FRU_CONFIGURE field can mean different thing based on the value of the PHY_PROFILE field. That is, FRU_CONFIGURE field may indicate presence of signal frame of certain PHY profile, in combination with value of the PHY_PROFILE field.

In a method of transmitting broadcast signals according to another embodiment of the present invention, the physical layer profiles include a first physical layer profile, a second physical layer profile, and a third physical layer profile. When the first signal field indicates that the current signal frame is a signal frame of the first physical layer profile, first bit of the second signal field indicates whether a signal frame of the second physical layer profile is present in the super frame, second bit of the second signal field indicates whether a signal frame of the third physical layer profile is present in the super frame, and third bit of the second signal field indicates whether FEF (Future Extension Frame) is present in the super frame. Here, the first physical layer profile may correspond to Base profile. The second physical layer profile may correspond to Handheld profile. The third physical layer profile may correspond to Advanced profile. This may correspond to second column of table 8, described above.

In a method of transmitting broadcast signals according to another embodiment of the present invention, one of the physical layer profile further includes several processes. The processes are mapping the bit interleaved data of the PLP onto constellations, MIMO (Multi Input Multi Output) encoding the mapped data, and/or time interleaving the MIMO encoded data. Here, the one of the physical layer profile may correspond to Advanced profile, described above. The advanced profile can include MIMO encoding process. The PLP being encoded according to the advanced profile, can be encoded by MIMO scheme.

Mapping process may correspond to the constellation mapping conducted by constellation mapper. MIMO encoding can refer to MIMO encoding performed by above described MIMO encoder. Time interleaving can correspond to time interleaving by time interleaver.

The above-described steps can be omitted or replaced by steps executing similar or identical functions according to design.

Figure 57:
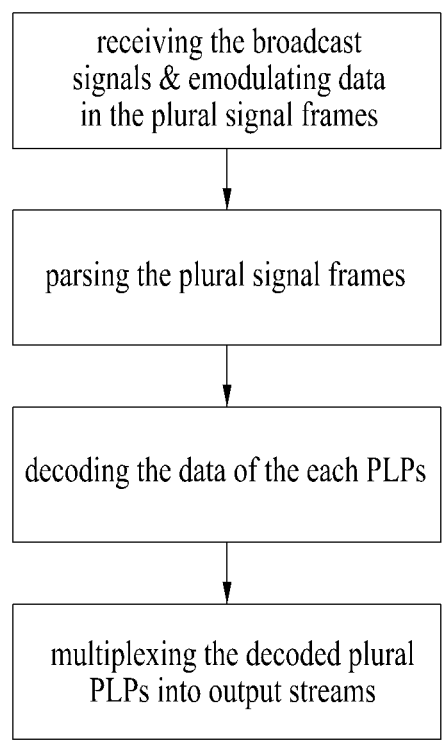
FIG. 57 illustrates a method of receiving broadcast signal according to an embodiment of the present invention.

FIG. 57 illustrates a method of receiving broadcast signal according to an embodiment of the present invention.

The method includes receiving broadcast signals & demodulating data by OFDM method, parsing the plural signal frames, decoding the data of the each PLPs, and/or multiplexing the decoded plural PLPs into output streams.

In step of receiving broadcast signals & demodulating data by OFDM method, the above-described synchronization & demodulation module receives broadcast signals, and demodulates data by OFDM method.

In step of parsing the plural signal frames, the above-described frame parsing module parses the signal frame by demapping data of plural PLPs. Super frame can include at least two built signal frames. The super frame may correspond to the super frame described above.

In step of decoding the data of the PLPs, the above-described demapping & decoding module decodes the PLP data. Step of decoding the PLP data can include bit deinterleaving and/or LDPC decoding. Each PLPs can be decoded according to one of the physical layer profiles. The physical layer profiles may correspond to Base profile, Handheld profile, and/or advanced profile, described above. Each physical layer profiles may be configurations based on reception condition. Each physical layer profiles can include bit deinterleaving and/or LDPC decoding data of the PLP. In step of bit deinterleaving, the above-described bit deinterleaver can conduct bit deinterleaving. In step of LDPC decoding. the above-described LDPC decoder(or FEC decoder) can decode PLP data according to LDPC code, to output BB frames.

In step of multiplexing the decoded plural PLPs, the above described output processor may conduct output processing on the BB frames of the PLPs. The output processor may output output streams.

In this embodiment, a preamble of the signal frame can include a first signal field indicating type of the current signal frame. The first signal field may correspond to PHY_PROFILE field, described above.

In a method of receiving broadcast signals according to other embodiment of the present invention, the preamble can further include a second signal field indicating whether data encoded for fixed reception are present in the current super frame, or not. The second signal field may correspond to FRU_CONFIGURE field. The data encoded for fixed reception may correspond to data encoded according to Base profile. That is, the second signal field can indicate whether a signal frame of Base profile is included in a superframe.

In a method of receiving broadcast signals according to another embodiment of the present invention, the preamble can further include a second signal field indicating configuration of the physical layer profiles of the signal frames in the super frame the second signal field may correspond to FRU_CONFIGURE field. As described above, FRU_CONFIGURE field can indicate PHY profile type configuration of the FRU that are present in the current super frame.

In a method of receiving broadcast signals according to another embodiment of the present invention, value of the second signal field indicates whether a signal frame of certain physical layer profile is present in the super frame, in combination with value of the first signal field. The second signal field may correspond to FRU_CONFIGURE field. And the first signal field may correspond to PHY_PROFILE field. Each bits of the FRU_CONFIGURE field can mean different thing based on the value of the PHY_PROFILE field. That is, FRU_CONFIGURE field may indicate presence of signal frame of certain PHY profile, in combination with value of the PHY_PROFILE field.

In a method of receiving broadcast signals according to another embodiment of the present invention, the physical layer profiles include a first physical layer profile, a second physical layer profile, and a third physical layer profile. When the first signal field indicates that the current signal frame is a signal frame of the first physical layer profile, first bit of the second signal field indicates whether a signal frame of the second physical layer profile is present in the super frame, second bit of the second signal field indicates whether a signal frame of the third physical layer profile is present in the super frame, and third bit of the second signal field indicates whether FEF (Future Extension Frame) is present in the super frame. Here, the first physical layer profile may correspond to Base profile. The second physical layer profile may correspond to Handheld profile. The third physical layer profile may correspond to Advanced profile. This may correspond to second column of table 8, described above.

In a method of receiving broadcast signals according to another embodiment of the present invention, one of the physical layer profile further includes several processes. The processes are time deinterleaving, MIMO decoding, and/or demapping data from constellations. Here, the one of the physical layer profile may correspond to Advanced profile, described above. These processes are applied to PLPs, being decoded according to Advanced profile.

In step of time deinterleaving, the above-described time deinterleaver can conduct time deinterleaving PLP data. In step of MIMO decoding, the above-described MIMO decoder can conduct MIMO decoding PLP data. MIMO decoding can be conducted by using MIMO matrix including MIMO coefficient. MIMO coefficient can be used for adjusting power imbalance. In step of demapping from constellations, the above-described constellation demapper can conduct demapping. The demapping can be conducted on PLP data. The above-described steps can be omitted or replaced by steps executing similar or identical functions according to design.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Various embodiments have been described in the best mode for carrying out the invention.

The present invention is available in a series of broadcast signal provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting broadcast signals, the method including:

encoding service data of Physical Layer Pipes (PLPs);

bit interleaving the encoded service data;

building at least one signal frame including the bit interleaved service data; and modulating data in the at least one signal frame by Orthogonal Frequency Division Multiplexing (OFDM) method;

inserting a preamble at a beginning of each of the at least one signal frame after the modulating step; and transmitting the broadcast signals having the modulated data, wherein the preamble includes information for a size of Fast Fourier Transform (FFT), a guard interval and a pilot mode, wherein the preamble includes two OFDM symbols, and wherein each of the two OFDM symbols in the preamble includes information for an emergency alert.

2. The method of claim 1, wherein the two OFDM symbols in the preamble include different data in a frequency domain, respectively.

3. The method of claim 1, wherein each of the two OFDM symbols in the preamble includes different data in a time domain, respectively.

4. The method of claim 1, wherein values used for the preamble is modulated to output a modulated sequence.

5. The method of claim 4, wherein the modulated sequence is mapped into active carriers at Inverse Fast Fourier Transform (IFFT) inputs of an OFDM scheme to output a time domain sequence.

6. An apparatus for transmitting broadcast signals, the apparatus including:

a processor that
  encodes service data of Physical Layer Pipes (PLPs);
  bit interleavebit interleaves the encoded service data;
  builds at least one signal frame including the bit interleaved service data; and
  modulates data in the at least one signal frame by Orthogonal Frequency Division Multiplexing (OFDM) method;
  inserts a preamble at a beginning of each of the at least one signal frame after the data is modulated; and
  transmits the broadcast signals having the modulated data,
wherein the preamble includes information for a size of Fast Fourier Transform (FFT), a guard interval and a pilot mode,
wherein the preamble includes two OFDM symbols, and
wherein each of the two OFDM symbols in the preamble includes information for an emergency alert.

7. The apparatus of claim 6, wherein the two OFDM symbols in the preamble include different data in a frequency domain, respectively.

8. The apparatus of claim 6, wherein each of the two OFDM symbols in the preamble includes different data in a time domain, respectively.

9. The apparatus of claim 6, wherein values used for the preamble is modulated to output a modulated sequence.

10. The apparatus of claim 9, wherein the modulated sequence is mapped into active carriers at Inverse Fast Fourier Transform (IFFT) inputs of an OFDM scheme to output a time domain sequence.

* * * * *